US011751208B2

(12) United States Patent
Rastegardoost et al.

(10) Patent No.: US 11,751,208 B2
(45) Date of Patent: Sep. 5, 2023

(54) UPLINK CONTROL INFORMATION IN UNLICENSED BANDS IN A WIRELESS NETWORK

(71) Applicant: Ofinno, LLC, Reston, VA (US)

(72) Inventors: Nazanin Rastegardoost, McLean, VA (US); Esmael Hejazi Dinan, McLean, VA (US); Hyoungsuk Jeon, Centreville, VA (US); Yunjung Yi, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/036,509

(22) Filed: Sep. 29, 2020

(65) Prior Publication Data

US 2021/0105812 A1    Apr. 8, 2021

Related U.S. Application Data

(60) Provisional application No. 62/910,266, filed on Oct. 3, 2019.

(51) Int. Cl.
| | |
|---|---|
| *H04W 74/08* | (2009.01) |
| *H04W 72/21* | (2023.01) |
| *H04W 72/23* | (2023.01) |
| *H04L 1/1812* | (2023.01) |

(52) U.S. Cl.
CPC ........... *H04W 72/23* (2023.01); *H04L 1/1819* (2013.01); *H04W 72/21* (2023.01); *H04W 74/0808* (2013.01)

(58) Field of Classification Search
CPC ............. H04W 72/14; H04W 72/0413; H04W 74/0808; H04L 1/1819
See application file for complete search history.

(56) References Cited

U.S. PATENT DOCUMENTS

| | | | |
|---|---|---|---|
| 2021/0007149 A1* | 1/2021 | Li | H04W 74/0833 |
| 2021/0044391 A1* | 2/2021 | Lunttila | H04L 1/1887 |
| 2021/0092763 A1* | 3/2021 | Li | H04L 1/1664 |
| 2022/0104258 A1* | 3/2022 | Moon | H04L 5/0092 |

(Continued)

OTHER PUBLICATIONS

R1-1908112 Huawei "Transmission with configured grant in NR unlicensed band" 3GPP WG1 #98 Prague Aug. 26-30, 2019 (Year: 2019).*

(Continued)

*Primary Examiner* — Basil Ma
(74) *Attorney, Agent, or Firm* — Jacob L. Mangan; Kavon Nasabzadeh; Philip R. Smith

(57) ABSTRACT

A wireless device receives configuration parameters of periodic radio resources of a configured uplink grant. The periodic radio resources comprise: one or more first resource elements of a first sub-band; and one or more second resource elements of a second sub-band. The wireless device multiplexes: a first configured grant uplink control information (CG-UCI) via the one or more first resource elements; and a second CG-UCI via the one or more second resource elements. The second CG-UCI is be based on a repetition of the first CG-UCI. At least one of the first CG-UCI and the second CG-UCI is transmitted via the periodic radio resources and based on one or more listen-before-talk (LBT) procedures performed on the first sub-band and the second sub-band.

20 Claims, 27 Drawing Sheets

(56) References Cited

U.S. PATENT DOCUMENTS

2022/0295558 A1* 9/2022 Lei .................... H04L 5/0053
2023/0085934 A1* 3/2023 Schober ............. H04L 5/14

OTHER PUBLICATIONS

R1-1908426 Panasonic "Wideband operation in NR unlicensed" 3GPP WG1 #98 Prague Aug. 26-30, 2019 (Year: 2019).*
R1-1909476 Vivo "Feature lead summary on Configured grant enhancement" 3GPP WG1 #98 Prague Aug. 2019 (Year: 2019).*
3GPP TS 36.321 V15.4.0 (Dec. 2018); Technical Specification; 3rd Generation Partnership Project; Technical Specification Group Radio Access Network; Evolved Universal Terrestrial Radio Access (E-UTRA); Medium Access Control (MAC) protocol specification; (Release 15).
3GPP TS 36.331 V15.4.0 (Dec. 2018); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.212 V15.6.0 (Jun. 2019); Technical Specification; 3rd Generation Partnership Project; Technical Specification Group Radio Access Network; NR; Multiplexing and channel coding; (Release 15).
"3GPP TS 38.213 V15.6.0 (Jun. 2019); Technical Specification; 3rd Generation Partnership Project; Technical Specification Group Radio Access Network; NR;Physical layer procedures for control (Release 15); //".
3GPP TS 38.214 V15.6.0 (Jun. 2019); Technical Specification; 3rd Generation Partnership Project; Technical Specification Group Radio Access Network; NR; Physical layer procedures for data; (Release 15).
3GPP TS 38.321 V15.6.0 (Jun. 2019); Technical Specification; 3rd Generation Partnership Project; Technical Specification Group Radio Access Network; NR; Medium Access Control (MAC) protocol specification; (Release 15).
3GPP TS 38.331 V15.6.0 (Jun. 2019); Technical Specification; 3rd Generation Partnership Project; Technical Specification Group Radio Access Network; NR; Radio Resource Control (RRC) protocol specification; (Release 15).
"3GPP TSG RAN WG1 Meeting #98; Prague, CZ, Aug. 26-30, 2019; Title: RAN1 Chairman's Notes ; 1 Opening of the Meeting (Day 1: 9.00 AM) 3 ".
"R1-1908112; 3GPP TSG RAN WG1 Meeting #98; Prague, Czech Republic, Aug. 26-30, 2019; ; Agenda Item:7.2.2.2.4; Source: Huawei, HiSilicon; Title: Transmission with configured grant in NR unlicensed band;".
"R1-1908113; 3GPP TSG RAN WG1 Meeting #98; Prague, Czech Republic, Aug. 26-30, 2019; ; Agenda Item:7.2.2.2.5; Source: Huawei, HiSilicon; Title: NRU wideband BWP operation;".
"R1-1908143; 3GPP TSG RAN WG1 #98; Prague, CZ, Aug. 26-30, 2019; ; Source:vivo; Title: Discussion on the enhancements to configured grants Agenda Item:7.2.2.2 4;".
"R1-1908144; 3GPP TSG RAN WG1#98R1-1908144 Prague, CZ, Aug. 26-30, 2019; ; Source:vivo; Title: Discussion on wideband operation in NR-U; Agenda Item:7.2 2 2.5;".
"R1-1908208 Discussion on configured grant for NR-U; 3GPP TSG RAN WG1 Meeting #98 Prague, CZ, Aug. 26-30, 2019 ; Title:Discussion on configured grant for NR-U; Source: ZTE, Sanechips; Agenda Item:7.2.2.2.4; Document for: Discussion and Decision;".
"R1-1908421; 3GPP TSG RAN WG1 #98; Prague, CZ, Aug. 26-30, 2019; ; Source: OPPO; Title: Wideband operation for NR-U ; Agenda Item:7.2.2.2.5;".
"R1-1909248 7.2.2.2.4 Enhancements to configured grants for NR-U; 3GPP TSG RAN WG1 Meeting #98; Prague, CZ; Aug. 26-Aug. 30, 2019; ; Agenda item:7.2.2.2.4; Source: Qualcomm Incorporated;".
"R1-1909249 7.2.2.2.5 Wideband operation for NR-U Operation; 3GPP TSG RAN WG1 Meeting #98; Prague, CZ; Aug. 26-Aug. 30, 2019; ; Agenda item: 7.2.2.2.5; Source: Qualcomm Incorporated;".
"R1-1909301 Configured grant enhancement; 3GPP TSG-RAN WG1 Meeting #98; Prague, Czech Republic, Aug. 26-30, 2019; ; Agenda ltem:7.2.2.2.4; Source:Ericsson; Title:Configured grant enhancement; ".
"R1-1909302 Wideband operation; 3GPP TSG-RAN WG1 Meeting #98 Prague, Czech Republic, Aug. 26-30, 2019; ; Agenda ltem:7.2.2.2.5; Source:Ericsson; Title:Wideband operation for NR-U;".
"R1-1909458; 3GPP TSG RAN WG1 #98R1-19xxxxx Prague, CZ, Aug. 26-30, 2019; ; ; Agenda ltem:7.2.2.2.5; Source: LG Electronics;".
"R1-1909476; 3GPP TSG RAN WG1#98; Prague, CZ, Aug. 26-30, 2019; ; ; Agenda Item:7.2.2.2.4; Source:vivo ;".
"R1-1909627 Summary of offline discussi on NRU CG; 3GPP TSG RAN WG1#98; Prague, CZ, Aug. 26-30, 2019; ; ; Agenda ltem:7.2.2.2.4; Source:vivo ;".
"R2-1909829 MAC impacts of multiple CCAs in wide band operation; 3GPP TSG-RAN WG2 Meeting #107; Prague, Czech Republic, Aug. 26-30, 2019(Resubmission of R2-1906729); ; ; Agenda Item: 11.2.1.2 (NR_unlic-Core); Source: LG Electronics Inc.;".
"RAN2-107 Notes NRUP TEIUP IAB NRU IIOT eURLLC Johan EOM; 3GPP TSG-RAN WG2 Meeting #107R2-191yzw Prague, Czech Republic, Aug. 26-30, 2019; ; Source: R2 Vice Chairman (Mediatek); Title:DRAFT Session Notes NRUP TEI16UP IAB NR-U IIOT eURLLC; ;".
3GPP TS 36.213 V15.4.0 (Dec. 2018) 3rd Generation Partnership Project; Technical Specification group Radio Access Network; Evolved Universal Terrestrial Radio Access (E-UTRA); Physical Layers Procedures (Release 15).

* cited by examiner

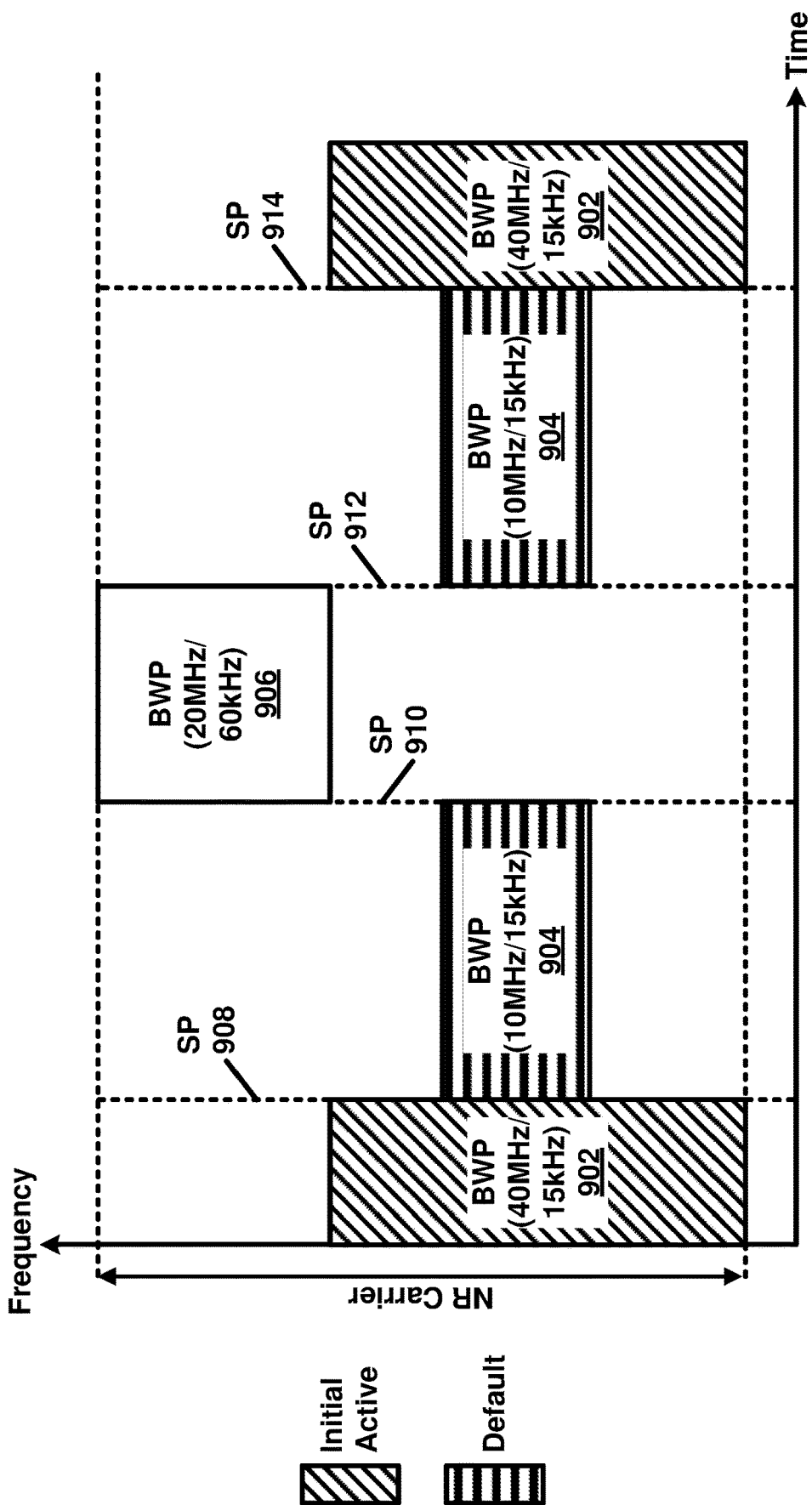

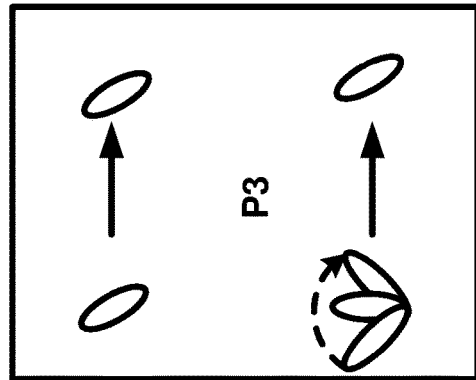
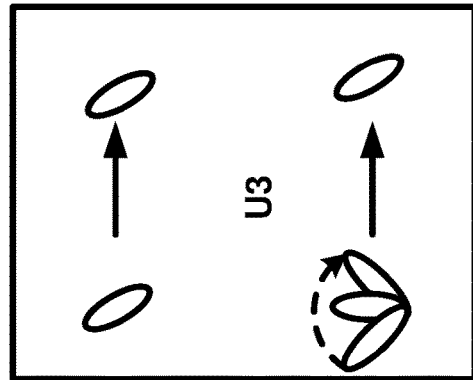
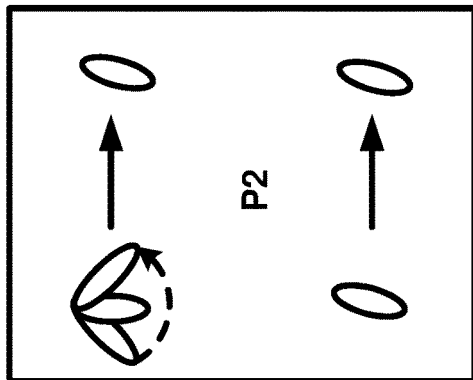
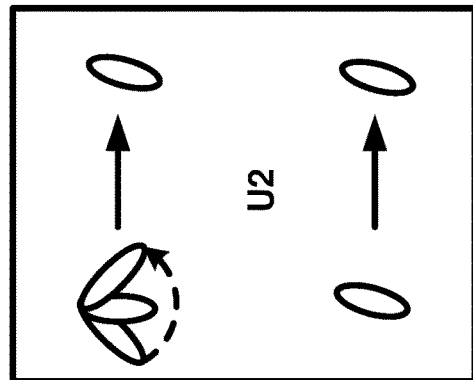
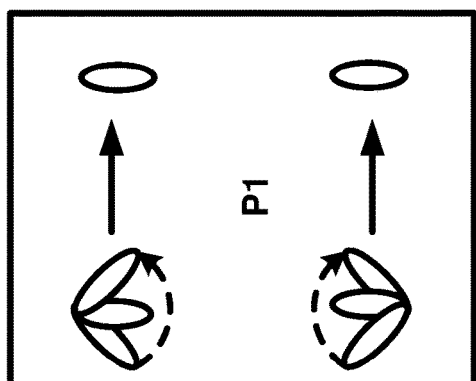
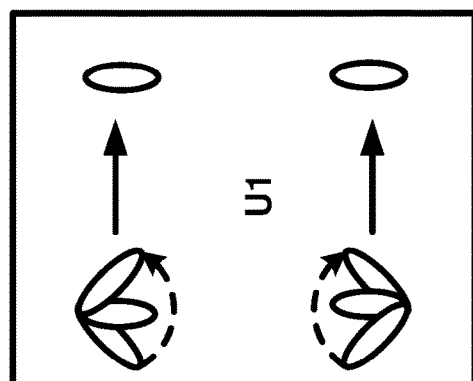
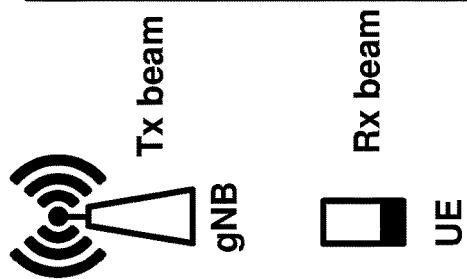
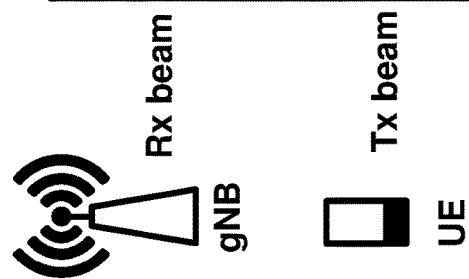
FIG. 12A
FIG. 12B

UPLINK CONTROL INFORMATION IN UNLICENSED BANDS IN A WIRELESS NETWORK

CROSS-REFERENCE TO RELATED APPLICATIONS

This application claims the benefit of U.S. Provisional Application No. 62/910,266, filed Oct. 3, 2019, which is hereby incorporated by reference in its entirety.

BRIEF DESCRIPTION OF THE DRAWINGS

Examples of several of the various embodiments of the present disclosure are described herein with reference to the drawings.

FIG. 9 illustrates an example of bandwidth adaptation using three configured BWPs for an NR carrier.

FIG. 12A and FIG. 12B respectively illustrate examples of three downlink and uplink beam management procedures.

DETAILED DESCRIPTION

Figure 1A:
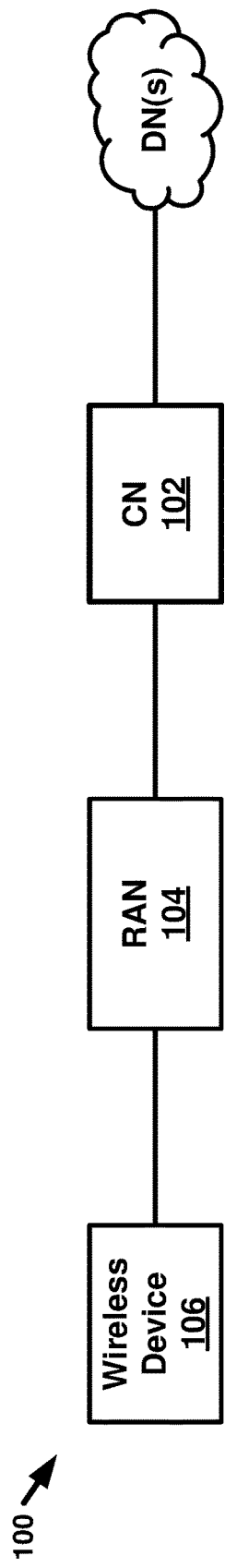
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
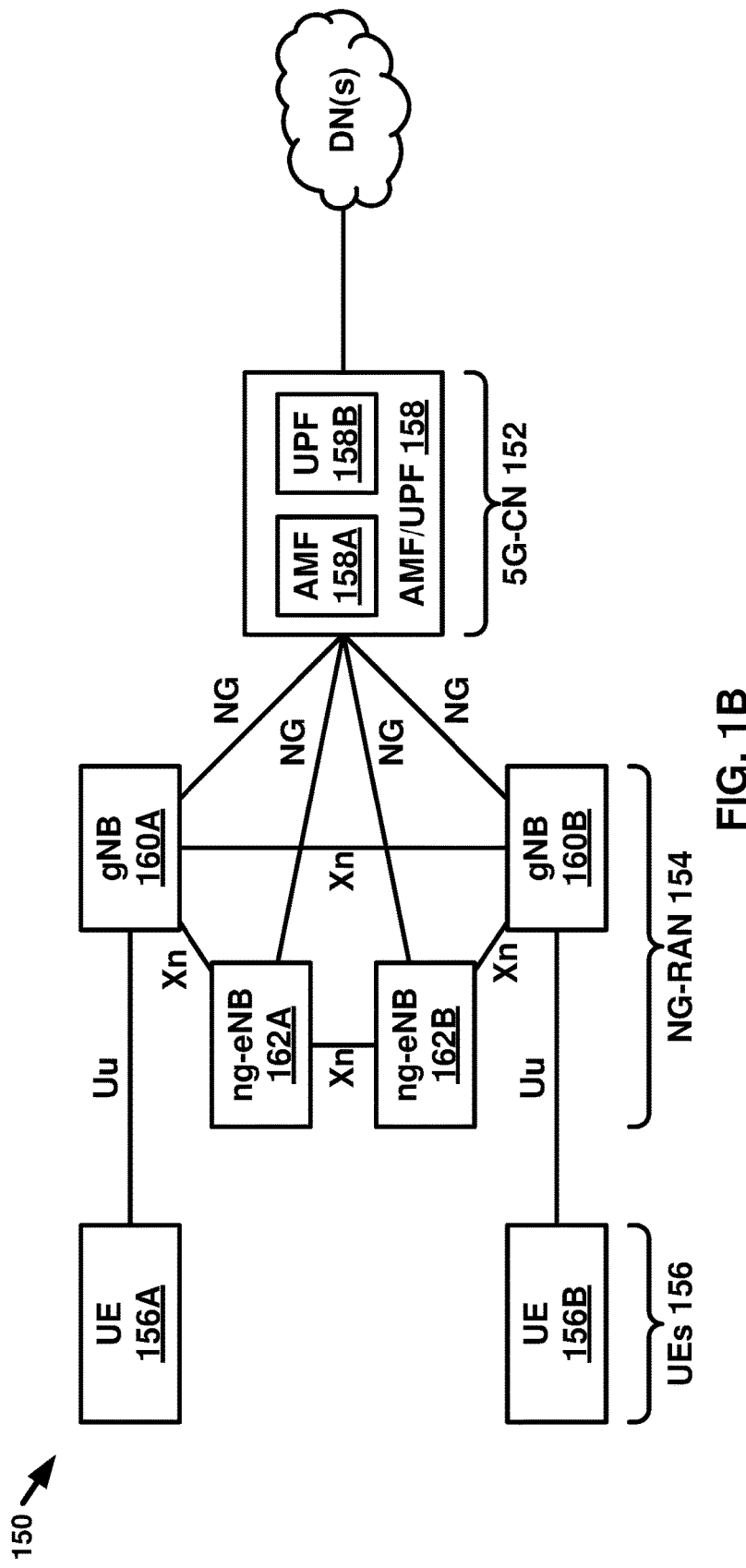

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNB s 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
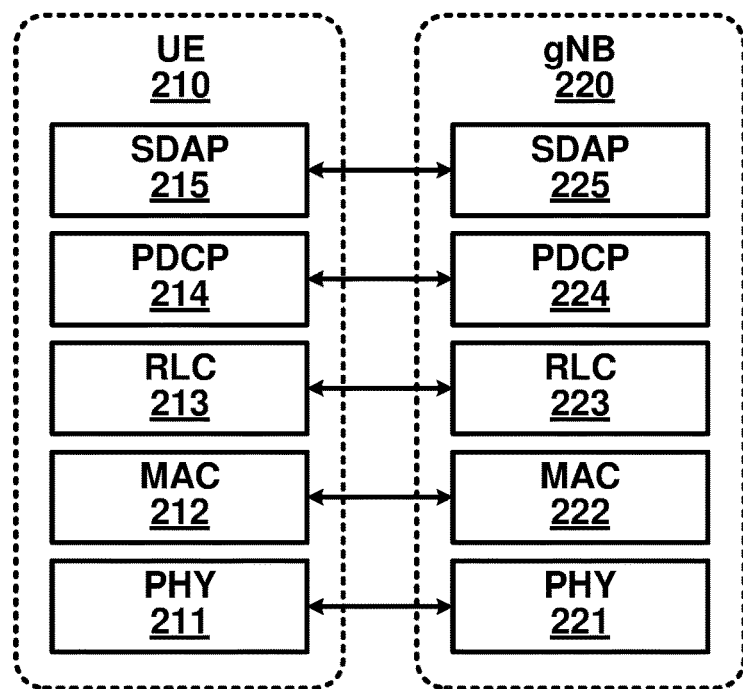
FIG. 2A and FIG. 2B respectively illustrate a New Radio (NR) user plane and control plane protocol stack.
Figure 2B:
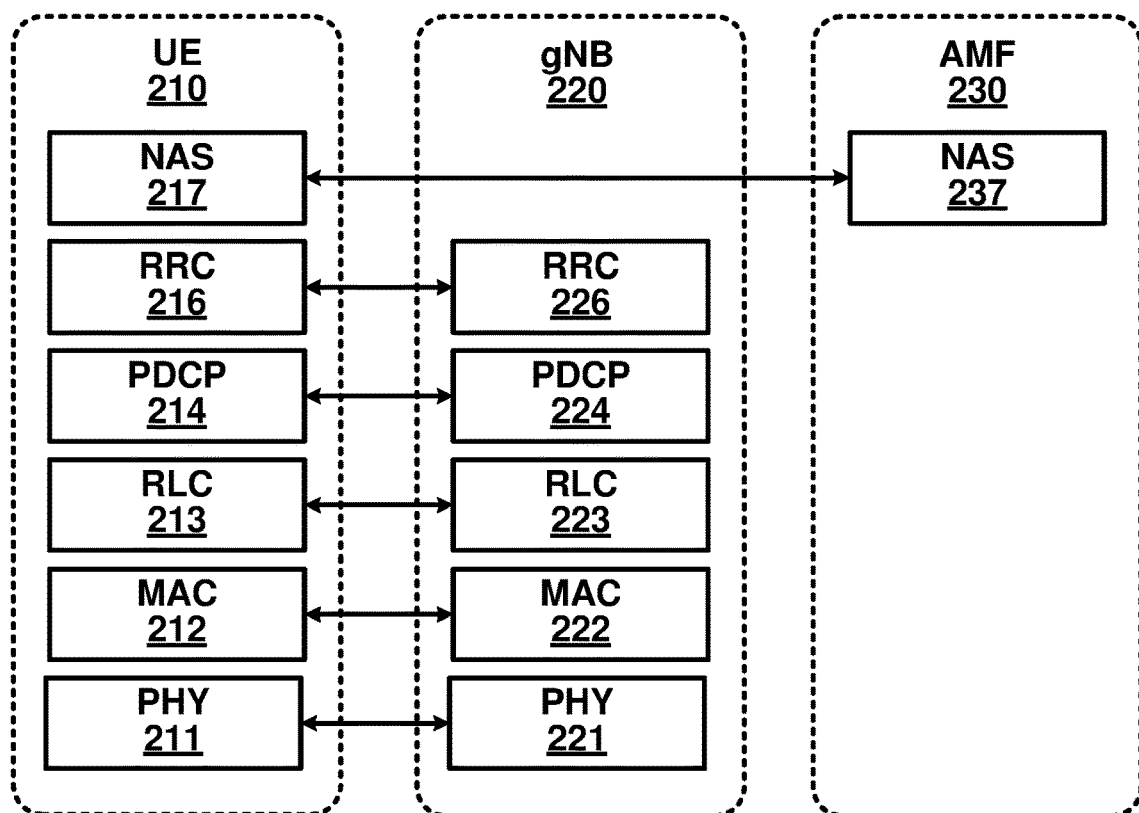

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
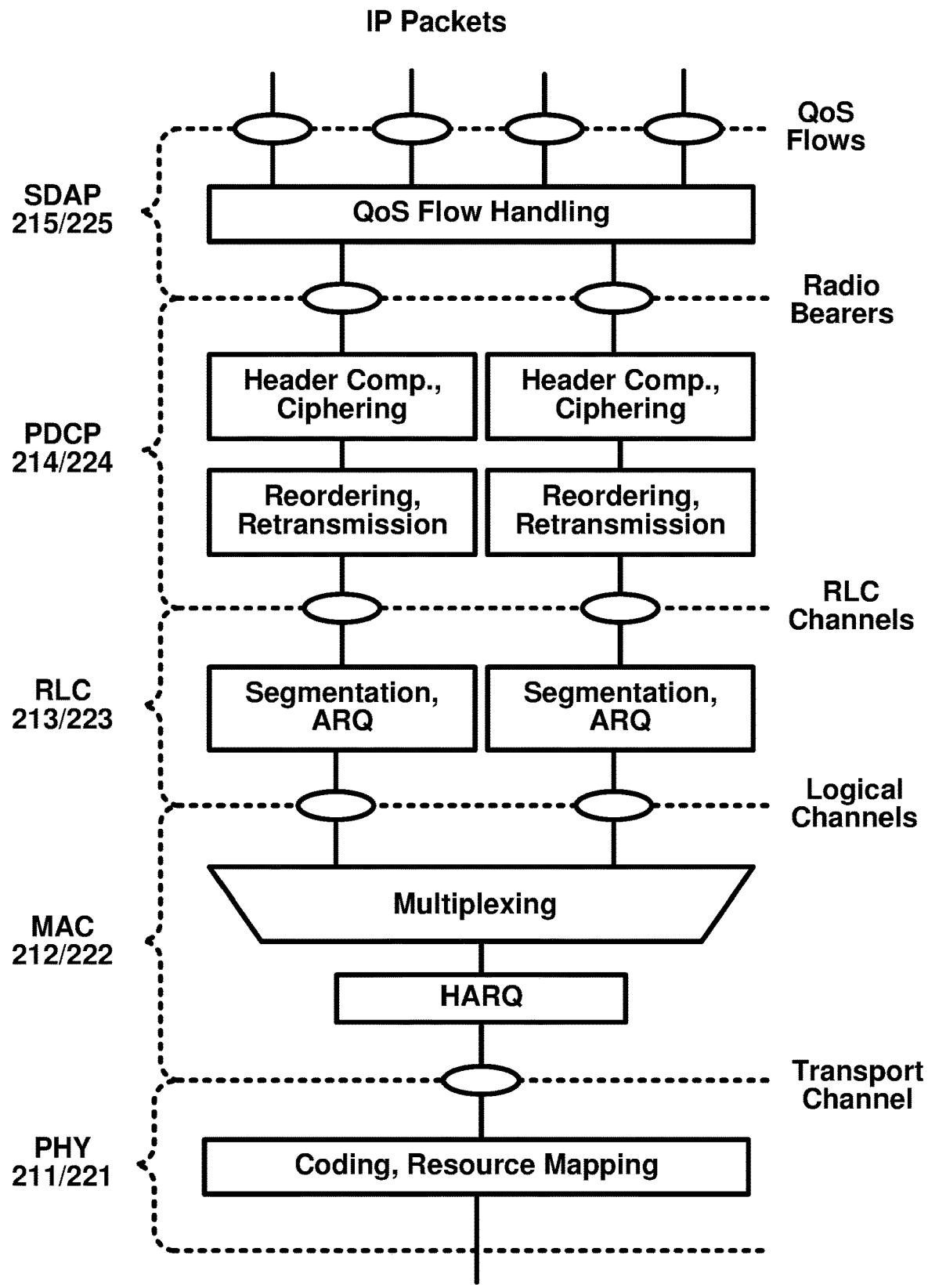
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
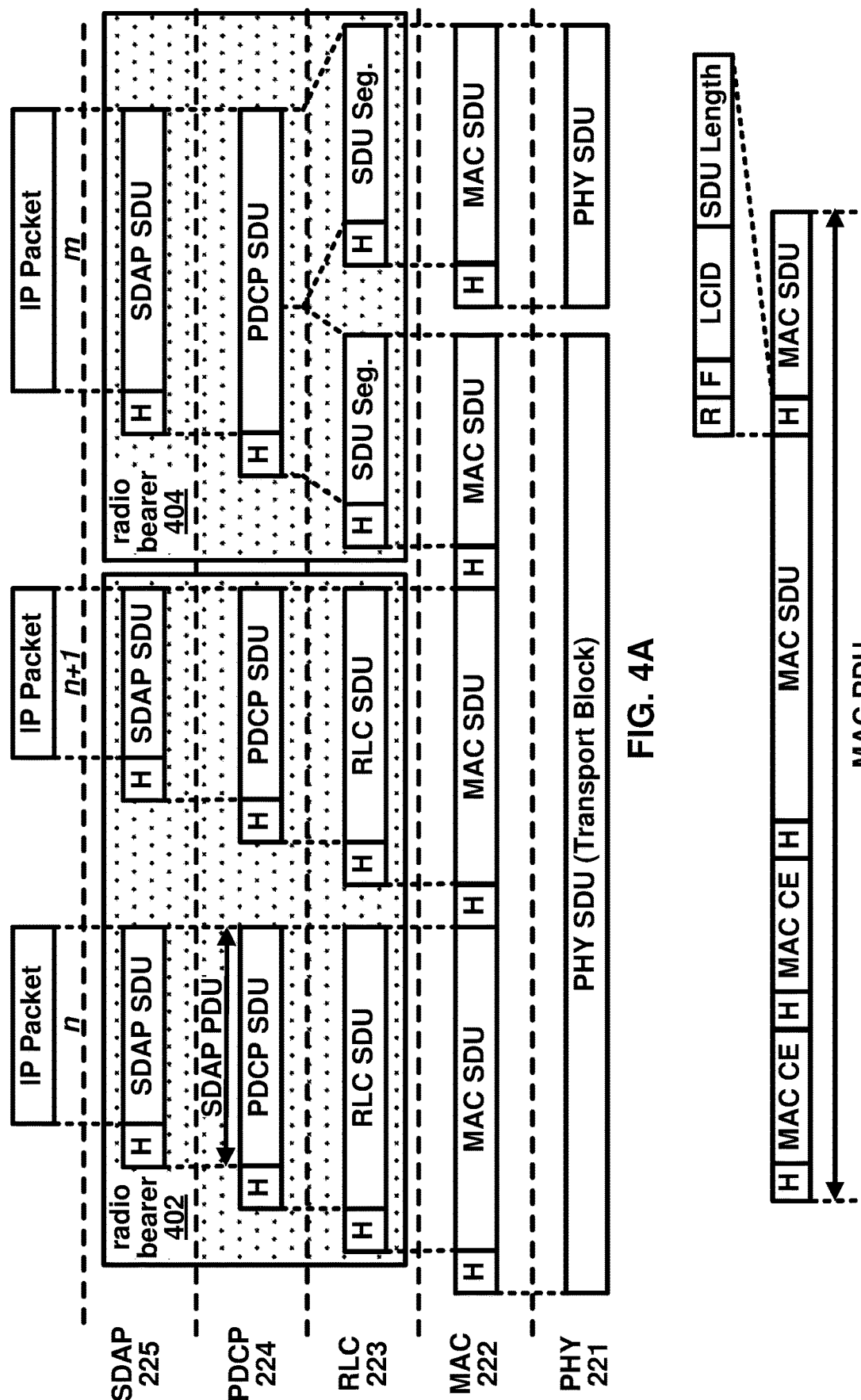
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
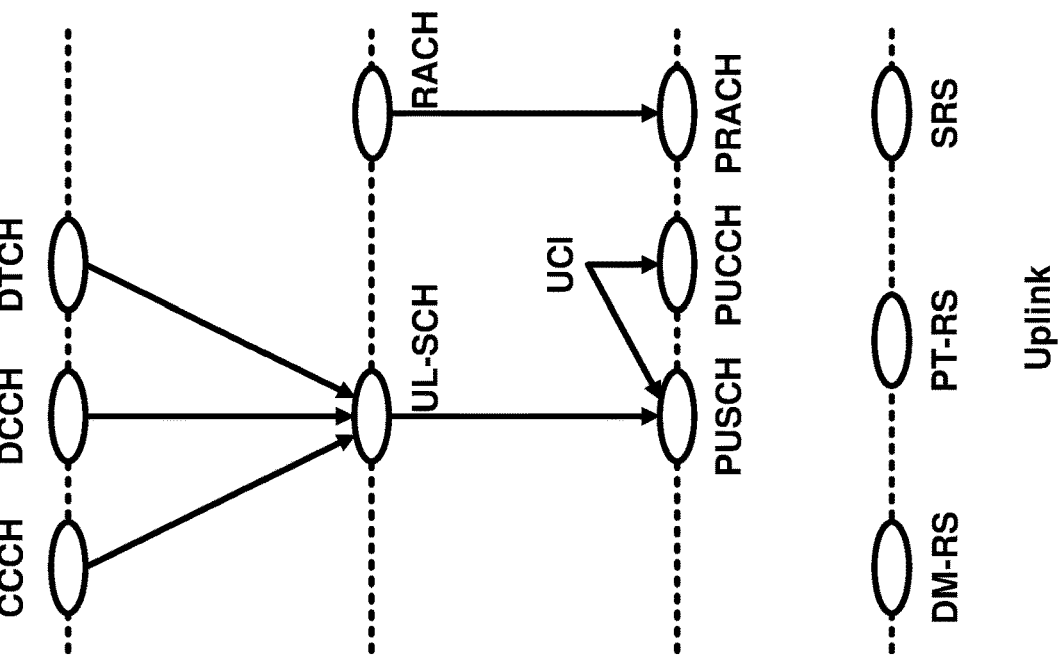
FIG. 5A and FIG. 5B respectively illustrate a mapping between logical channels, transport channels, and physical channels for the downlink and uplink.
Figure 5A:
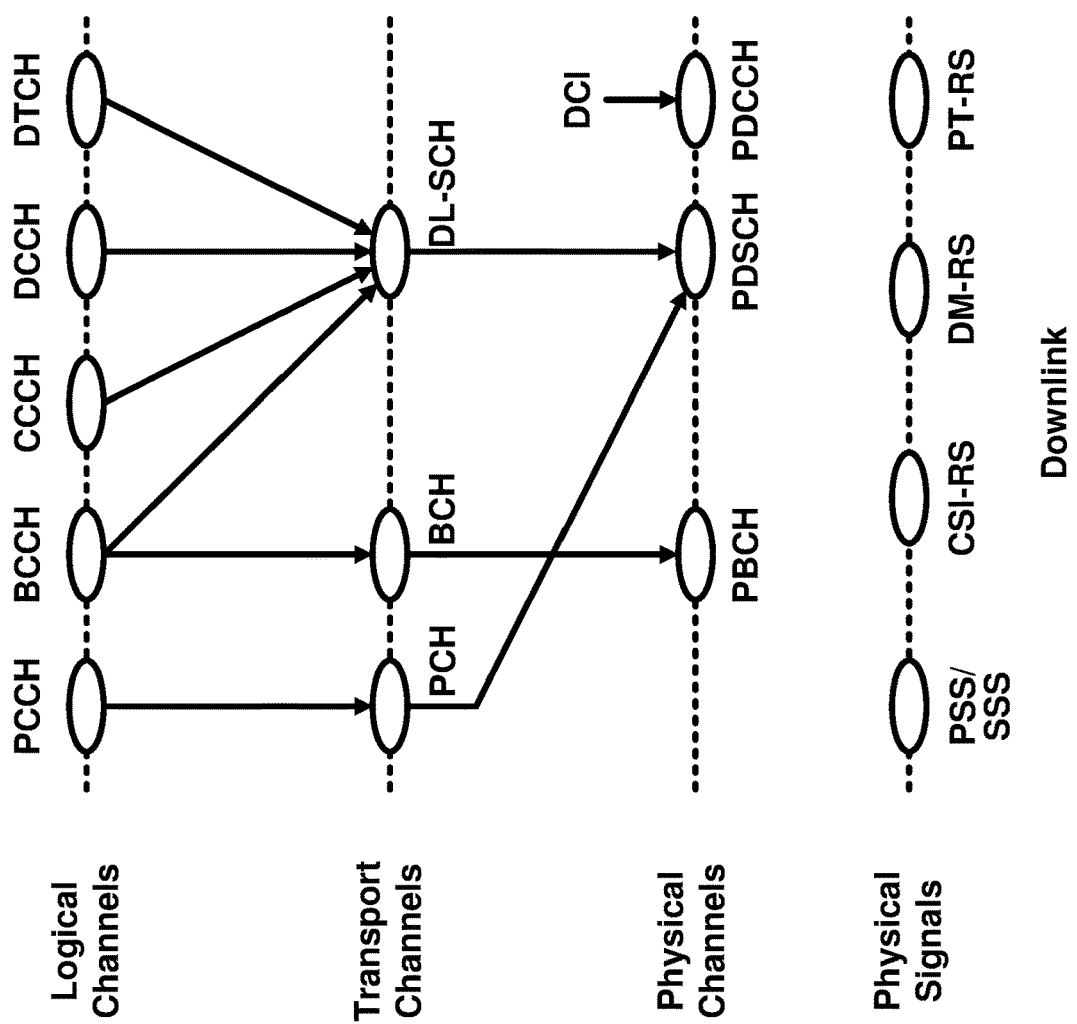

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
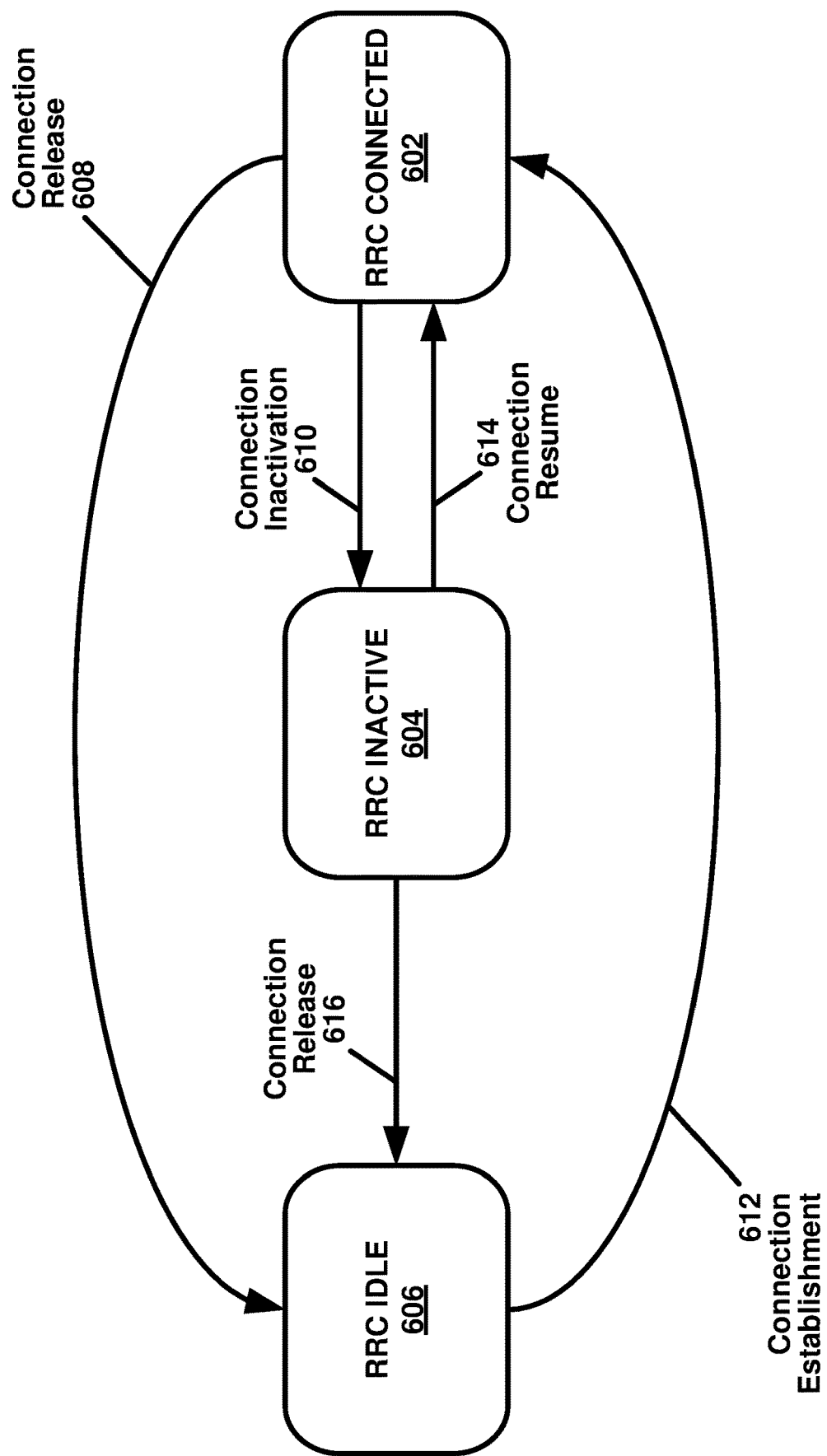
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
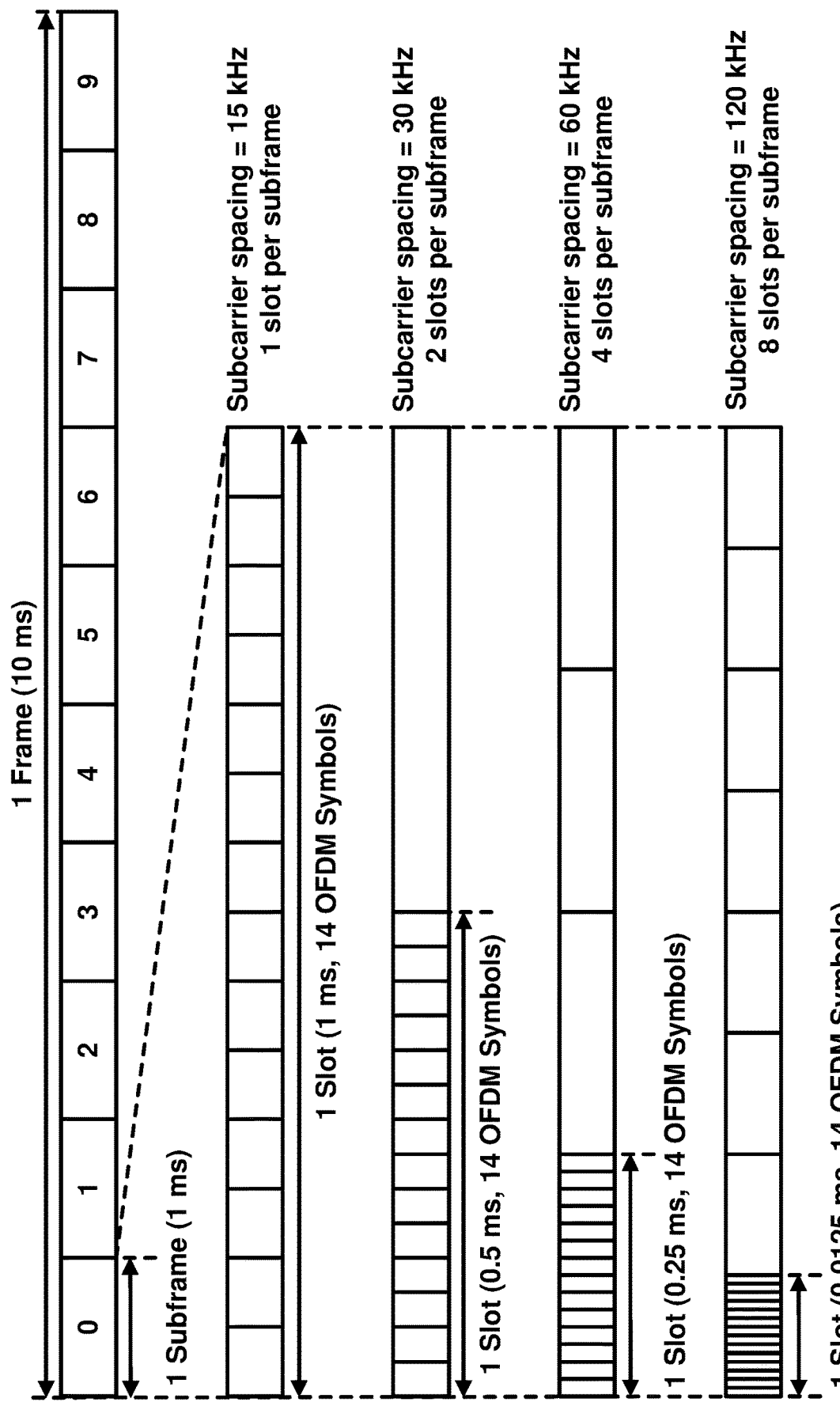
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
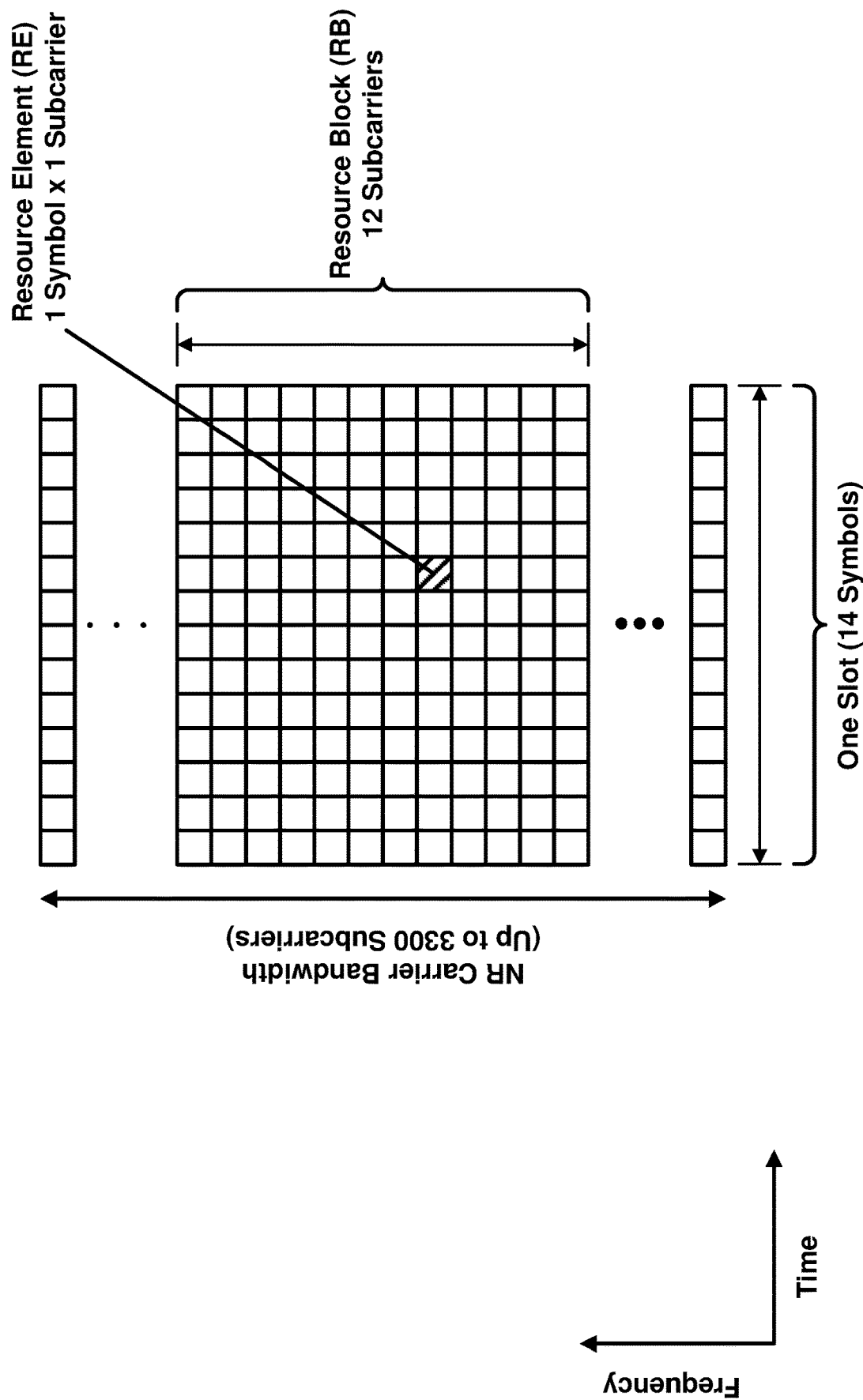
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
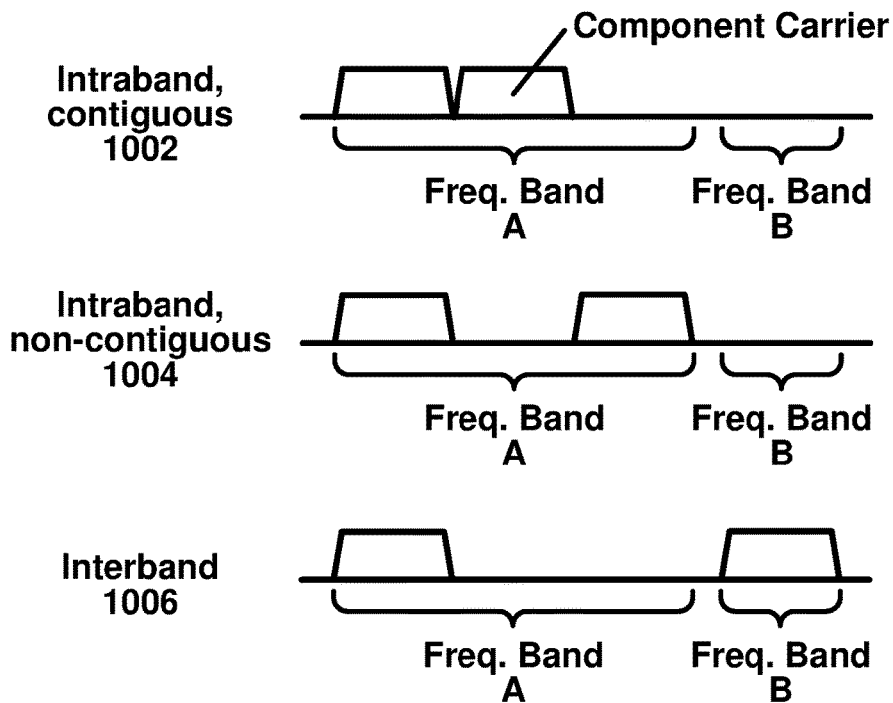
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
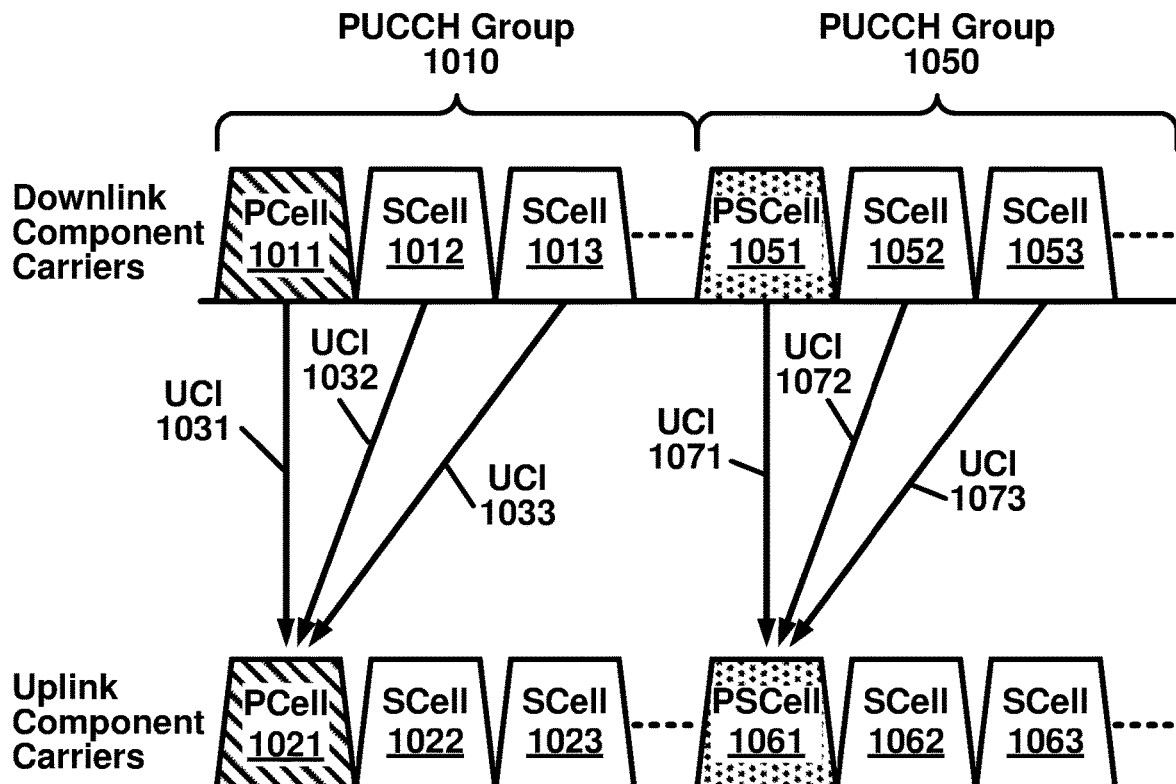
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
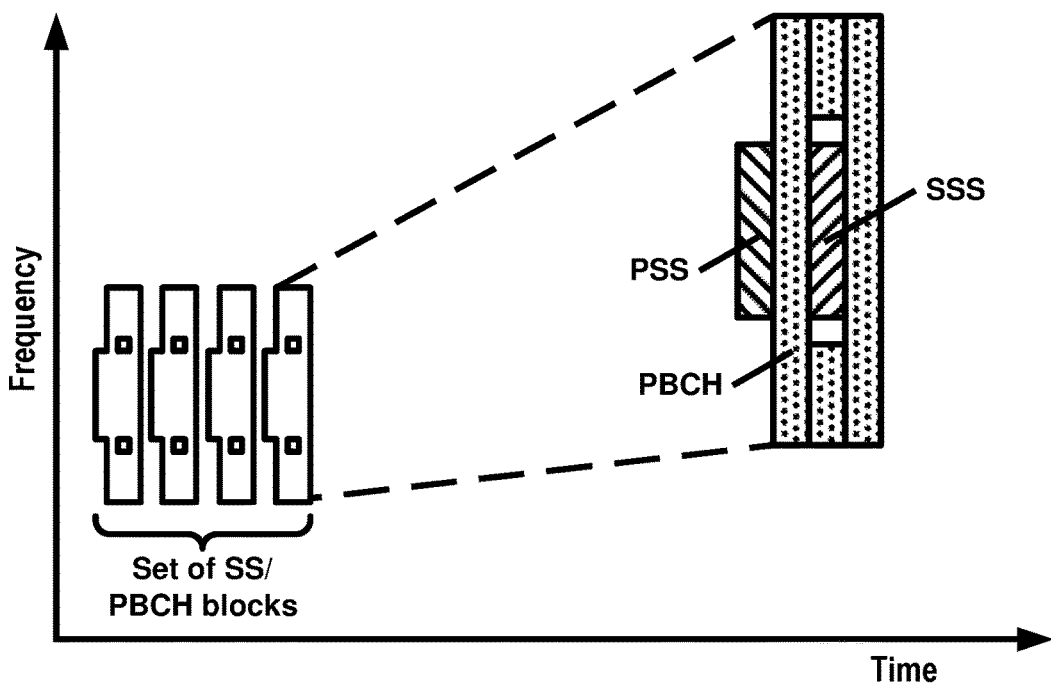
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
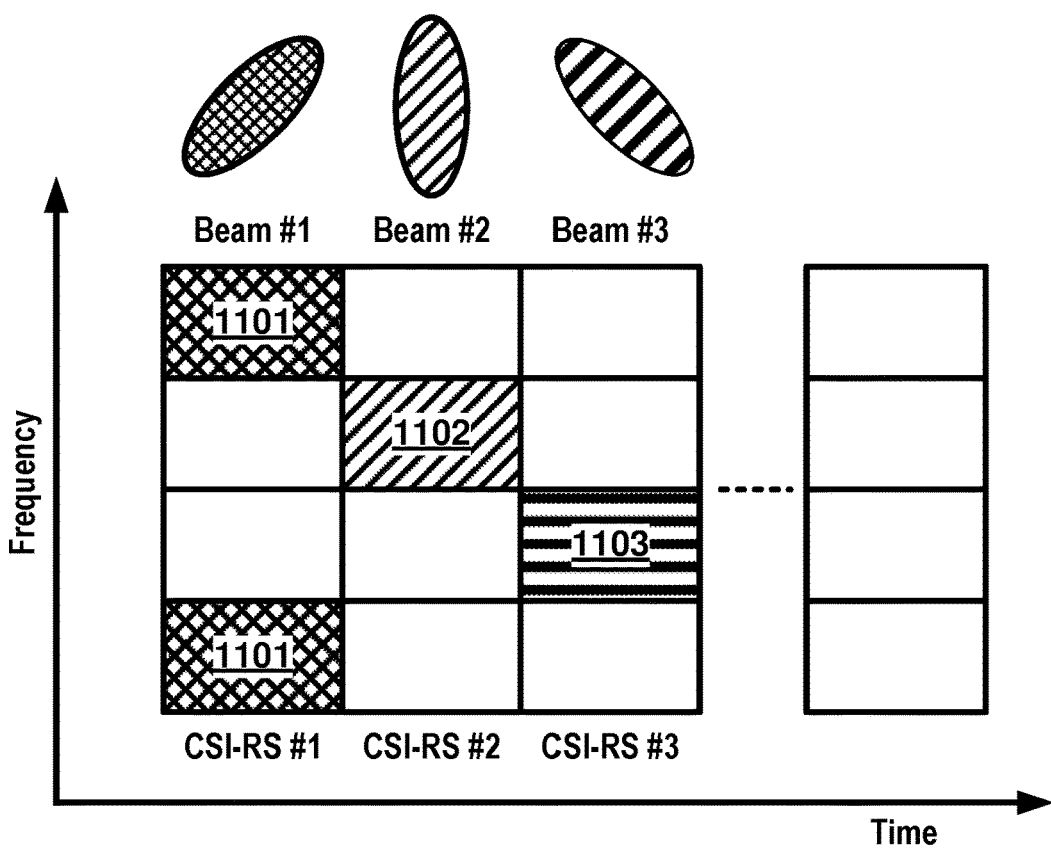
FIG. 11B illustrates an example of CSI-RSs that are mapped in the time and frequency domains.

FIG. 11B illustrates an example of channel state information reference signals (CSI-RS s) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (SEQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
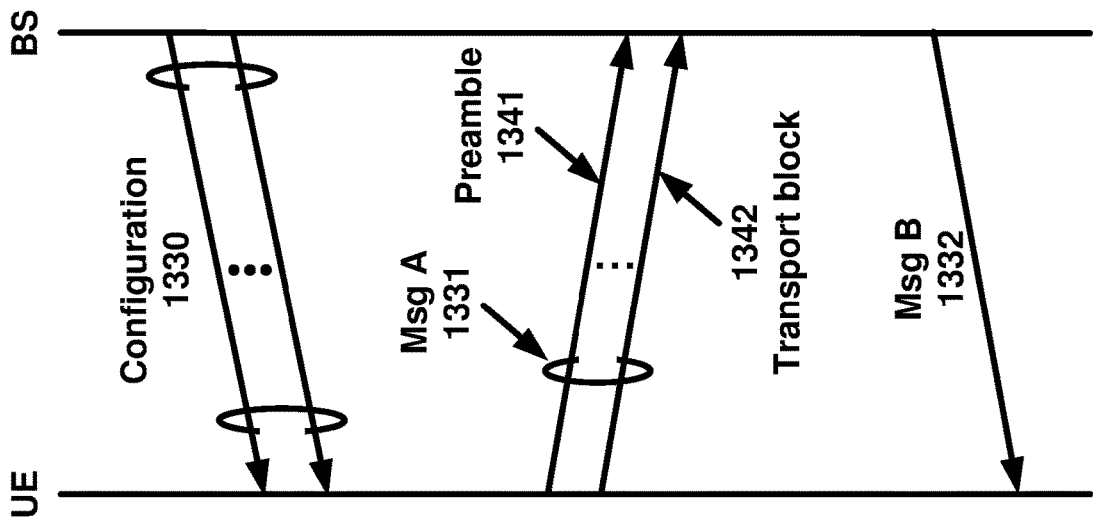
FIG. 13A, FIG. 13B, and FIG. 13C respectively illustrate a four-step contention-based random access procedure, a two-step contention-free random access procedure, and another two-step random access procedure.
Figure 13B:
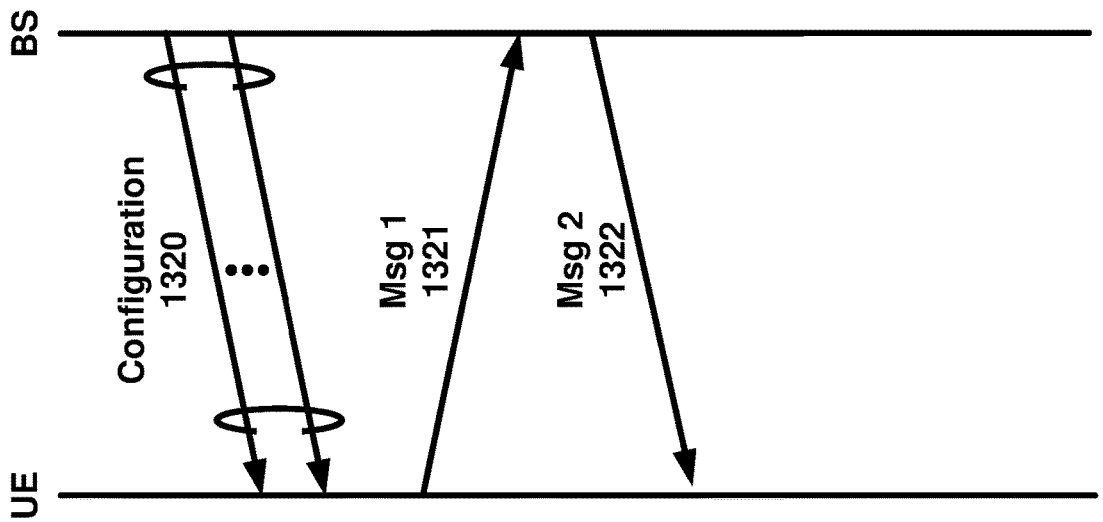
Figure 13A:
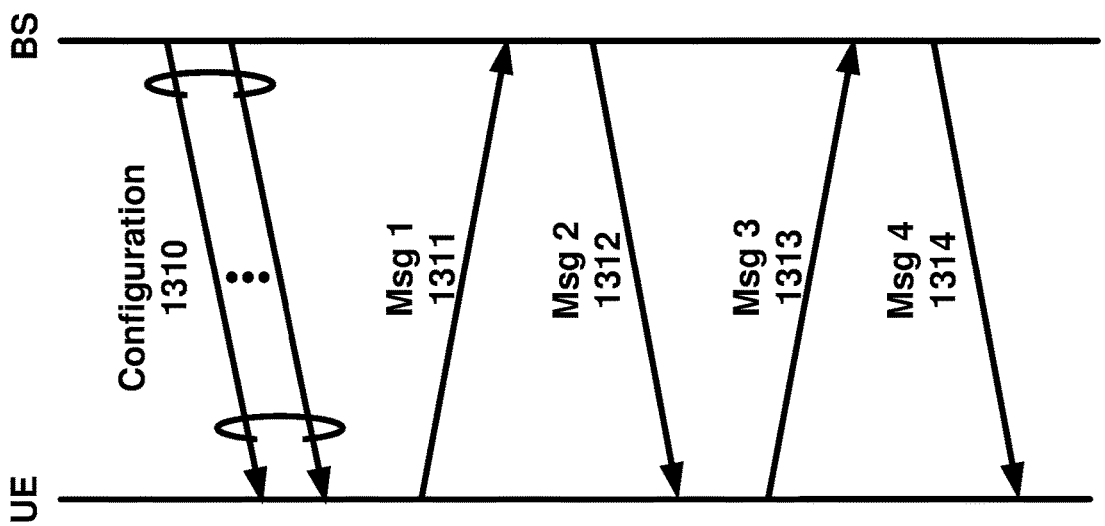

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), fid may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
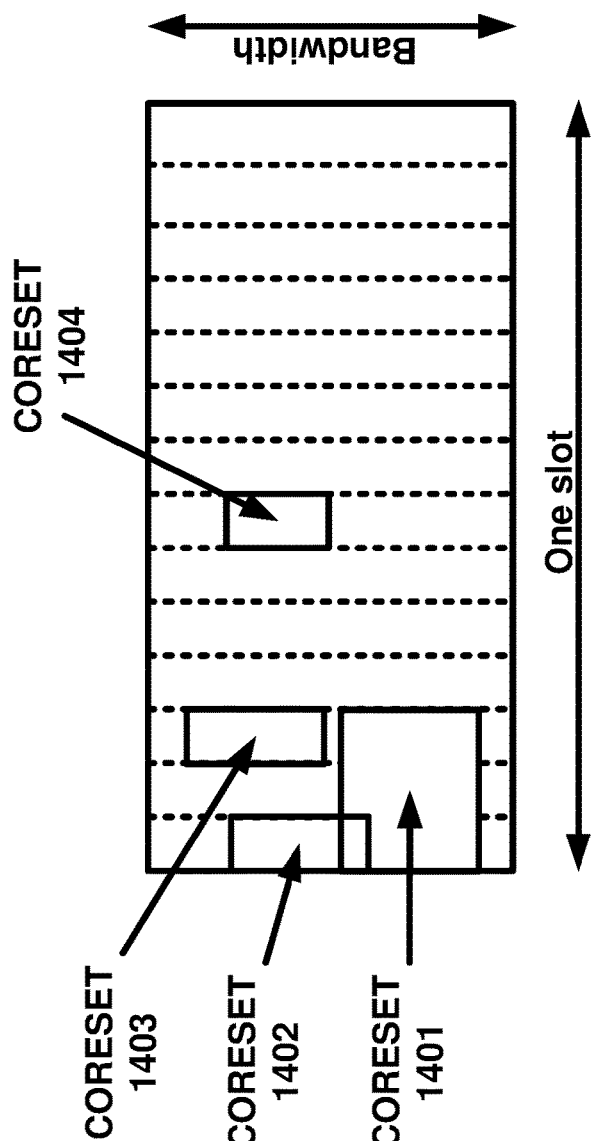
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
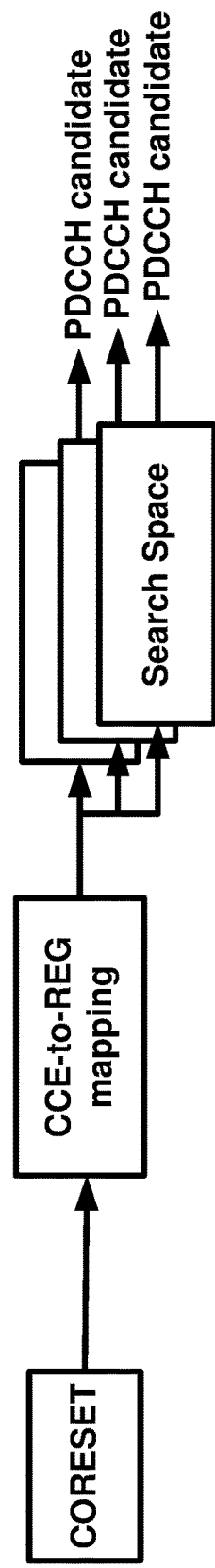
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
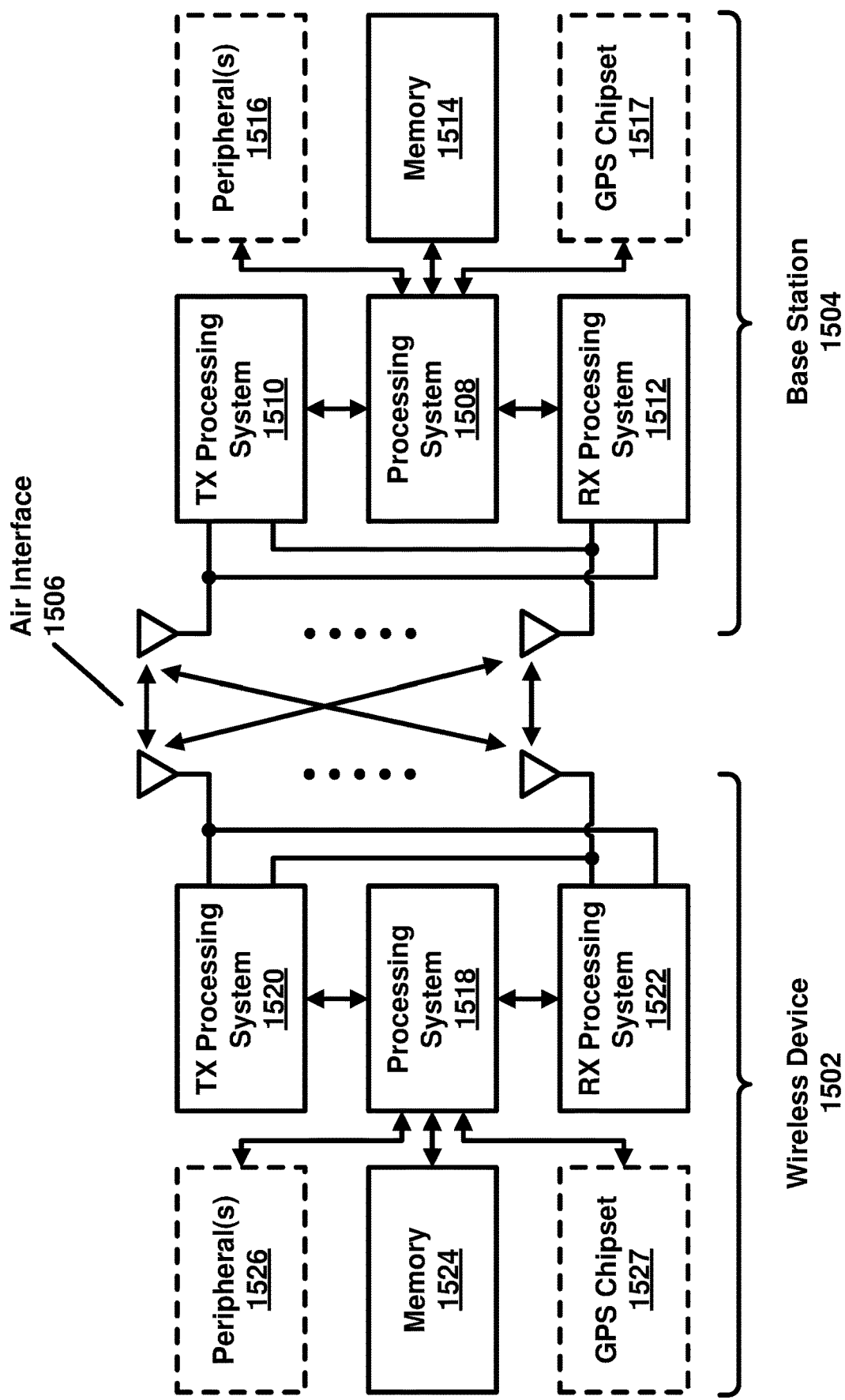
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
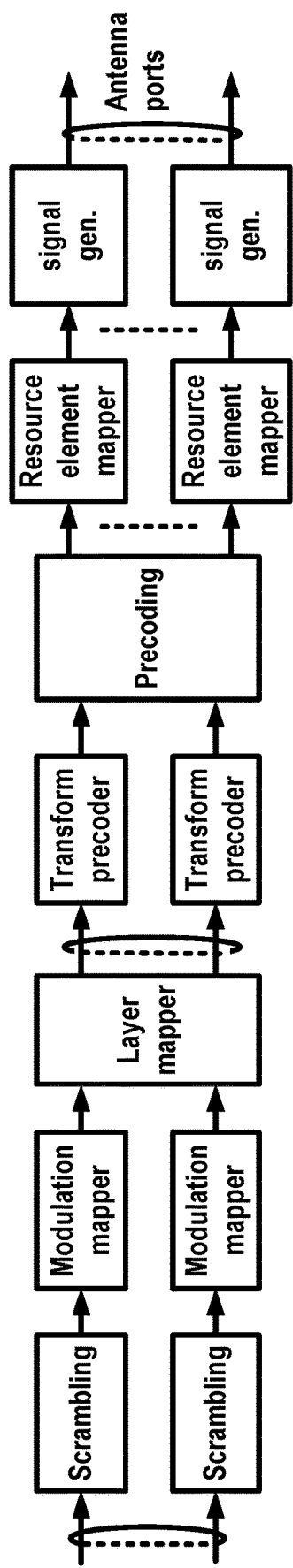
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16D:
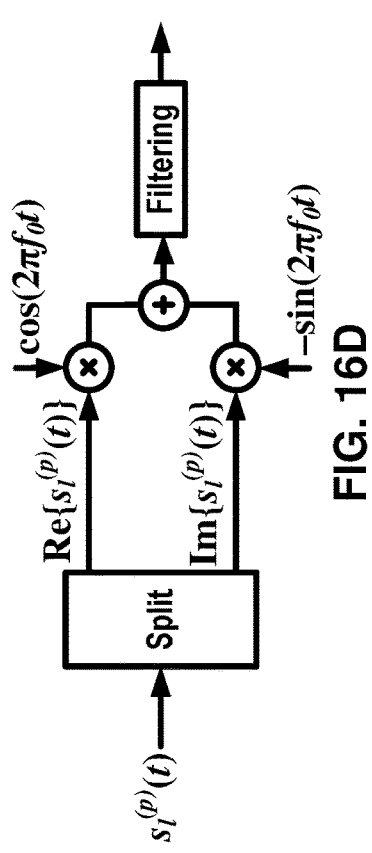
Figure 16B:
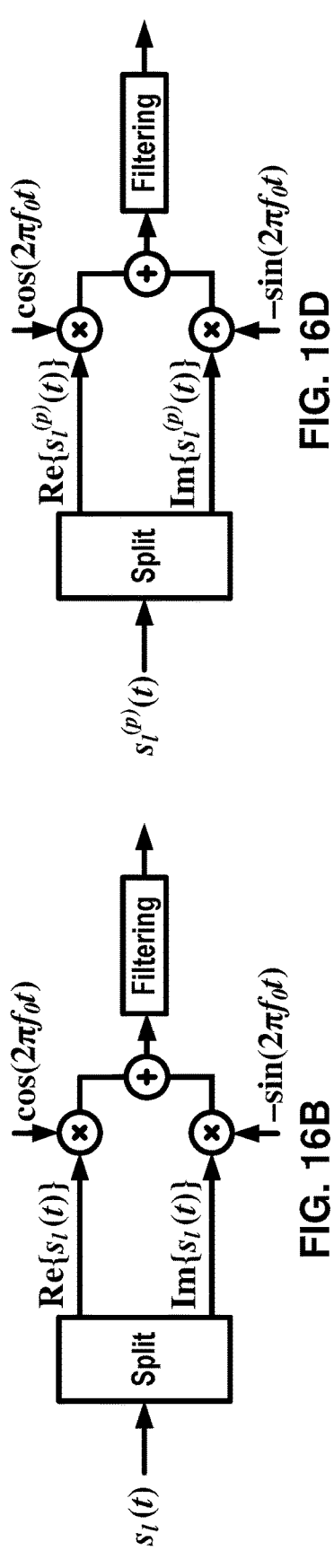

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16C:
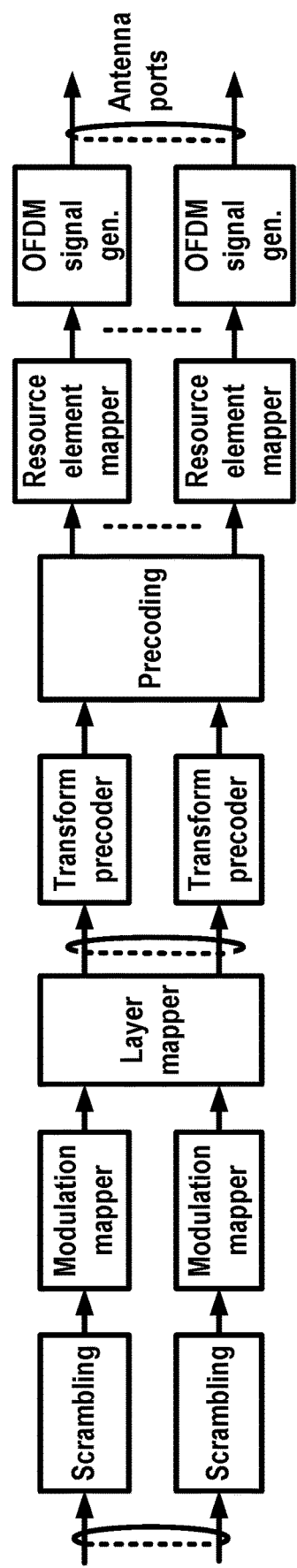

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning of very high data rates to meet customer expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

In an example embodiment, Listen-before-talk (LBT) may be implemented for transmission in an unlicensed cell. The unlicensed cell may be referred to as a LAA cell and/or a NR-U cell. The unlicensed cell may be operated as non-standalone with an anchor cell in a licensed band or standalone without an anchor cell in a licensed band. LBT may comprise a clear channel assessment (CCA). For example, in an LBT procedure, equipment may apply a CCA before using the unlicensed cell or channel. The CCA may comprise an energy detection that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed bands, such as the 5 GHz unlicensed band. Apart from regulatory requirements, carrier sensing via LBT may be one way for fairly sharing the unlicensed spectrum among different devices and/or networks attempting to utilize the unlicensed spectrum.

In an example embodiment, discontinuous transmission on an unlicensed band with limited maximum transmission duration may be enabled. Some of these functions may be supported by one or more signals to be transmitted from the beginning of a discontinuous downlink transmission in the unlicensed band. Channel reservation may be enabled by the transmission of signals, by an NR-U node, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed band with discontinuous downlink transmission may comprise one or more of the following: detection of the downlink transmission in unlicensed band (including cell identification) by wireless devices; time & frequency synchronization of wireless devices.

In an example embodiment, downlink transmission and frame structure design for operation in an unlicensed band may employ subframe, (mini-)slot, and/or symbol boundary alignment according to timing relationships across serving cells aggregated by carrier aggregation. This may not imply that base station transmissions start at the subframe, (mini-)slot, and/or symbol boundary. Unlicensed cell operation (e.g., LAA and/or NR-U) may support transmitting PDSCH, for example, when not all OFDM symbols are available for transmission in a subframe according to LBT. Delivery of necessary control information for the PDSCH may also be supported.

An LBT procedure may be employed for fair and friendly coexistence of a 3GPP system (e.g., LTE and/or NR) with other operators and technologies operating in unlicensed spectrum. For example, a node attempting to transmit on a carrier in unlicensed spectrum may perform a CCA as a part of an LBT procedure to determine if the channel is free for use. The LBT procedure may involve energy detection to determine if the channel is being used. For example, regulatory requirements in some regions, e.g., in Europe, specify an energy detection threshold such that if a node receives energy greater than the threshold, the node assumes that the channel is being used and not free. While nodes may follow such regulatory requirements, a node may optionally use a lower threshold for energy detection than that specified by regulatory requirements. A radio access technology (e.g., LTE and/or NR) may employ a mechanism to adaptively change the energy detection threshold. For example, NR-U may employ a mechanism to adaptively lower the energy detection threshold from an upper bound. An adaptation mechanism may not preclude static or semi-static setting of the threshold. In an example Category 4 LBT (CAT4 LBT) mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., a base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for Channel occupancy time (COT) sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

In an example, a wireless device may employ uplink (UL) LBT. The UL LBT may be different from a downlink (DL) LBT (e.g. by using different LBT mechanisms or parameters) for example, since the NR-U UL may be based on scheduled access which affects a wireless device's channel contention opportunities. Other considerations motivating a different UL LBT comprise, but are not limited to, multiplexing of multiple wireless devices in a subframe (slot, and/or mini-slot).

In an example, DL transmission burst(s) may be a continuous (unicast, multicast, broadcast, and/or combination thereof) transmission by a base station (e.g., to one or more wireless devices) on a carrier component (CC). UL transmission burst(s) may be a continuous transmission from one or more wireless devices to a base station on a CC. In an example, DL transmission burst(s) and UL transmission burst(s) on a CC in an unlicensed spectrum may be scheduled in a TDM manner over the same unlicensed carrier. Switching between DL transmission burst(s) and UL transmission burst(s) may require an LBT (e.g., CAT1 LBT, CAT2 LBT, CAT3 LBT, and/or CAT4 LBT). For example, an instant in time may be part of a DL transmission burst or an UL transmission burst.

Channel occupancy time (COT) sharing may be employed in NR-U. COT sharing may be a mechanism by which one or more wireless devices share a channel that is sensed as idle by at least one of the one or more wireless devices. For example, one or more first devices may occupy a channel via an LBT (e.g., the channel is sensed as idle based on CAT4 LBT) and one or more second devices may share the channel using an LBT (e.g., 25 us LBT) within a maximum COT (MCOT) limit. For example, the MCOT limit may be given per priority class, logical channel priority, and/or wireless device specific. COT sharing may allow a concession for UL in unlicensed band. For example, a base station may transmit an uplink grant to a wireless device for a UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission(s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated in one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via an RRC message) by a base station, and/or dynamically indicated (e.g., via an uplink grant) by a base station. The delay may not be accounted in the COT duration.

In an example, single and multiple DL to UL and UL to DL switching within a shared COT may be supported. Example LBT requirements to support single or multiple switching points, may comprise: for a gap of less than 16 us: no-LBT may be used; for a gap of above 16 us but does not exceed 25 us: one-shot LBT may be used; for single switching point, for a gap from DL transmission to UL transmission exceeds 25 us: one-shot LBT may be used; for multiple switching points, for a gap from DL transmission to UL transmission exceeds 25 us, one-shot LBT may be used.

In an example, a signal that facilitates its detection with low complexity may be useful for wireless device power saving, improved coexistence, spatial reuse at least within the same operator network, serving cell transmission burst acquisition, etc. In an example, a radio access technology (e.g., LTE and/or NR) may employ a signal comprising at least SS/PBCH block burst set transmission. Other channels and signals may be transmitted together as part of the signal. In an example, the signal may be a discovery reference signal (DRS). There may be no gap within a time span that the signal is transmitted at least within a beam. In an example, a gap may be defined for beam switching. In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for a first unlicensed band, e.g., in a 5 GHz unlicensed band. An initial active DL/UL BWP in one or more unlicensed bands may be similar (e.g., approximately 20 MHz in a 5 GHz and/or 6 GHz unlicensed spectrum), for example, if similar channelization is used in the one or more unlicensed bands (e.g., by a regulation).

In an example, HARQ acknowledge and negative acknowledge (A/N) for the corresponding data may be transmitted in a shared COT (e.g., with a CAT2 LBT). In some examples, the HARQ A/N may be transmitted in a separate COT (e.g., the separate COT may require a CAT4 LBT). In an example, when UL HARQ feedback is transmitted on unlicensed band, a radio access technology (e.g., LTE and/or NR) may support flexible triggering and multiplexing of HARQ feedback for one or more DL HARQ processes. HARQ process information may be defined independent of timing (e.g., time and/or frequency resource) of transmission. In an example, UCI on PUSCH may carry HARQ process ID, NDI, RVID. In an example, Downlink Feedback Information (DFI) may be used for transmission of HARQ feedback for configured grant.

In an example, CBRA and CFRA may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in one or more unlicensed bands may be supported. In an example, an NR cell with DL in unlicensed band and UL in licensed band or vice versa may be supported. In an example, dual connectivity between licensed band NR (PCell) and NR-U (PSCell) may be supported.

In an example, a radio access technology (e.g., LTE and/or NR) operating bandwidth may be an integer multiple of 20 MHz, for example, if absence of Wi-Fi cannot be guaranteed (e.g. by regulation) in an unlicensed band (e.g., 5 GHz, 6 GHZ, and/or sub-7 GHz) where the radio access technology (e.g., LTE and/or NR) is operating. In an example, a wireless device may performance or more LBTs in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used.

In an operation in an unlicensed band (e.g., LTE eLAA/feLAA and/or NR-U), a wireless device may measure (averaged) received signal strength indicator (RSSI) and/or may determine a channel occupancy (CO) of one or more channels. For example, the wireless device may report channel occupancy and/or RSSI measurements to the base station. It may be beneficial to report a metric to represent channel occupancy and/or medium contention. The channel occupancy may be defined as a portion (e.g., percentage) of time that RSSI was measured above a configured threshold. The RSSI and the CO measurement reports may assist the base station to detect the hidden node and/or to achieve a load balanced channel access to reduce the channel access collisions.

Channel congestion may cause an LBT failure. The probability of successful LBT may be increased for random access and/or for data transmission if, for example, the wireless device selects the cell/BWP/channel with the lowest channel congestion or load. For example, channel occupancy aware RACH procedure may be considered to reduce LBT failure. For example, the random access backoff time for the wireless device may be adjusted based on channel conditions (e.g., based on channel occupancy and/or RSSI measurements). For example, a base station may (semi-statically and/or dynamically) transmit a random access backoff. For example, the random access backoff may be predefined. For example, the random access backoff may be incremented after or in response to one or more random access response reception failures corresponding to one or more random access preamble attempts.

The carrier aggregation with at least one SCell operating in the unlicensed spectrum may be referred to as Licensed-Assisted Access (LAA). In LAA, the configured set of serving cells for a UE may include at least one SCell operating in the unlicensed spectrum according to a first frame structure (e.g., frame structure Type 3). The SCell may be called LAA SCell.

In an example, if the absence of IEEE802.11n/11ac devices sharing the carrier cannot be guaranteed on a long term basis (e.g., by level of regulation), and for if the maximum number of unlicensed channels that network may simultaneously transmit on is equal to or less than 4, the maximum frequency separation between any two carrier center frequencies on which LAA SCell transmissions are performed may be less than or equal to 62 MHz. In an example, the UE may be required to support frequency separation.

In an example, base station and UE may apply Listen-Before-Talk (LBT) before performing a transmission on LAA SCell. When LBT is applied, the transmitter may listen to/sense the channel to determine whether the channel is free or busy. If the channel is determined to be free/clear, the transmitter may perform the transmission; otherwise, it may not perform the transmission. In an example, if base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the UE applies may be signaled via uplink grant for uplink PUSCH transmission on LAA SCells. In an example, for Autonomous Uplink (AUL) transmissions the LBT may not be signaled in the uplink grant.

In an example, for type 1 uplink channel access on AUL, base station may signal the Channel Access Priority Class for a logical channel and UE may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the UE may select logical channels corresponding to any Channel Access Priority Class for UL transmission in the subframes signaled by base station in common downlink control signaling.

In an example, for uplink LAA operation, the base station may not schedule the UE more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the UE if type 1 uplink channel access procedure is signaled to the UE; and/or Channel Access Priority Class used by the base station based on the downlink traffic, the latest BSR and received UL traffic from the UE if type 2 uplink channel access procedure is signaled to the UE.

In an example, a first number (e.g., four) Channel Access Priority Classes may be used when performing uplink and downlink transmissions in LAA carriers. In an example in FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by taking into account the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)>P may be included in the DL transmission burst once no more data corresponding to Channel Access Priority Class≤P is available for transmission. In such cases, base station may maximize occupancy of the remaining transmission resources in the DL transmission burst with this additional traffic.

In an example, when the PDCCH of an LAA SCell is configured, if cross-carrier scheduling applies to uplink transmission, it may be scheduled for downlink transmission via its PDCCH and for uplink transmission via the PDCCH of one other serving cell. In an example, when the PDCCH of an LAA SCell is configured, if self-scheduling applies to both uplink transmission and downlink transmission, it may be scheduled for uplink transmission and downlink transmission via its PDCCH.

In an example, Autonomous uplink may be supported on the SCells. In an example, one or more autonomous uplink configuration may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the UE implementation from the HARQ process IDs that are configured for autonomous UL HARQ operation by upper layers for example, in aul-harq-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmissionTimer which may prohibit new transmission or retransmission for the same HARQ process when the timer is running.

In an example, when the HARQ feedback is received for a TB, the HARQ process may set HARQ_FEEDBACK to the received value; and may stop the aul-retransmissionTimer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEEDBACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the UE detects on the scheduling cell for UL transmissions on an LAA SCell a transmission of DCI (e.g., Format 0A/4A) with the CRC scrambled by AUL C-RNTI carrying AUL-DFI, the UE may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the UE may expect HARQ-ACK feedback in the AUL-DFI at earliest in subframe n+4; If the UE receives AUL-DFI in a subframe indicating ACK for a HARQ process, the UE may not be expected to receive AUL-DFI indicating ACK for the same HARQ process prior to 4 ms after the UE transmits another uplink transmission associated with that HARQ process;

In an example, a UE may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, a base station may configure consecutive configured grant resources in time. There may be no gaps between the consecutive configured grant resources. In an example, the base station may configure non-consecutive configured grant resources. In an example, the non-consecutive configured grant resources may have a periodicity. In an example, the non-consecutive configured grant resources may be non-periodic. In an example, a first pattern of configured grant resources may be repeated in time wherein the resources of the first configured resources are non-periodic.

In an example, a wireless device may select an HARQ process ID from an RRC configured set of HARQ IDs for transmission of packet via a configured grant resource on an unlicensed cell.

In an example, a downlink control information may comprise downlink feedback information (DFI), wherein the DFI includes pending HARQ ACK feedback for prior configured grant transmissions from the same UE. In an example, DFI may include HARQ feedback for dynamically scheduled UL transmissions using HARQ IDs configured for NR-unlicensed configured grant transmission.

In an example, a packet/transport block corresponding to a HARQ process that was initially transmitted via a configured grant resource may be retransmitted via a configured grant resource. In an example, a packet/transport block corresponding to a HARQ process that was initially transmitted via a configured grant resource may be retransmitted via resources dynamically scheduled by an UL grant. In an example, a wireless device may autonomously initiate retransmission for a HARQ process that was initially transmitted via configured grant mechanism for NR-unlicensed when a NACK is received (e.g., via DFI) for the corresponding HARQ process. In an example, a wireless device may autonomously initiate retransmission for a HARQ process that was initially transmitted via configured grant mechanism for NR-unlicensed when no feedback is received gNB before a timer is expired.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, HARQ A/N for the corresponding data may be transmitted in the same shared COT. In some examples, the HARQ A/N may be transmitted in a separate COT from the one the corresponding data was transmitted.

In an example, when UL HARQ feedback is transmitted on unlicensed band, NR-U may consider mechanisms to support flexible triggering and multiplexing of HARQ feedback for one or more DL HARQ processes.

In an example, the dependencies of HARQ process information to the timing may be removed. In an example, UCI on PUSCH may carry HARQ process ID, NDI, RVID. In an example, Downlink Feedback Information (DFI) may be used for transmission of HARQ feedback for configured grant.

In an example, both CBRA and CFRA may be supported on NR-U SpCell and CFRA may be supported on NR-U SCells. In an example, RAR may be transmitted via SpCell. In an example, a predefined HARQ process ID for RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in unlicensed spectrum may be supported. In an example, an NR cell with DL in unlicensed band and UL in licensed band may be supported. In an example, dual connectivity between licensed band NR (PCell) and NR-U (PSCell) may be supported.

In an example, if absence of Wi-Fi cannot be guaranteed (e.g. by regulation) in a band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz, also known as subbands. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used. In an example, preamble detection may be used.

In an example, with scheduled PUSCH transmissions on an unlicensed carrier, the network first needs to gain access to the channel to transmit PDCCH and then the UE needs to perform LBT again prior to transmitting on the resource. Such procedure tends to increase latency especially when the channel is loaded. In an example, a mechanism of autonomous uplink transmission may be used. In an example, a UE may be pre-allocated a resource for transmission similar to UL SPS and performs LBT prior to using the resource. In an example, autonomous uplink may be based on the Configured Grant functionality (e.g., Type 1 and/or Type 2).

In an example, the HARQ process identity may be transmitted by the UE (e.g., as UCI). This may enable a UE to use the first available transmission opportunity irrespective of the HARQ process. In an example, UCI on PUSCH may be used to carry HARQ process ID, NDI and RVID.

For unlicensed band, UL dynamic grant scheduled transmission may increase the delay and transmission failure possibility due to at least two LBTs of UE and gNB. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, UE may autonomously select one HARQ process ID which is informed to gNB by UCI.

In an example, a UE may perform non-adaptive retransmission with the configured uplink grant. When dynamic grant for configured grant retransmission is blocked due to LBT, UE may try to transmit in the next available resource with configured grant.

In an example, Downlink Feedback Information (DFI) may be transmitted (e.g., using DCI) may include HARQ feedback for configured grant transmission. The UE may perform transmission/retransmission using configured grant according to DFI including HARQ feedback. In an example, wideband carrier with more than one channels is supported on NR-based unlicensed cell.

In an example, UE multiplexing and collision avoidance mechanisms between configured grant transmissions and between configured grant and scheduled grant transmissions may be used.

In an implementation, NR-unlicensed configured grant transmission may not be allowed during the time when it overlaps with occasions configured for potential NR-U DRS of the serving cell.

In an example, an RRC configured bitmap may be used to the allowed time resource for configured grant transmission on subframe/slot/symbol level. For example, in FeLAA, an RRC configured bitmap of 40 bits may be used. Such a mechanism may provide flexibility to assign or exclude certain subframes/slots/symbols for configured UL.

In an example, RRC signaling may indicate (e.g., for Type 1 configured grants) the time domain resource allocation e.g., periodicity, offset in the frame, start symbol and length of PUSCH and K-repetition of the configured grant resource. In an example for Type 2 configured grant, RRC may indicate periodicity and K-repetition in time domain. The other time domain related parameters may be given through DCI activation scrambled with a corresponding RNTI for configured grants (e.g., CS-RNTI). In an example, some enhancements may be used in different application scenario such as URLLC. For example, the granularity of time domain allocation may be based on slot instead of OFDM symbol. In an example, the K-repetition may be reinterpreted as number of configured resource within a period. In an example, UE may start configured grant transmission from any configured resource boundary and occupy any number of the configured resource.

In an example, resource allocation in NR-U may be based on frequency interlaces. In an example, to comply with the regulatory requirements in the unlicensed spectrum such as the minimum OCB and maximum PSD requirements, the resource configuration may include the frequency interlace(s) to be used within the configured frequency resources.

In an example, a wireless device may be configured with a wideband carrier and/or a wideband UL BWP that spans multiple subbands. In an example a subband may be a 20 MHz unlicensed channel. In order to increase the resiliency to LBT failure, a wireless device may be configured with a frequency-domain resource, e.g., one or more frequency interlaces, across multiple subbands. In an example, a wireless device may perform multiple subband LBT procedures. Based on the results of the subband LBT procedures, the wireless device may transmit on one or more subbands for which the LBT procedure(s) are successful. In an example, the wireless device may select the number of subbands to use based on the traffic type or the TB size.

In an example, for the uplink transmission with configured grant in NR-U, configuration of frequency-domain resources may include one or more frequency interlaces. In an example, frequency-domain resources may be configured across multiple subbands of a wideband UL BWP configured to the UE for transmission with configured grant in NR-U.

In an example, a wireless device operating in unlicensed bands may be transmitting uplink packets from different traffic classes (e.g., QCIs) with different latency and/or bit rate requirements for which a single resource configuration, e.g., periodicity and TBS, may not be adequate. In an example, a wireless device may be configured with multiple active UL configured grants in a BWP of a cell. A wireless device may be configured with multiple resource configurations per UE for the uplink transmission with configured grant to satisfy the diverse QoS requirements anticipated in NR-U.

In an example, to improve the resource utilization with pre-configured resources one or more wireless devices may be configured with same time-domain resources, and either orthogonal or same frequency interlaces on the same unlicensed channel. In an example, the transmission starting points of the one or more wireless devices may be aligned to avoid mutual blocking during the LBT. In an example, if a collision occurs, the receiving base station may identify the UEs using other pre-configured resources, such as DMRS, and resolve the collision in the spatial or code domains.

Due to the uncertainty of the unlicensed channel availability in NR-U, a UE with data ready to transmit may not gain access to the pre-configured resources as a result of LBT failure. The missing of the pre-configured transmission opportunity may lead to underutilized resources and/or excessive latencies. In an example, the wireless device that missed a pre-configured periodic transmission opportunity may defer its channel access for the remaining time span of the configured period until the following transmission opportunity.

In an example, a wireless device may be configured with multiple transmission occasions over the pre-configured time-domain resource within a CG period. In an example, before the beginning of the pre-configured period, the wireless device may perform the LBT procedure towards accessing the first transmission occasion/burst starting position. If the LBT is successful, the UE may start transmitting one or more PUSCHs up to the end of the CG resource within the pre-configured period. In an example, if the LBT fails, the UE may not defer the channel access for the remaining period. The wireless device may resume its channel access attempt by performing LBT towards accessing the second transmission occasion, and so on.

In an example, a base station may dynamically allow a group of wireless devices to transmit on additional resources in accordance with a configured grant (for example except for periodicity and time offset) by sending a DL common alignment signal such as a DCI. In an example, the DCI may be scrambled by a group ID.

In an example, transmission start time of multiple UEs configured with the same time-domain resources and either same or orthogonal frequency interlaces on a given unlicensed channel may be aligned. In an example, base station may align uplink transmission with configured grant using an Alignment Signal (e.g., a group common DCI).

In an example, a retransmission may be scheduled with an uplink grant for a HARQ process that was initially transmitted with configured grant.

In an example, UCI multiplexed with data and transmitted via PUSCH may carry HARQ process ID, NDI, RVID and other information related to the transmitted data. UCI multiplexed with data and carrying information related to data may need to be encoded and decoded separately before the data to enable the soft combining of the packet at the base station.

In an example, the HARQ process ID may be determined based on the frequency interlace and/or the DMRS cyclic shift (such that initial and retransmission of a UE TB may be identified).

In an example, the base station may provide pending HARQ feedback for one or more PUSCH transmitted with configured grant within previous UL bursts using a GC-DCI scrambled with a group RNTI.

In an example, a base station may perform a CAT4 LBT and acquire an MCOT. The base station may transmit a DL Alignment signal to trigger a transmission from one or more UEs based on the configured grant. The UEs with data to transmit may share the base station acquired MCOT and either access the channel immediately, if the PUSCH transmission can start after gap that is less than 16 pec or using CAT2 LBT otherwise. In such case, the UEs transmitting in response to the DL Alignment signal limit their COT by the gNB-acquired MCOT.

In an example, the base station may provide HARQ feedback for one or more PUSCH transmitted with CG within the UE-acquired MCOT in either a GC-DCI or frequency multiplexed UE-specific DCIs. The base station share one or more UE-acquired MCOT(s) and access the channel with CAT2 LBT.

In an example, a wireless device may update its configured-grant transmission parameters such as MCS, RI and PMI, and indicate the changes to the base station within the uplink burst. In an example, a pre-configured pool of pilot signals may indicate the change, e.g., DMRS and cyclic shifts. In an example, UCI multiplexed with PUSCH may indicate the UE updated transmission parameters.

In an example, the base station may update the configured grant transmission parameters, e.g., based on received signal quality such as SINR or BLER, and indicate the new parameters in a DCI. In an example, the base station may use a GC-DCI. In an example, a UE-specific DCI may be used.

In an example, multiple candidate transmission occasions within a period may be configured. In an example, the candidate transmission occasions within a period can be configured by network or derived by UE according to the configuration. In an example, for NR-U UL configured grant, a wireless device may determine multiple candidate transmission occasions within a period. In an example, the multiple transmission occasions may be based on the first candidate transmission occasion, duration of PUSCH and period P.

In an example, a wireless device may perform multiple LBTs when it is configured with a BWP with frequency bandwidth larger than 20 MHz for UL configured grant transmission. In an example, if a subband is sensed to be busy, UE may not transmit an UL signal in the active BWP on the unlicensed spectrum. In an example, UE may transmit the UL signal unless all the subbands of the frequency bandwidth are sensed to be idle.

In an example, a wireless device may have multiple frequency resource allocations per BWP. In an example, a UE may be configured with multiple configured grant resource configurations in a BWP by RRC. Multiple configured grant configurations may be activated and different configured grant configurations may have different combinations of subbands. In an example, a configuration may be indexed, and the index may be carried by the activation/deactivation DCI to indicate the target configuration. In an example, for NR-U UL configured grant, multiple resource configurations may be supported per BWP. Different resource configurations may correspond to different subband combinations.

In an example, for a HARQ process that was initially transmitted via configured grant resource, retransmission may be via a configured grant resource or resource scheduled by UL grant.

In an example, NR-U UCI for configured grant may be mapped to the REs after the symbols carrying DMRS in PUSCH on the allocated subbands. In an example, UCI may be mapped from the symbol of the PUSCH before which the channel is sensed to be idle.

In an example, for NR-U UL configured grant, UCI may be mapped on the resource of the actual transmission occasion. In an example, NR-U UCI for configured grant is mapped to the REs after the symbols carrying DMRS in the transmitted PUSCH.

In an example, multiple UEs in NR unlicensed spectrum may be configured with configured grant resources with aligned starting timing in time domain. The UEs may perform LBT simultaneously when there are packets in their buffers before the transmission occasion of configured grant resource. In an example, each UE may sense the channel is idle and may start PUSCH transmission. This would lead to collision of UL transmissions among multiple UEs.

In an example, DMRS may be used for UE identification since DMRS configuration(s)/parameter(s) are UE-specifically configured. In an example, when collision happens, base station may identify colliding UEs via DMRS detection. If multiple UEs transmit UL data simultaneously using the same starting position in time domain, base station may identify the UEs transmitting UL data via DMRS detection. In an example, base station may schedule retransmission or feedback NACK for the corresponding UE.

For NR grant-free uplink (GUL) transmission in unlicensed band, due to the uncertainty of channel availability, a UE may be configured/scheduled with multiple transmission opportunities in time/frequency domain.

In an example in time domain, a UE can be configured with multiple consecutive transmission occasions within a periodic window for GUL transmission. The UE may perform multiple LBT attempts until it succeeds. To enable more LBT attempts at a finer channel access granularity for the UE, the UE may be configured with mini-slot level time domain resources for the periodic window. The consecutive time domain resources for the periodic window may be configured through either a bitmap or a tuple of parameters including start position, temporal length, and periodicity. In an example, a bitmap may be used to indicate slots/symbols/subframes that are configured with configured grant within a time duration. The bitmap may indicate a pattern and the pattern may be repeated for consecutive time durations.

In an example in NR-U, a UE with capability of subband LBT may be configured to operate multiple 20 MHz unlicensed channels. The base station may configure a set of candidate resources distributed across the multiple unlicensed channels for GUL transmission. The UE may perform subband LBTs for each unlicensed channel. The UE may select the available candidate resource(s) to transmit the data. These candidate resources may be shared with multiple UEs by managing the transmission starting positions to avoid the inefficient resource utilization. In an example, the base station may blindly detect the actual transmission(s) on the configured multiple candidate resources. In an example, a UE may be configured with multiple candidate resources across multiple unlicensed channels for grant-free UL transmission, and the UE may transmit data on one or more candidate resources based on subband LBT results.

In an example, for NR-U configured grant, downlink signals and/or channels such as PDCCH/PDSCH may be shared in a UE-initiated COT.

In an example, configured grant UCI (CG-UCI) on GUL transmission may carry HARQ process ID, NDI, RVID, etc. and may remove the timing dependency of HARQ process. In an example, a UE may select the HARQ process ID from an RRC configured set of HARQ process IDs. In an example, if the configured resource(s) for GUL transmission is shared with multiple UEs, the CG-UCI may comprise the UE ID.

In an example, to support UE-initiated COT sharing for PDCCH and/or PDSCH transmission, the CG-UCI may carry COT sharing information. In an example, besides HARQ related information, CG-UCI may include at least UE ID, COT-sharing related information, CSI report for DL transmission in a same UE-initiated COT, etc.

In an example, Downlink Feedback Information (DFI) may be transmitted via a downlink control information (DCI) and may include HARQ feedback for configured grant transmission. In an example, time domain resource allocation for the configured grant transmissions may provide flexibility.

In an example, a base station may configure a UE with a periodicity and repetition times by RRC. In an example, repetition times may be considered as pre-configured transmission occasions within the periodicity. The UE may transmit PUSCH after a successful LBT before any of the candidate transmission opportunities scheduled by the configured grant, and gNB can perform blind detection on uplink data according to the configuration.

In an example, in order to increase UL transmission opportunities, multiple frequency domain opportunities may be considered for NR-U. Multiple BWPs may be configured to UE. In an example, when data is available for transmission, the UE may attempt to perform LBT in multiple BWPs according to the resource configuration for configured grant. If any LBT on these BWPs succeeds, the UE may transmit on either multiple BWPs or a selected one.

In an example, transmission at the configured grants may be code block group (CBG) based. In an example, the HARQ feedback information in DFI or UCI may be considered CBG based. For example, DFI may provide CBG level HARQ feedback (e.g., ACK/NACK information per CBG of a TB). For example, UCI may indicate the CBGs of the TB that are transmitted via a configured grant resource. The UE may select the configured grant UL CBG and the transmitted CBGs information may be carried in the UCI. Or the DFI may provide CBG level feedback indication while UE can retransmit the failed CBGs based on the DFI indication.

In an example, UE initiated MCOT sharing between configured grant UL and DL may be used in NR-U. In an example, a UE performing grant-free transmission indicates in the grant-free UCI at least the following information: HARQ process ID, UE-ID, NDI, PUSCH duration and COT sharing information. In an example, the grant-free UCI is scrambled with a cell-specific RNTI. In an example, COT acquired by a UE may be shared for configured grant transmission.

In an example, DFI may carry HARQ feedback for configured grant transmission. HARQ-ACK information corresponding to HARQ processes at least configured for CGU (configured grant for NR-U) may be included also in CGU-DFI.

In an example, a UE may transmit the UCI corresponding to a PUSCH transmission via a configured grant resource via the PUSCH and the UCI may comprise at least HARQ process ID, NDI, RVID, etc. In an example, the mapping position of UCI may be from the second symbol to the second last symbol to minimize the effect of multiple starting/ending symbol positions of PUSCH. If the PUSCH for configured grant has multiple starting/ending positions, UCI mapping may avoid puncturing due to the LBT failure. In an example, the position of DM-RS for the PUSCH may be considered in the UCI mapping. In an example, the UCI can be mapped close to DM-RS symbol to guarantee its reliability. In an example, UCI mapping on PUSCH may consider multiple starting/ending positions and the position of DM-RS for PUSCH and multiplexing with NR-UCI (e.g., HARQ-ACK, CSI part 1, and CSI part 2).

In an example, the time-domain resource allocation for configured grant may be given by the combination of offset value from SFN=0 and symbol-level periodicity. To increase flexibility for time-domain resource allocation, the time-domain resource may be allocated using a bitmap for a fixed period time. In an example, various numerologies for bitmap based time domain resource allocation may be considered. For example, the bitmap with fixed size may be interpreted as a scalable manner with respect to numerology (e.g., one slot allocation for each bit in case of 15 kHz SCS and two slot allocation for each bit in case of 30 kHz SCS), or different bitmap size can be configured for each SCS (e.g., 40-bit bitmap for 15 kHz SCS and 80-bit bitmap for 30 kHz SCS).

In an example, a wireless device or base station may employ CBG based transmission. A UE may provide HARQ-ACK feedback for each CBG and base station may retransmit the NACKed CBGs rather than the whole TB. The CBG-based transmission may be useful for large TB scenario and especially when some CBGs are punctured by URLLC or time-selective interference.

In an example, CBG-based transmission may be realized by CBGTI (CBG transmission indication) in scheduling DCI, for a retransmission of a TB, the bit value '0' means that the corresponding CB G is not transmitted/not to be transmitted and '1' indicates that it is transmitted/to be transmitted for DL/UL.

In an example in NR-U, CBG based transmission may be used for PDSCH/PUSCH. In an example, CBG-based transmission may be used for PUSCH transmission via configured grant resources. In an example, some symbols may not be transmitted due to LBT failure (e.g., puncturing) if multiple starting positions for CGU PUSCH are allowed in NR-U. In an example, the UE may retransmit CBG(s) only belonging to the not-transmitted symbols. In order to support efficient CBG based transmission for CGU, we may need to consider how to configure control information (e.g., DFI, UCI). For example, CBGTI bits in the UCI may be included for UE to inform the base station which CBGs are/were transmitted. In an example, CBG-level HARQ feedback via DFI may be adopted for UE to retransmit the NACKed CBGs based on the DFI. In an example, if CBG-level HARQ-ACK feedback by DFI is adopted, it is necessary to devise the way to reduce the signaling overhead (e.g., CBG-level HARQ-ACK for a limited number of HARQ process IDs or TB-level HARQ-ACK for granted UL transmission).

In an example, a base station may indicate which slots configured grant UL transmission are allowed using a bitmap, comprising a plurality of bits, via RRC signaling In an example, to improve the efficiency of configured grant transmission in NR-U, one potential enhancement is defining a periodic transmission window instead of only one periodic transmission occasion.

In an example, configured grant UL transmission may be allowed within the gNB acquired COT. In an example, the collisions between configured grant UL transmission and scheduled transmission may be managed by the transmission starting positions. In an example, UE-selected starting offset and RRC configured starting offset may be used to coordinate UE multiplexing for NR-U configured grant operation.

In an example, a timer may be used for autonomous configured grant retransmission for NR-U. The timer may be RRC configured with e.g. a slot granularity.

In an example, CBG operation for configured grant may overcome bursty interference. With CBG based operation, the retransmission efficiency may be increased. In an example, a UE may start configured grant UL transmission after successful LBT. Some symbols or partial symbol may be discarded based on when the UE finishes the LBT. In case the gNB received the rest of the CBGs correctly, the UE may need to retransmit CBG(s) belonging to the not-transmitted symbols instead of the full TB.

In an example, a HARQ process corresponding to a configured grant may not have a dependency to the timing of the configured grant. In an example, UCI on PUSCH may carry HARQ process ID, NDI, RVID, etc. In an example, downlink feedback information (DFI) may be transmitted via downlink control signaling. The DFI may comprise HARQ feedback for configured grant transmission. In an example, time domain resource allocation of configured grant transmissions may have flexibility. In an example, a retransmission may be based on a configured grant resource.

In an example, Type 1 and Type 2 configured grant mechanism may be used for operation of NR in unlicensed spectrum.

In an example, consecutive configured grant resources in time without any gaps in between the resources may be configured. In an example, non-consecutive configured grant resources (periodic or non-periodic) with gaps in between the resources may be configured.

In an example, a wireless device may select a HARQ process ID from an RRC configured set of HARQ IDs for NR-unlicensed configured grant transmission.

In an example, DFI may include pending HARQ ACK feedback for prior configured grant transmissions from the same wireless device. In an example, DFI may include HARQ ACK feedback for scheduled UL transmissions using HARQ IDs configured for NR-unlicensed configured grant transmission.

In an example, a HARQ process may be initially transmitted via configured grant resource. The retransmission of the HARQ process may be via a configured grant resource. In an example, a HARQ process that was initially transmitted via configured grant resource may be retransmitted via resource scheduled by UL grant.

In an example, a wireless device may autonomously initiate retransmission for a HARQ process that was initially transmitted via configured grant mechanism for NR-unlicensed, for example when one or more of the following conditions is met: reception of NACK feedback via DFI for the corresponding HARQ process, no reception of feedback from gNB upon a timer expiration, etc.

In an example, NR-unlicensed configured grant transmission may not be allowed during the time when it overlaps with occasions configured for potential NR-U DRS of the serving cell irrespective of the configured time domain resource for configured grant transmission.

In an example, to provide flexibility on time domain resource allocation of configured grants, a bitmap-based approach and configured parameters comprising, for example, periodicity, offset in the frame, start symbol, length of PUSCH and K-repetition signaling, etc. may be used.

In an example, CBG based retransmissions for configured grant based transmissions may be used. CBG related control information may be transmitted as part of DFI and UCI In an example, collision between configured grant and scheduled grant based transmission may be avoided by management of starting point of the transmission for configured grant and scheduled grant based transmission.

In an example, the resources utilized by the UCI, and multiplexing of UCI and data information of PUSCH require consideration of DMRS placement and starting and ending symbols of the configured grant based transmissions.

In an example, UCI corresponding to a configured grant transmission may comprise UE-ID, COT sharing information, PUSCH duration, etc.

In an example, it may be problematic for the UE to assume ACK in absence of reception of feedback, which may include explicit feedback or feedback in the form of uplink grants. In an example, assuming NACK upon a timer expiration may be a candidate solution to avoid LBT impact on reception of feedback.

In an example, sharing resources with gNB within COT(s) that is acquired by UE(s) as part of configured grant based transmissions may be supported. In an example, allowing configured grant based transmissions within a gNB acquired COT may be supported In an example, there may be one active BWP in a carrier. In an example, a BWP with multiple channels/subbands may be activated. In an example, when absence of Wi-Fi cannot be guaranteed (e.g. by regulation), LBT may be performed in units of 20 MHz (subbands). In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a UE within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires UE to have the capability to support multiple narrow RF or a wide RF which includes these multiple activated BWPs.

In an example, a single wideband BWP may be activated for a UE within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the UE a new active BWP to use for an upcoming, and any subsequent, data transmission/reception. In an example, a UE may monitor multiple, configured BWPs to determine which has been acquired for DL transmissions by the gNB. For example, a UE may be configured with monitoring occasion periodicity and offset for each configured BWP. The UE may attempt to determine if a BWP has been acquired by the gNB during those monitoring occasions. In an example, upon successfully determining that the channel is acquired, the UE may continue with that BWP as its active BWP, at least until indicated otherwise or MCOT has been reached. In an example, when a UE has determined that a BWP is active, it may attempt blind detection of PDCCH in configured CORESETs and it might also perform measurements on aperiodic or SPS resources.

In an example, for UL transmissions, a UE may be configured with multiple UL resources, possibly in different BWPs and/or subbands. The UE may have multiple LBT configurations, each tied to a BWP and/or subband and possibly a beam pair link. The UE may be granted UL resources tied to one or more LBT configurations. Similarly, the UE may be provided with multiple AUL/grant-free resources each requiring the use of different LBT configurations. Providing a UE with multiple AUL resources over multiple BWPs/subbands may ensure that if LBT fails using a first LBT configuration for one AUL resource in one BWP/subband a UE can attempt transmission in another AUL resource in another BWP/subband. This may reduce the channel access latency and make better use of the over-all unlicensed carrier.

In an example, multiple UE starting time offsets with sub-symbol granularity may be supported for configured grant based transmissions. The UE may start transmissions accessing transmission opportunities provided by a configured grant at the configured/indicated starting positions.

For configured grant time domain resource allocation, a number of allocated slots following the time instance corresponding to the indicated offset may be configured. In an example, multiple PUSCHs may be configured/allocated within a slot.

The DFI for NR-unlicensed configured grants may include at least TB level HARQ-ACK bitmap for all UL HARQ processes. The DFI for NR-unlicensed configured grants may support RRC configured minimum duration, e.g., D, from the ending symbol pf the PUSCH to the starting symbol of the DFI carrying HARQ-ACK for that PUSCH. UE may assume that HARQ-ACK is valid only for PUSCH transmission ending before n-D, where n is the time corresponding to the beginning of the start symbol of the DFI. A UE blind decoding complexity may not be increased due to DFI size. A size of DFI may be same as an existing DCI sizes in NR. The DFI may at least comprise: an NDI bit for each HARQ ID; HARQ-ACK bitmap for all UL HARQ processes for NR-U configured grant; and HARQ-ACK for scheduled PUSCH.

A configured grant UCI (CG-UCI) may be included in every configured grant PUSCH (CG-PUSCH) transmission.

A number of separately encoded UCIs multiplexed in a PUSCH transmitted using a configured grant may be at most three.

A CG-UCI may comprise: HARQ ID; NDI; RV; COT sharing information, e.g., LBT type/priority class, COT duration; UE-ID; CRC; indication of PUSCH start/end point/slot; resource configuration index; multiple blanked OFDM symbols; transmission parameters, e.g., MCS, PMI, RI, SRI; shared CG-UCI corresponding to multiple PUSCHs; SR information to indicate the request of continuous PUSCH scheduling; UAI (similar to DAI in DL); UL transmit power; CBG level ACK-NACK; CBGTI; etc.

Configuring dedicated time/frequency resource to each UE may increase a likelihood of resource waste and decreased user capacity. For example, burst traffic may result in the pre-configured dedicated resources to be under-utilized. For example, a UE with data ready to transmit may not gain access to the pre-configured resources as a result of LBT failure. For example, a network may improve the resource utilization with pre-configured resources by configuring a selected set of UEs, e.g., two or more UEs, with same time-domain resources, and either orthogonal or same frequency interlaces on the same LBT subband. For example, the network may align the UEs transmission starting points to avoid mutual blocking during the LBT.

NR/NR-U may support the configuration of multiple CG UEs with the same time-frequency resources. In such a case, one or more collisions may occur. The receiving gNB may identify the UEs involved in a collision using other pre-configured resources, e.g., DMRS sequence/index, and resolve the intra-cell collisions in the spatial or code domain. Therefore, resource utilization may be improved despite the burst traffic and channel availability in NR-U leading to increased user capacity and reduced latencies.

In an example, dependencies of HARQ process information on the timing may be removed for NR-U transmission with CG. UCI on PUSCH may carry the HARQ process ID, NDI, RVID as in LTE-AUL. For example, UE may transmit its selected HARQ process ID in a CG-UCI that is multiplexed in the PUSCH. The HARQ process ID may be encoded and decoded separately before the data, for example, to enable soft combining of the packet at the gNB. This, however, implies less reliability of the CG-UCI compared to a dedicated physical control channel (e.g., PUCCH), for example, because of collisions among multiple UE transmissions using the same configured grant and/or interference from hidden nodes.

The UE-ID and/or HARQ ID for transmissions using configured grant in NR-U (including initial transmission and retransmissions) may be determined based on some flexible mapping mechanism between the HARQ ID and/or UE-ID and the set of configured grant resources/parameters used for the transmission of the associated TB. For example, the HARQ process ID and/or UE ID may be determined/verified based on the frequency interlace and/or the DMRS cyclic shift. This allows for a more flexible utilization of the configured grant resources and supports multiple resource configuration per cell per UE.

UL transmission collisions may occur, for example, because gNB may configure multiple UEs to share the same configured grant resource. In an example, configured grant UE may be allocated to occupy parts of the channel bandwidth. In this case, different UEs may be allocated different interlaces, but LBT may be performed on the whole BWP and/or bandwidth of the channel. If one UE successfully performs LBT earlier and transmits data on the configured BWP, then other UEs may not be able to access the channel due to LBT failure on the same BWP. Therefore, multiple channel access and/or multiple UL user multiplexing may not be achieved. For example, blank pattern method and/or same UL data transmission starting point mechanism may be used to reduce UL collisions. In an example, configured grant UE may be allocated to occupy the entire channel bandwidth. In this case, the same resource may be used by other UEs to avoid the resource waste, for example, if this UE has LBT failure and/or no data to transmit. To alleviate the collision problem when multiple UEs attempt to access the same CG PUSCH resource, RRC configured starting offset set and/or UE-selected starting offset from the configured set may be employed.

Configured grant transmissions may involve scheduling multiple UEs on overlapping resources including possibly with same DMRS sequence/resource. In an example, a UE-ID may be included in the UCI payload to provide a robust and reliable way for gNB to determine which UE is transmitting. In an example, orthogonal DMRS sequences may be used to differentiate UEs. However, configuring multiple orthogonal DMRS sequences may result in higher DMRS overhead and may not always be feasible, for example, when supporting higher rank transmissions on CG PUSCH resources. The presence/absence of UE-ID in the CG-UCI may be RRC configured.

It is desirable for gNB to be able to decode UCI and detect DMRS without knowing the exact starting point to reduce the blind detection complexity at gNB. Hence, UCI and DMRS may be sent on symbols after a last allowed starting point. Different transmission starting points may allow later UEs to determine whether the earlier UEs occupy the medium or not when they are overloaded on the same resource. UEs allocated on orthogonal resources may have the same starting point in order not to block each other during LBT. For example, when all the frequency domain resources are allocated to a UE, then different UEs may pick different starting times (e.g., within the first symbol of the resource) to contend for transmission. For example, when a subset of the frequency domain resources are allocated, then the UEs are assigned with a fixed and/or aligned starting position for UL transmission. In NR-U, different UEs may have different configured BWPs and support both regular and interlaced waveforms. So it may be possible to have contention-based transmissions among UEs that aren't allocated the full set of RBs. In FeLAA, the starting point offset (time domain) is selected randomly from a set of values configured by RRC when the allocation spans the entire bandwidth, but is a fixed value for interlace based partial bandwidth allocation. So the collision between UEs may be avoided for full bandwidth allocations, and FDM across UEs may be allowed for partial bandwidth allocations.

In an example, CG-UCI may include UE-ID and/or CRC scrambled by specific RNTI to increase the robustness of UCI in case of intra-cell collisions and/or to identify the UE at the base station. The CG-UCI may be multiplexed in the CG-PUSCH the same way as HARQ-ACK UCI. The CG-UCI may be part of HARQ-ACK UCI.

CG-UCI may be mapped on a first symbol after DMRS. DMRS and CG-UCI may be transmitted on symbol(s) that comprise last allowed starting point. First symbol and last symbol may not be used for DMRS and/or CG-UCI. CG-UCI may be mapped using NR UCI multiplexing rules. CG-UCI may be sent before HARQ-ACK/NACK.

It may be feasible to operate single carrier wideband operation when LBT is successful in all LBT subbands. Guardbands may be needed in between LBT subbands. In-carrier guardband is defined as guard band between LBT bandwidths in a carrier/BWP, different from guardband at the edge of the carrier. In-carrier guardbands may be pre-defined and/or configurable by gNB. Availability of in-carrier guardband for PDSCH/CSI-RS may vary based on how much time is elapsed after the start of DL burst.

Availability of in-carrier guardband for PDSCH may vary based on frequency domain channel occupancy structure. Availability of in-carrier guardband for PDSCH may be up to scheduler implementation. Pre-defined in-carrier guardband may always be unavailable for PDCSH.

Single wideband carrier operation may be feasible when LBT is successful in a subset of the LBT subbands which are contiguous. If PRBs within the guardband of two contiguous LBT subbands are scheduled by gNB, then filter adaptation may be needed. Single wideband carrier operation may be feasible when LBT is successful in a subset of the LBT subbands which are non-contiguous, at least if PRBs within the guardband of two contiguous LBT subbands are not scheduled by gNB. Some level of in-carrier leakage and blocking requirements may be met at the BS and UE.

In an example, multiple active frequency domain configured grant configurations per BWP may be supported. For the UL transmission with configured grant in NR-U, configuration of frequency domain resources may include one or more frequency interlaces. Frequency domain resources may be configured across multiple subbands of a wideband UL BWP configured to the UE for transmission with configured grant in NR-U. Based on the results of the subband LBT procedures, the CG UE may transmit on one or more subbands, e.g., for which the LBT procedures are successful. Thus, a number of transmission opportunities in frequency domain may be improved.

For UL transmissions in a serving cell with carrier bandwidth greater than LBT bandwidth, for the case when UE performs CCA before UL transmission, the UE may transmit PUSCH only if CCA is successful at UE in all LBT subbands/bandwidths of the scheduled PUSCH. In an example, the UE may transmit the PUSCH in all or a subset of LBT subbands/bandwidths of the scheduled PUSCH for which CCA is successful at the UE. In an example, the subset of LBT subbands/bandwidths may comprise only contiguous LBT subbands/bandwidths. In an example, the subset of LBT subbands/bandwidths may comprise non-contiguous LBT subbands/bandwidths. The scheduled PUSCH may comprise one or more guardbands in between the LBT subbands/bandwidths.

When GC-PDCCH is configured, explicit indication via GC-PDCCH may be used to inform the UE that one or more carriers and/or LBT subbands/bandwidths are not available or are available for DL reception, at least for slot(s) that are not at the beginning of DL transmission burst. UE may adjust monitoring behavior for PDCCH candidate if the PDCCH candidate is mapped fully or partially in LBT bandwidth(s) that is indicated to be unavailable for DL reception by GC-PDCCH. For CORESET configuration in a serving cell with carrier bandwidth greater than LBT bandwidth, a CORESET may be configured over multiple LBT bandwidths, or a CORESET may be confined within a LBT bandwidth. For CORESET configuration in a serving cell with carrier bandwidth greater than LBT bandwidth, for the case where a CORESET is confined within a LBT bandwidth, the search space set configuration associated with the CORESET may have multiple monitoring locations in the frequency domain (e.g., per LBT subband/bandwidth). For the case in which gNB transmits PDCCH/PDSCH on a single BWP if CCA is successful at gNB for the whole BWP, CORESET(s) need not all be confined within an LBT bandwidth. A UE may receive a PDSCH scheduled within an LBT bandwidth and/or over multiple LBT bandwidths. A UE capability signaling may indicate maximum supportable number of CORESETs per BWP.

A bitmap for indicating available subband/carrier information may be provided per cell in DCI and transmitted on GC-PDCCH. For example, if more than one bit is provided for a cell, each bit may represent whether the corresponding LBT subband in the corresponding carrier is available for DL reception. For example, if only one bit is provided for a cell, the bit may represent whether the corresponding carrier is available for DL reception. Some control information, e.g., COT/SFI duration/ending indication and PDCCH monitoring occasion indication may be subband-specific. Subband-specific control information may be conveyed in group-common DCI. For example, subband-specific control information may be provided per subband per cell. For example, subband-specific control information may be provided for certain subband(s) per cell, where the certain subband(s) may be indicated by available subband/carrier information. The gNB's transmitted LBT bandwidths and/or carriers may be explicitly indicated to UE via a bitmap in GC-PDCCH and/or UE-specific PDCCH. The time domain validity of the GC-PDCCH indication of frequency domain channel occupancy may be extended to a whole COT. The UE may obtain the information about LBT outcome in each subband based on initial signal e.g. DMRS, for example, when GC-PDCCH is not configured or not received by the UE, and/or at the beginning of DL transmission burst. The GC-PDCCH indication time-domain validity may span a DL burst(s) within a shared COT.

In an example, configured grant-based and/or dynamically scheduled wideband transmission may span multiple subbands. The subset of LBT subbands used for CG PUSCH and/or scheduled PUSCH transmission may be contiguous.

A bandwidth occupied by a PUCCH resource on unlicensed band may be confined within a LBT bandwidth (20 MHz). Frequency domain resource allocation for a PUCCH transmission may be configured/determined as allocation of interlace(s) by re-interpreting startingPRB in NR PUSCH resource configuration and nrofPRBs in NR PUCCH format configuration, and/or as allocation of a LBT subband by a new field in a PUCCH resource configuration. One or more frequency domain candidate resources distributed in different LBT subbands may be configured for a PUCCH transmission in NR-U.

In an example, the configured grant retransmission timer value may be configured per configured grant configuration, and the configured grant retransmission timer may be maintained per HARQ process. Autonomous retransmission on configured grant resource may be prohibited for a HARQ process, for example while the configured grant retransmission timer for the HARQ process is running. New retransmission on configured grant resource may be prohibited for the HARQ process, for example, while the configured grant retransmission timer is running because the configured grant timer may be running too. The value of configured grant retransmission timer may be shorter than the value of configured grant timer. The configured grant timer may not be restarted at autonomous retransmission on configured grant resource after the configured grant retransmission timer expiry. The UE may not stop the configured grant timer upon NACK feedback reception, and may stop the configured grant timer upon ACK feedback reception. The configured grant timer may not be started/restarted when configured grant is not transmitted due to LBT failure. The configured grant timer may not be started/restarted when UL LBT fails on PUSCH transmission for grant received by PDCCH addressed to CS-RNTI scheduling retransmission for configured grant. The configured grant timer may not be started/restarted when the UL LBT fails on PUSCH transmission for UL grant received by PDCCH addressed to C-RNTI, which indicates the same HARQ process configured for configured uplink grant. Retransmissions of a TB using configured grant resources, when initial transmission or a retransmission of the TB was previously done using dynamically scheduled resources, may not be allowed. On LBT failure at transmission on configured grant, the UE may transmit the pending TB using same HARQ process in a configured grant resource. CS-RNTI may be used for scheduled retransmission and C-RNTI may be used for new transmission.

A serving cell may be configured with bandwidth larger than 20 MHz. A UE in unlicensed band should perform clear channel assessment (CCA) right before transmitting to determine whether the channel is idle or not. While a BWP may be configured with a bandwidth larger than 20 MHz, the CCA is performed in 20 MHz units (LBT subband/bandwidth). A UE may receive an UL grant or be configured with a CG with a bandwidth larger than LBT subband. A UE may receive multiple UL grants or be configured with multiple CGs for each subband.

In an example, the UE may transmit using the entire allocated bandwidth only if CCA is successful for all LBT subbands of the allocated bandwidth. The MAC of the UE may generate a MAC PDU based on the UL resource for the whole allocated bandwidth, and deliver the generated MAC PDU to lower layer, irrespective of CCA results. In fact, it may not matter for the MAC layer whether the CCA in PHY layer will be successful or failed when the delivered MAC PDU is being transmitted. If the CCA fails for at least one of the subbands, the UE may not be able to transmit using the allocated resource on the active BWP. The UE may most likely lose the chance of transmission if the channel occupancy rate of at least one of the subbands is high. If a CCA failure occurs in at least one of the subbands, the PHY layer of the UE may not transmit the MAC PDU and may receive a UL grant for retransmission of the MAC PDU or may autonomously retransmit the MAC PDU using configured grant. Then the UE may perform retransmission of the MAC PDU. This approach may be beneficial for example, when the channel of all allocated subbands is likely to be idle. For example, a base station may acquire a COT on the allocated subbands and share the COT with the UE for UL transmission on the allocated subbands, in which case the likelihood of CCA success at the UE is increased. However, the base station may not be able to initiate and share a COT with the UE and/or predict the CCA result at the time of UE transmission, which results in the entire resource not being used due to CCA failure in a specific subband.

In an example, the UE may perform UL transmission using all or subset of allocate subbands in which CCA is successful at UE. However, the MAC entity of the UE may not be able to generate a MAC PDU based on CCA results, because the UE should complete the MAC PDU generation, pass the MAC PDU to PHY layer, and then the PHY layer performs CCA. SO the MAC PDU generation is done before data transmission and the channel sensing is performed right before transmission.

In an example, the MAC entity may generate a MAC PDU based on the bandwidth of the allocated resource, e.g., comprising multiple subbands. The MAC entity may transmit the generated MAC PDU to the PHY layer. The PHY layer may generate a TB corresponding to the entire bandwidth of the resource and perform CCA on all allocated subbands. The PHY layer may transmit the TB on one or more subbands where CCA is successful, and may puncture/empty the physical resources that overlap with the occupied subbands where CCA is failed.

In an example, the MAC entity may generate multiple MAC PDUs of various versions with different bandwidths suitable for possible resources comprising different number of subbands (which may later have successful CCA). The MAC entity may transmit the generated MAC PDU to the PHY layer. The PHY layer may generate a TB corresponding to the bandwidth of the resource that comprises subband(s) with successful CCA. For example, the UE may perform rate-matching of physical resources for mapping the MACH PDU to subband(s) where CCA is successful. The PHY layer may transmit the TB the subband(s) where CCA is successful, and may not transmit anything on subband(s) where CCA is failed. The complexity of the MAC layer may be increased by preparing multiple rate-matched versions.

In an example, the MAC entity may generate a MAC PDU based on the bandwidth of the allocated resource, e.g., comprising multiple subbands. The MAC entity may transmit the generated MAC PDU to the PHY layer. The PHY layer may generate the TB corresponding to the entire resource. The PHY layer may only code block(s)/CBG(s) for each subband in which CCA is successful. The PHY layer may transmit the TB on one or more subbands where CCA is successful, and may puncture/empty the TB on resource elements that overlap with the occupied subbands where CCA is failed. If the channel for a specific subband is busy, the CBG for that subband may be retransmitted. The MAC layer may wait until all CBGs are successfully received at the PHY layer.

In an example, the MAC entity may generate multiple MAC PDUs based on UL grant/resource per subband (e.g., based on a bandwidth of a LBT subband) based on the received multiple UL grants. The MAC entity may transmit the generated MAC PDUs to the PHY layer. The PHY layer may generate TBs corresponding to each MAC PDU for each UL grant. The PHY layer may transmit each TB on the subband(s) where CCA is successful, and may not transmit anything on subband(s) where CCA is failed. UE may perform multiple HARQ processes at a given time for this example.

In an example, the MAC entity may generate a MAC PDU based on UL grant/resource for a subband (e.g., based on a bandwidth of a LBT subband). The MAC entity may transmit the generated MAC PDU to the PHY layer. The PHY layer may generate a TB and may transmit the TB on one selected subband where CCA is successful, and may not transmit anything on other subband(s) irrespective of the CCA results. The UE may not use the whole allocated bandwidth in this example. CCA opportunities may be increased in this example. The UE may repeatedly transmit the MAC PDU on all subbands in which CCA is successful. However, a channel occupancy rate of all those subbands may be increased in the system.

In unlicensed carriers, a base station may configure multiple UEs with same time/frequency/spatial resources for configured grant based transmissions to avoid resource waste due to burst traffic and/or LBT failures. In existing technology, a wireless device may transmit uplink control information (UCI) comprising a UE-ID (e.g., C-RNTI, CS-C-RNTI, etc.), NDI, and/or a HARQ process ID in a configured grant (CG) PUSCH transmission. The UCI information may be used by the base station to obtain necessary information in performing HARQ operation on the CG PUSCH transmission. For example, the base station may be able to schedule a retransmission corresponding to the CG PUSCH transmission in response to successfully determining the HARQ process ID, NDI and the UE ID while failing in decoding data carried in the CG PUSCH. Compared to data which may be recovered via HARQ retransmission, a failure of UCI transmission on the CG PUSCH (CG-UCI) may not be recoverable. There is a need to improve a design of configured grant configuration for enhanced collision avoidance in unlicensed bands, especially for the CG-UCI transmission that is multiplexed in the CG PUSCH transmission. Including CG-UCI in every CG PUSCH transmission results in an increased likelihood of CG-UCI collision, which yields to base station not being able to decode the entire CG PUSCH transmissions, as the required information for decoding the PUSCH is in the CG-UCI which may not be decodable.

Example embodiments propose one or more mechanisms for enhancing a reliability of CG-UCI transmission in unlicensed spectrum. In an example, a wireless device may determine one or more resource elements (REs) to map a CG-UCI in a CG-PUSCH based on one or more criteria. For example, the wireless device may determine a first PRB and a last PRB where the CG-UCI is mapped based on a starting PRB index of the CG-PUSCH and the UE ID. A first wireless device with a first UE ID may select a different frequency location from a second wireless device with a second ID sharing a same time/frequency resource for a first CG-PUSCH by the first wireless device and a second CG-PUSCH by the second wireless device. For example, the wireless device may determine the first PRB and the last PRB where the CG-UCI is mapped based on the starting PRB index of the CG-PUSCH and an offset configured to the wireless device by a base station. The base station may configure a first offset to a first wireless device and a second offset to a second wireless device which may share same time/frequency resources. In an example, the wireless device may determine the first PRB and the last PRB where the CG-UCI is mapped based on the starting PRB index of the CG-PUSCH and a proximity to a guard band. The wireless device may avoid mapping the CG-UCI near or on the guard band to minimize interferences. In an example, the wireless device may determine the first PRB and the last PRB and one or more PRB s in between where the CG-UCI is mapped based on LBT results of one or more LBT subbands when the CG PUSCH may be scheduled over a plurality of LBT subbands. The wireless device may dynamically adjust location of the CG-UCI mapping or spread the CG-UCI over the plurality of LBT subbands such that the wireless device may transmit the CG-UCI when the wireless device transmits the CG-PUSCH. The wireless device may dynamically select the location of the CG-UCI mapping from one or more LBT subbands with successful LBT. In response to changing the location of the CG-UCI mapping due to LBT results, the wireless device may perform CG-UCI overriding (e.g., puncturing) one or more REs of data REs to maintain a reasonable UE complexity.

Example embodiments may reduce potential collisions of a first CG-UCI from a first wireless device and a second CG-UCI from a second wireless device sharing a same time/frequency resource. Embodiments may enhance a reliability of a CG-UCI transmission in a wideband operation by avoiding mapping the CG-UCI near or on guard band regions and by mapping the CG-UCIs on one or more LBT subbands with LBT success.

A wireless device (UE) may receive one or more messages, e.g., RRC messages and/or broadcast SIB1 message, from a base station (BS). The one or more messages may comprise configuration parameters of a configured grant resource. The configuration parameters may indicate radio resources of a configured grant. For example, the radio resource may be periodic. For example, the radio resources may comprise one or more LBT subbands in frequency domain. The configuration parameters may further indicate one or more DMRS scrambling ID/sequence number, and/or a frequency offset. The UE may determine one or more REs/PRBs for mapping CG-UCI in the CG PUSCH at least based on the frequency offset of the configured grant resource.

In an example, a BS may configure DMRS scrambling ID by RRC, where a unique DMRS scrambling ID may be configured to a wireless device. The BS may be able to distinguish a UE identify from the DMRS scrambling ID used in a CG PUSCH transmission in response to receiving the CG PUSCH. In an example, the BS may configure DMRS scrambling IDs, where a DMRS scrambling ID may be selected by a wireless device or where the DMRS scrambling IDs may not differentiate different UE IDs. The wireless device may carry a UE-ID in a CG-UCI of a CG PUSCH.

In an example, the BS may attempt to decode a CG-UCI prior to decoding of a CG PUSCH with the CG-UCI. A bit size of the CG-UCI may be fixed or the bit size of the CG-UCI may be determined without decoding the CG PUSCH. The resources for CG-UCI mapping may be deterministic, e.g., pre-defined and/or configured by BS. In an example, BS may configure flexible transmission occasion candidates within a period, e.g., by configuring multiple starting points. The BS may blindly detect the resources on which a CG PUSCH is transmitted, e.g., via DMRS detection in the CG. The BS may proceed to detection of CG-UCI, e.g., when the DMRS is detected. The BS may obtain the necessary information to decode the CG PUSCH from the CG-UCI.

In an example, CG-UCI may be mapped from a first non-DMRS symbol after a first DMRS symbol in CG-PUSCH resource on one or more allocated subbands. For example, the CG-UCI may be mapped onto the CG PUSCH in a subband where the channel is sensed to be idle.

In an example, a UE may receive one or more RRC messages indicating one or more PUCCH resources/PUCCH resource sets on an unlicensed cell. The UE may be configured with a CG resource configuration wherein the CG resource configuration may overlap partially or fully with the PUCCH resources/PUCCH resource sets. The wireless device may not use one or more PRBs overlapping with the PUCCH resources/PUCCH resource sets in mapping a CG-UCI. This is to avoid potential collision with a PUCCH transmission from a second wireless device colliding with a CG-UCI transmission from a first wireless device. The first wireless device may exclude the one or more PRBs from mapping either UCI or data (e.g., no mapping on the one or more PRBs) at a slot when the overlap occurs.

In an example, a BS may configure one or more PUCCH resources/PUCCH resource sets to a first wireless device on an unlicensed cell. The BS may not configure the one or more PUCCH resources/PUCCH resource sets to a second wireless device on the unlicensed cell as the unlicensed cell may be configured as a SCell to the second wireless device. The BS may configure a set of PRBs and/or a set of time durations to the second wireless device. The second wireless device may not map CG-UCI over REs overlapping/belonging to the set of PRBs and/or the set of time durations based on the configuration. The second wireless device may not map PUSCH over REs overlapping/belonging to the set of PRBs and/or the set of time durations based on the configuration. This is to avoid a potential collision between a PUCCH of the first wireless device and a PUSCH and/or a CG-UCI of the second wireless device.

Embodiments specified in the specification may be applied to other UCI transmission such as HARQ-ACK, CSI, and/or SR transmissions when the other UCI is piggybacked on a PUSCH (regardless CG PUSCH or UL grant based PUSCH).

In an example, a PUCCH resource may overlap with a PUSCH resource in time domain. The UE may not support simultaneous transmission of PUSCH and PUCCH, whether they are in the same or different serving cell(s). The UE may multiplex the UCI comprising CG-UCI and/or HARQ-ACK and/or CSI report(s) in CG PUSCH. The BS may semi-statically configure by RRC one or more beta-offset values. The one or more beta-offset values may indicate a coding rate of the CG-UCI and/or HARQ-ACK and/or CSI and/or PUSCH. The UE may use the one or more beta-offset values to determine the resource elements allocated to CG-UCI and/or HARQ-ACK/CSI part 1/CSI part 2. For example, for type 2 CG PUSCH, the one or more beta-offset values may be dynamically indicated by the activation DCI. For example, the beta-offset value for HARQ-ACK may be reused for CG-UCI. For example, HARQ-ACK/CSI may not be mapped on the resource elements allocated to CG-UCI. For example, the base station may configure a second beta-offset for a configured grant resource configuration. The wireless device may determine a number of REs used for mapping a CG-UCI based on the second beta-offset. In an example, the CG-UCI may comprise a UE-ID, NDI, and/or a HARQ process ID. Embodiments may not preclude to include other information in the CG-UCI. In an example, one or more information of the CG-UCI may be transmitted via a DM-RS of a CG-PUSCH where the CG-UCI is piggybacked. For example, there may be a mapping, configured by the base station, between DM-RS scrambling sequence(s) and a UE ID.

Figure 17:
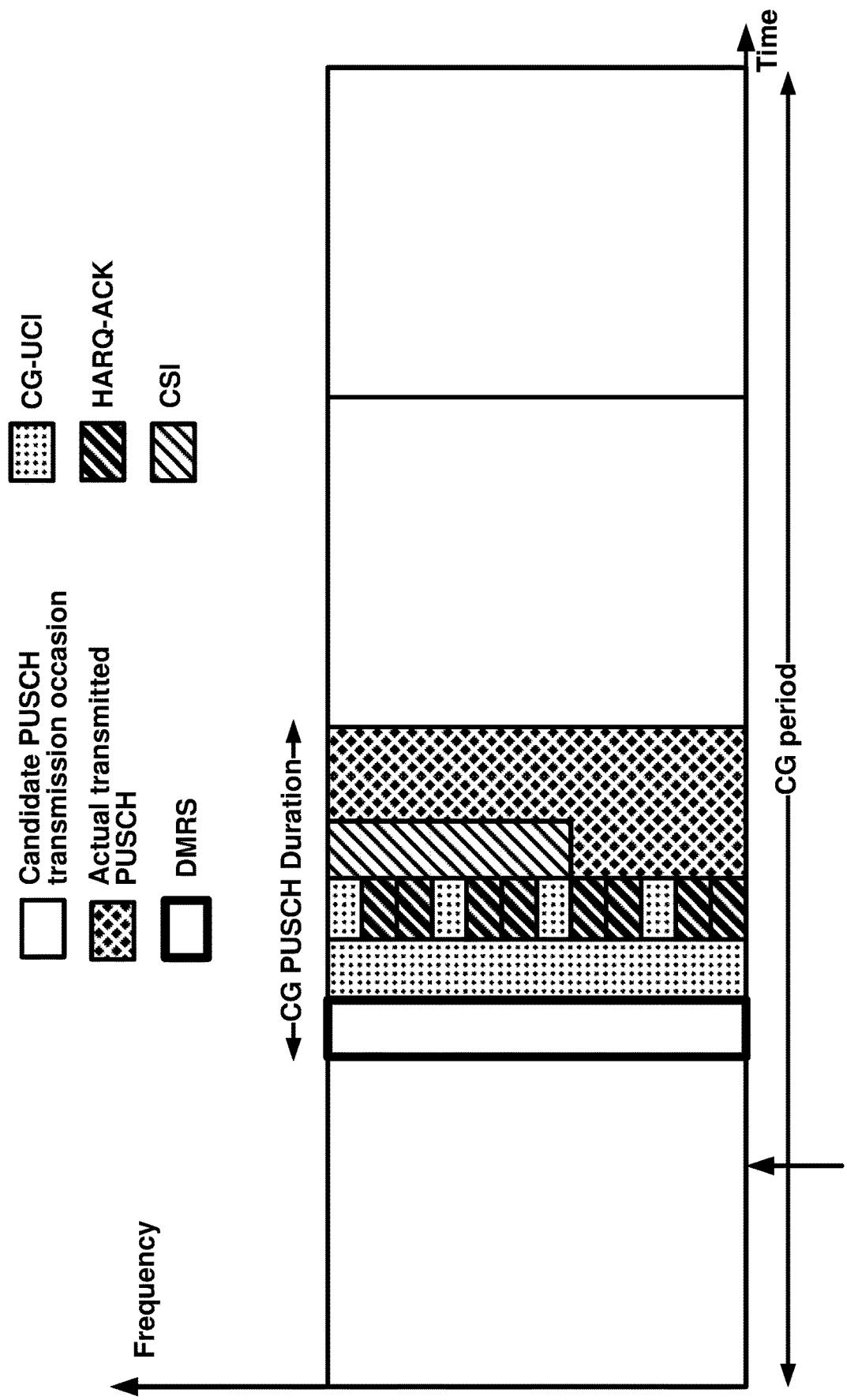
FIG. 17 illustrates an example of UCI mapping in CG PUSCH for NR-U configured grant transmission as per an aspect of an example embodiment of the present disclosure.

FIG. 17 shows an example of UCI mapping in CG PUSCH for NR-U configured grant transmission. BS may configure multiple candidate PUSCH transmission occasions within a CG period. The UE may transmit the CG PUSCH in the second CG transmission occasion in response to the successful LBT which indicates an idle channel before the second CG transmission occasion. The UE may map the DMRS to the first symbol of the CG PUSCH transmission occasion. The UE may map the CG-UCI to a first non-DMRS symbol after the first DMRS symbol. The UE may map other UCIs, e.g., comprising HARQ-ACK and/or CSI from the first non-DMRS symbol after the first DMRS symbol and/or after mapping the CG-UCI. For example, the UE may not map the HARQ-ACK/CSI part 1/CSI part 2 on the resource elements allocated for CG-UCI. For example, the CG-UCI and other UCIs (e.g., comprising HARQ-ACK and/or CSI) may be FDMed in one or more first non-DMRS symbols of the CG-PUSCH. For example, as shown in FIG. 17, CG-UCI and HARQ-ACK are FDMed in the second non-DMRS symbol after the DMRS symbol, and the CSI is mapped to the third non-DMRS symbol after the DMRS symbol. The CG PUSCH is mapped to the rest of the resource elements after the UCIs, e.g., CG-UCI and/or HARQ-ACK and/or CSI are mapped.

Figure 18:
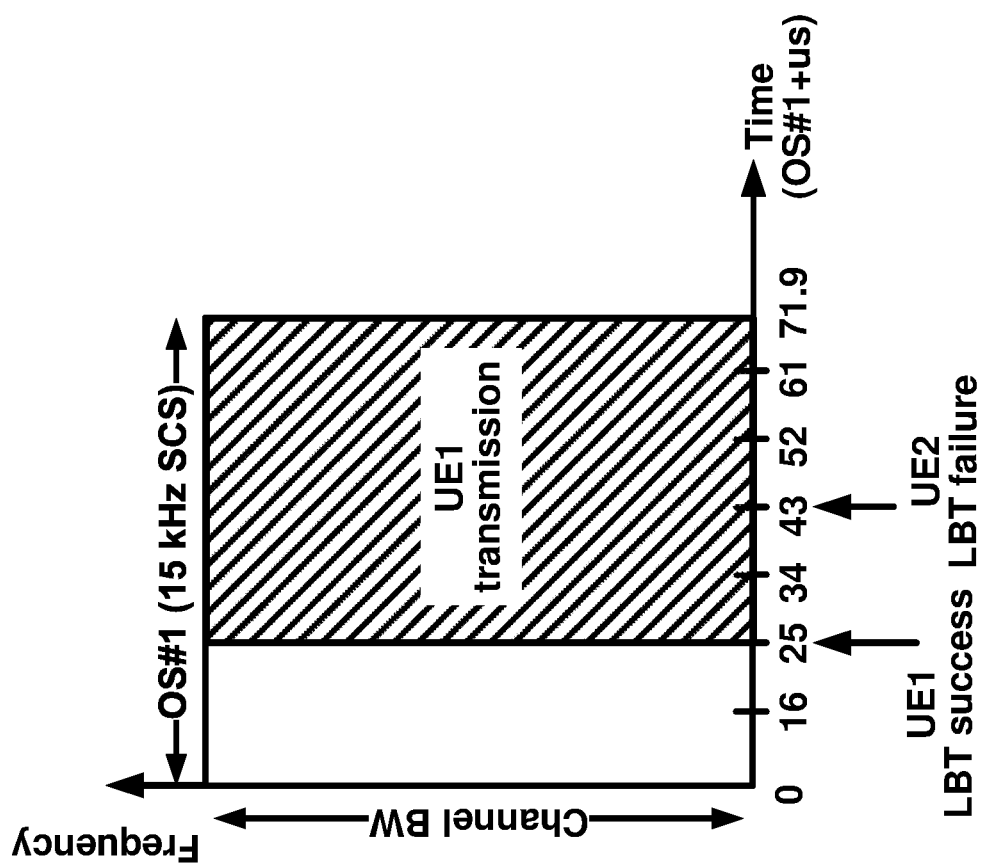
FIG. 18 illustrates example allocation of a resource to multiple wireless devices with different starting points as per an aspect of an example embodiment of the present disclosure.

FIG. 18 shows an example where a base station allocates the same CG PUSCH resource to multiple UEs, e.g., UE1 and UE2. This example shows a first OFDM symbol (OS #1) of CG PUSCH resource in a 15 kHz subcarrier spacing. In an example, the BS may allocate the entire channel bandwidth to both UEs. In an example, multiple UEs may contend in accessing the common CG PUSCH resource. The BS may configure the multiple UEs with a set of starting points within the first symbol. For example, the BS may configure a set of offset values, e.g., a set comprising {16, 25, 34, 43, 52, 61} microsecond (us) offset values, to be applied to the starting of the first OFDM symbol. Each UE may select, e.g. randomly, a starting point from the configured set, to avoid inter-UE blocking. For example, UE1 may select 25 us and UE2 may select 43 us. The UEs may perform LBT at the selected starting points. For example, UE1 may find the channel idle (successful LBT) and start PUSCH transmission in the CG resource after 25 us from the starting of OS #1, however, UE2 find the channel busy (failed LBT) after 43 us from the starting of OS #1, e.g., due to UE1 transmission. As a result, a collision of UE1 and UE2 transmission in the common CG may be avoided. However, only one transmission may be allowed in this case, resulting in a low channel/resource utilization.

Figure 19:
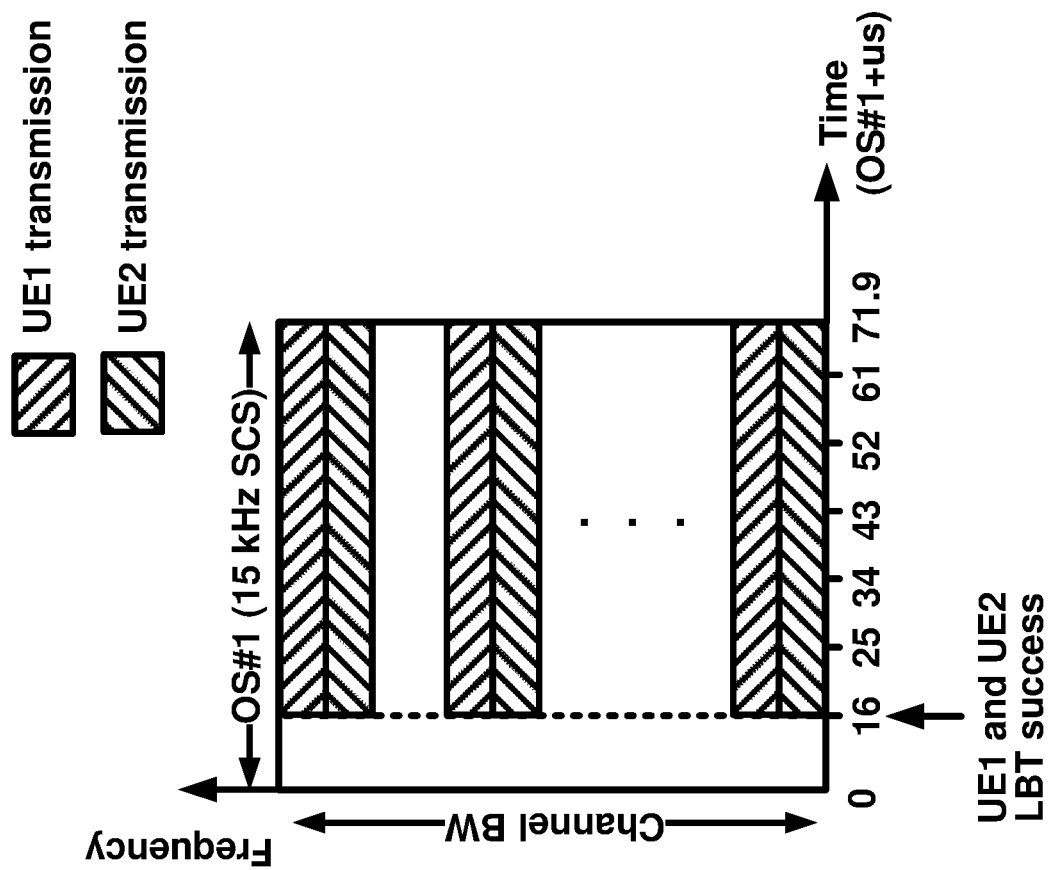
FIG. 19 illustrates example allocation of a resource to multiple wireless devices with different frequency divisions as per an aspect of an example embodiment of the present disclosure.

FIG. 19 shows an example where a base station allocates partial bandwidth of the same CG PUSCH resource to multiple UEs, e.g., UE1 and UE2. For example, the base station may allocate different interlaced resource elements to the multiple UEs. This example shows a first OFDM symbol (OS #1) of CG PUSCH resource in a 15 kHz subcarrier spacing. In this example, the BS may enable UL UE multiplexing, e.g., by configuring the multiple UEs with fixed and/or aligned starting points. For example, the BS may configure both UEs with stating point of 16 us. Both UEs may perform LBT at the same time (e.g., 16 us after the starting of OS #1) and find the channel idle (successful LBT). As a result, both UEs may transmit via orthogonal/ FDMed, e.g., interlaced, resource elements in the common CG resource.

In an example, a plurality of UEs may be allocated with a common CG resource with the same/overlapping resource elements, e.g., same bandwidth and/or same frequency interlace and/or same starting point. In an example, one or more UEs from the plurality of UEs may transmit via the same CG resource. In an example, a BS may not be able to successfully receive/decode CG PUSCH transmissions due to collision of simultaneous transmissions via overlapped/shared CG resources and/or due to interference from hidden nodes. In an example, the plurality of UEs may map the CG-UCI and/or HARQ-ACK and/or CSI in the same way to the same resource elements of the common CG resource. In an example, the BS may not be able to successfully decode the CG-UCI of the CG PUSCH due to collision among multiple UEs and/or interference. As a result, the base station may lose important information about one or more CG transmissions (e.g., HARQ process ID, NDI, RV, UE-ID, etc.) from one or more UEs comprised in one or more CG-UCIs, and thus, fail to decode the CG PUSCH transmissions.

In an example, the base station may be able to identify colliding UEs based on UE specific and/or orthogonal resources, e.g., FDM interlace and/or DMRS scrambling ID/sequence. In an example, even though the BS may be able to identify the colliding UEs, it may not be able to successfully decode the corresponding CG-UCIs. In an example, the BS may configure one or more orthogonal frequency resources, e.g., resource elements non-overlapping in frequency domain, for CG-UCI and/or HARQ-ACK and/or CSI in a common CG resource, whether with full channel bandwidth allocation and/or partial channel bandwidth allocation. In an example, multiple UEs may map their CG-UCI and/or HARQ-ACK and/or CSI to a common CG resource differently (e.g., to different resource elements) based on pre-defined rule and/or RRC configuration and/or one or more indications from the BS. For example, the resource elements for CG-UCI mapping may be UE-specific resource and/or group common resources. For example, the resource elements may be FDMed and/or TDMed. For example, the FDMed resources may be contiguous in frequency domain or non-contiguous (e.g., interlaced).

For example, the CG resource may have a bandwidth comprising one or more LBT subbands. For example, one or more UEs may map the CG-UCI to the entire bandwidth of the CG resource. For example, in a wideband operation, one or more UEs may map the CG-UCI to different resource elements in different subbands. For example, the one or more UEs may map the CG-UCI to different resource elements spanning the entire CG bandwidth, e.g., over one or more LBT subbands. For example, the different resource elements may not overlap in frequency domain. For example, the different resource elements may be confined to one LBT subband. For example, the different resource elements may not be confined to one LBT subband. For example, the different resource elements may be contiguous or non-contiguous in frequency domain. For example, the different resource elements may be interlaced across one or more LBT subband.

Figure 20:
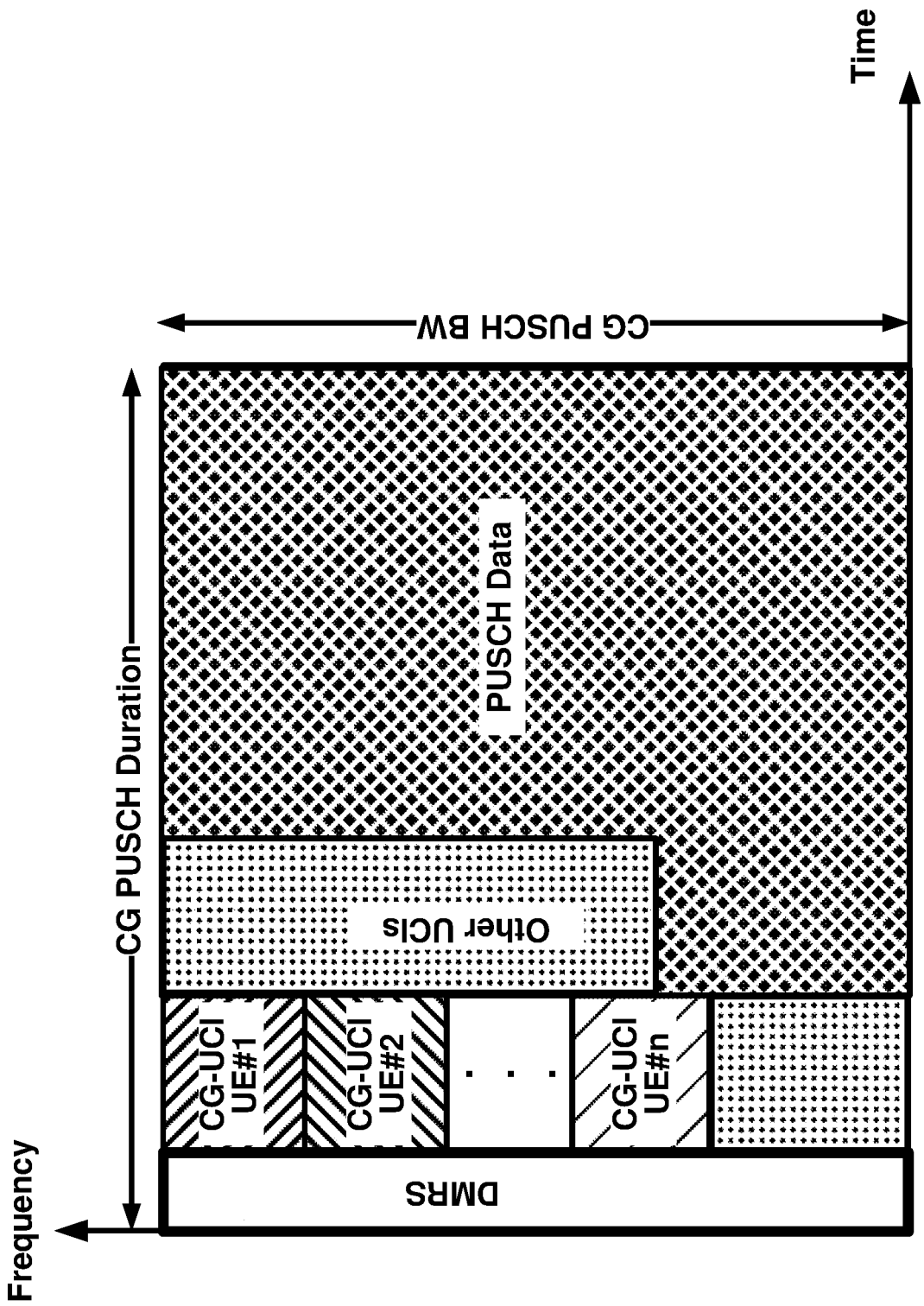
FIG. 20 illustrates example mapping of CG-UCI in a same CG resource for different wireless device as per an aspect of an example embodiment of the present disclosure.

FIG. 20 shows an example where BS configures a configured grant resource while allows multiple, e.g. n, UEs multiplexing in the same CG resource. In this example, each UE is allocated with separate (FDMed) resource elements (REs)/physical resource blocks (PRBs) in the frequency domain for mapping CG-UCI in a common CG resource. The BS may configure FDMed CG-UCI REs/PRBs for one or more UEs. The CG-UCI REs/PRBs for each/one or more UE(s) may be contiguous (as shown in the FIG. 20) or non-contiguous (e.g., interlaced). The one or more UEs may map the DMRS and/or other UCIs (e.g. HARQ-ACK and/or CSI) and/or the PUSCH data to the same region/REs/PRBs. For example, UE #1 may map the CG-UCI to the first FDMed CG-UCI resource (to one or more REs/PRBs associated with CG-UCI UE #1). The UE #1 may start mapping other UCIs, e.g., HARQ-ACK and/or CSI, and/or PUSCH data immediately after the CG-UCI (e.g., after the one or more REs/PRBs associated with CG-UCI UE #1), e.g., in the same OFDM symbol. For example, the UE #1 may not map other UCIs and/or PUSCH data to one or more REs/PRBs allocated for other UEs CG-UCI. For example, UE #1 may empty the REs/PRBs associated with/allocated to CG-UCI UE #2 to CG-UCI UE #n. For example, the UE #1 may start mapping other UCIs and/or PUSCH data after a last FDMed RE/PRB of the CG-UCI REs/PRBs, e.g., allocated to a last UE (UE #n). For example, each UE may map the CG-UCI to the allocated REs/PRBs and may not map other UCIs and/or PUSCH data to the REs/PRBs allocated to any CG-UCI (e.g., of other UEs). For example, the BS may indicate a reference RE/PRB for the one or more UEs to start mapping other UCIs and/or PUSCH data after the CG-UCI. For example, the reference RE/PRB may be a first RE/PRB in the CG resource after a last RE/PRB allocated to a CG-UCI transmission, in a same symbol or a next symbol. The CG-UCI REs/PRBs for each/one or more UE(s) may be mapped across one or more LBT subbands, e.g., based on a CG PUSCH bandwidth. For example, for wideband CG (e.g., when CG bandwidth comprises two or more LBT subbands) the CG-UCI mapping may be the same (e.g., as shown in FIG. 20). In an example, a BS may configure an offset (e.g., 0 for UE #1, K for UE #2, 2K for UE #3, and so on in FIG. 20) to a wireless device. The wireless device may determine a starting PRB for a CG-UCI based on a starting PRB of a CG PUSCH and the offset (e.g., a first PRB of the CG PUSCH for UE #1, a K-th PRB of the CG PUSCH for UE #2, and so on). The base station may additionally configure a number of PRBs and/or a number of OFDM symbols used for the CG-UCI mapping. This may define a number of REs used for the CG-UCI which performs a similar function to a beta-offset parameter. Based on configurations, a first CG-UCI of a first wireless device may overlap or may not overlap with a second CG-UCI of a second wireless device.

Figure 21:
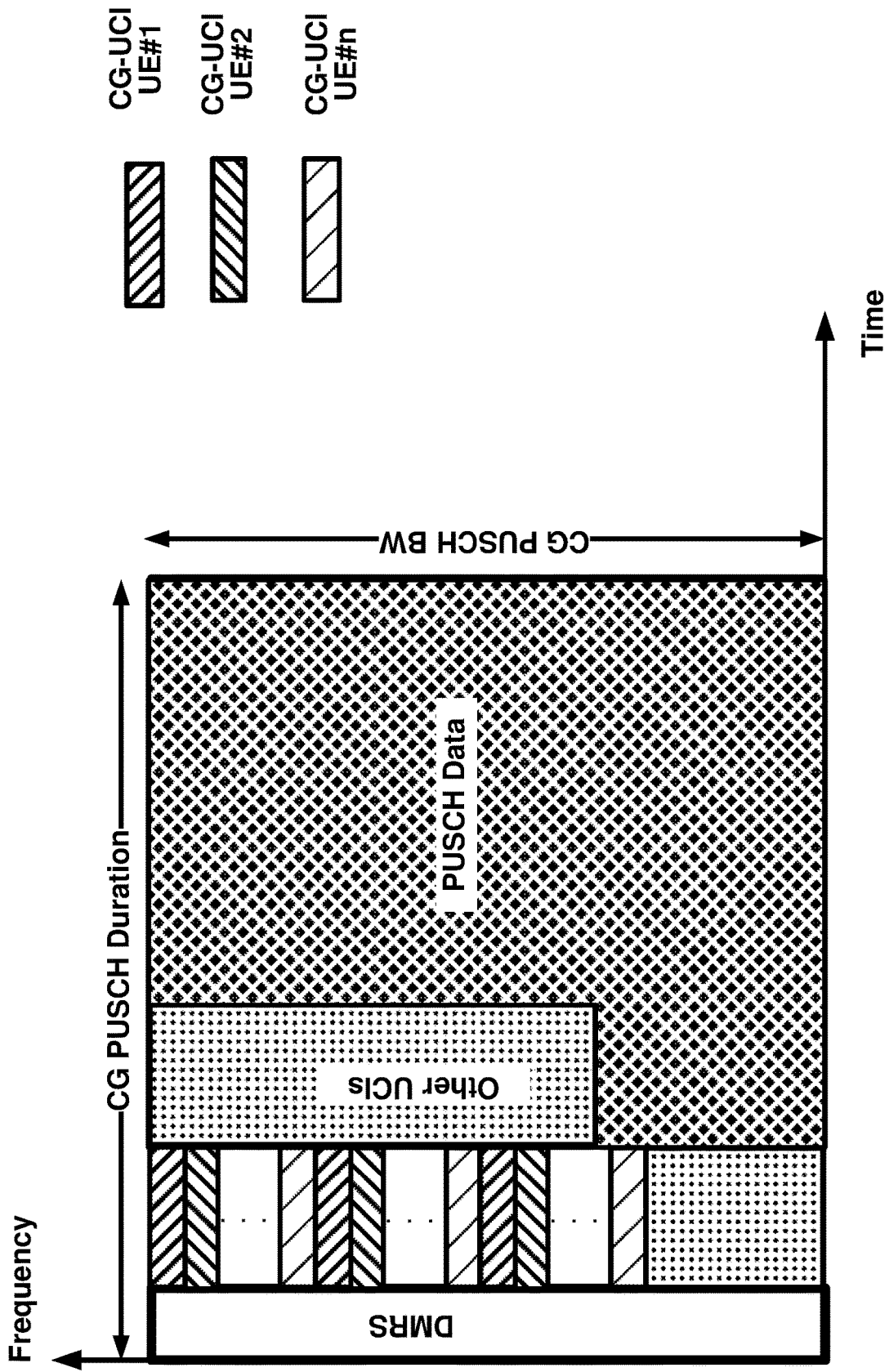
FIG. 21 illustrates example mapping of CG-UCI in a same CG resource for different wireless device based on interlacing as per an aspect of an example embodiment of the present disclosure.

FIG. 21 shows an example where non-contiguous (e.g., interlaced) FDMed resources are allocated for CG-UCI of one or more UEs configured with the same CG resource. In this example, a size of the entire region allocated to CG-UCI is fixed and known to the one or more UEs. In this example, the one or more UEs map other UCIs and/or PUSCH data to the same region/REs/PRBs starting after the whole CG-UCI region/bandwidth. This example avoids empty regions within the CG-UCI symbol by spreading each CG-UCI across the whole bandwidth allocated to CG-UCIs.

The BS may indicate one or more frequency offsets to one or more UEs to indicate a first allocated RE/PRB for CG-UCI of the one or more UEs within a common CG resource. The one or more frequency offsets may be with respect to a starting RE/PRB/subcarrier of the CG resource. The one or more frequency offsets may be with respect to a reference PRB of the subband/bandwidth part (e.g. first PRB of a subband, or PRB0 of a bandwidth part). The one or more frequency offsets may be with respect to a reference PRB of an uplink cell (e.g., point A indicated in a SIB, by RRC signaling for the UL cell). The one or more frequency offsets may be with respect to a reference PRB excluding/after the PRBs associated with one or more guard bands of the carrier/BWP/subband. For example, a wireless device may need K PRBs in each LBT subband (e.g., K/2 PRBs in each side of the LBT subband). K PRBs may be determined based on a UE capability. K PRBs may be determined based on a RSRP of an unlicensed cell. K PRBs may be fixed. K PRBs may be determined based on a UE allowed power (e.g., 5 PRBs for 23 dBm allowed power, 10 PRBs for 30 dBm allowed power). For example, K PRBs may be determined based on a numerology used in the unlicensed cell. The wireless device may map data over the guard-band of a LBT subband. The wireless device may not map a UCI (e.g., CG-UCI) over the guard-band of the LBT subband. The one or more frequency offsets may be configured such that the CG-UCIs are not mapped to one or more REs/PRBs of one or more guardbands, e.g., in-carrier and/or edge of carrier guardbands. For example, UE may not map CG-UCI to one or more REs/PRBs that overlap with guardbands, e.g., in-carrier guardbands and/or carrier edge guardbands. The wireless device may transmit a UE capability of K PRBs (e.g., a guard band size) to the base station. The K PRBs may be based on a reference numerology (e.g., 15 kHz) and may be assumed to have a same size (e.g., 2K PRBs with 30 kHz) for different numerologies. The wireless device may transmit a guard band size for a numerology.

In an example, a base station may configure an offset to avoid mapping of a CG-UCI over a guard band in consideration of a RSRP. The base station may configure a set of {an offset, a RSRP threshold}. The wireless device may select the offset based on a RSRP of a cell. For example, if the RSRP exceeds the RSRP threshold, the wireless device may select the offset. The wireless device may select a smallest offset if there are multiple pairs satisfied. In an example, an offset may be a LBT subband index. In an example, a wireless device may be configured with an offset and a RSRP threshold. The wireless device may determine resources for a CG-UCI mapping based on the offset in response to a RSRP exceeding the RSRP threshold. The wireless device may not apply the offset in otherwise.

In an example, the CG-UCI partitioning may be per UE and/or group of UEs. For example, each CG-UCI resource may be explicitly and/or implicitly mapped to one or more UE-IDs and/or one or more DMRS scrambling IDs and/or one or more HARQ processing IDs and/or one or more RSRP intervals/thresholds.

For example, one or more frequency/PRB offsets may be pre-defined. For example, the BS may configure the one or more frequency offsets via RRC signaling. For example, the BS may indicate the one or more frequency offsets via DCI (e.g., activation DCI for CG type 2). For example, the one or more frequency offsets may be implicitly indicated to a UE. For example, the UE may determine the one or more frequency offsets based on one or more pre-configured and/or pre-defined values, e.g. a DMRS scrambling ID/sequence number and/or UE-ID and/or HARQ ID. For example, a mapping function and/or table may be defined between DMRS scrambling ID and/or UE-ID and/or HARQ ID and one or more frequency/PRB offsets and/or interlace patterns. For example, a number of PRBs allocated to one or more UE for CG-UCI may be indicated, e.g. by one or more parameters. The one or more parameters may be one or more beta-offset values. For example, the BS may indicate, via RRC/DCI signaling, the one or more beta-offset values. For example, the one or more beta-offset values may be a function one or more DMRS scrambling IDs. For example, the BS may configure similar beta-offset value for all FDMed CG-UCI regions/REs/PRBs. For example, the CG-UCI beta-offset value may be the same as HARQ-ACK beta-offset value.

In an example, a base station may configure one or more CG-UCI regions/REs/PRBs within a CG resource for partitioning, e.g. in frequency domain, the CG-UCI transmissions of a plurality of UEs based on their RSRP. For example, the base station may indicate/configure one or more RSRP threshold and indicate a mapping of CG-UCI region, e.g., PRB offset, to one or more RSRP intervals. A UE measure a RSRP and compare it to the one or more RSRP threshold. The one or more RSRP thresholds may be pre-defined. The UE may determine a first frequency/PRB offset and/or a first interlace pattern if, for example, the RSRP is above a first threshold and/or below a second threshold. The UE may map the CG-UCI in the CG PUSCH based on the first frequency offset and/or first interlace pattern. For example, the base station may allocate a first CG-UCI region, e.g. one or more REs/PRBs, to one or more center UEs with higher RSRP values, and a second CG-UCI region to one or more edge UEs (e.g., far UEs near the edge of the cell) with lower RSRP values. As a result, a reliability of edge UE CG-UCI transmission is enhanced, by ensuring center UEs CG-UCI transmission using the same CG resource, who have higher received power at the BS, may not collide/interfere. For example, a frequency/PRB offset from the guardband(s) associated with an edge UE may be larger than a center UE, e.g. to provide the edge UE with a better channel.

A UE may receive one or more messages comprising configuration parameters indicating radio resources of a configured grant. The radio resources may be periodic. The radio resources may comprise a first CG resource, e.g., a time/frequency resource, that spans over two or more LBT subbands. For example, the first CG resource may be a wideband resource, configured for a wideband operation scenario. The configuration parameters may further indicate one or more DMRS scrambling ID/sequence, and/or one or more frequency/PRB offsets for mapping CG-UCI in the CG PUSCH. For example, each of the one or more frequency/PRB offsets may indicate a CG-UCI region comprising one or more REs/PRBs (e.g., in a first non-DMRS symbol of the PUSCH).

The first CG resource may comprise one or more CG-UCI regions, e.g., each CG-UCI may be in one of the two or more LBT subbands. Each of the one or more frequency/PRB offsets may indicate a CG-UCI region in each of the two or more subbands. For example, the one or more frequency offsets may be different or may be the same. For example, one or more beta-offset values associated with number of PRBs allocated to a CG-UCI in each LBT subband may be different or may be the same. For example, the CG-UCI region in each subband may exclude the in-carrier guardbands in between the subbands and/or carrier edge guardbands. For example, the UE may not map the CG-UCI to one or more PRBs overlapping with guardbands. The one or more CG-UCI regions may be confined to a subband bandwidth. In an example, the BS may configure one CG-UCI region for the first CG resource. The one CG-UCI region may be confined to a bandwidth of one subband. The one CG-UCI region may span over entire bandwidth of the first CG resource. The one CG-UCI region may span over two or more subbands of the first CG resource.

Figure 22:
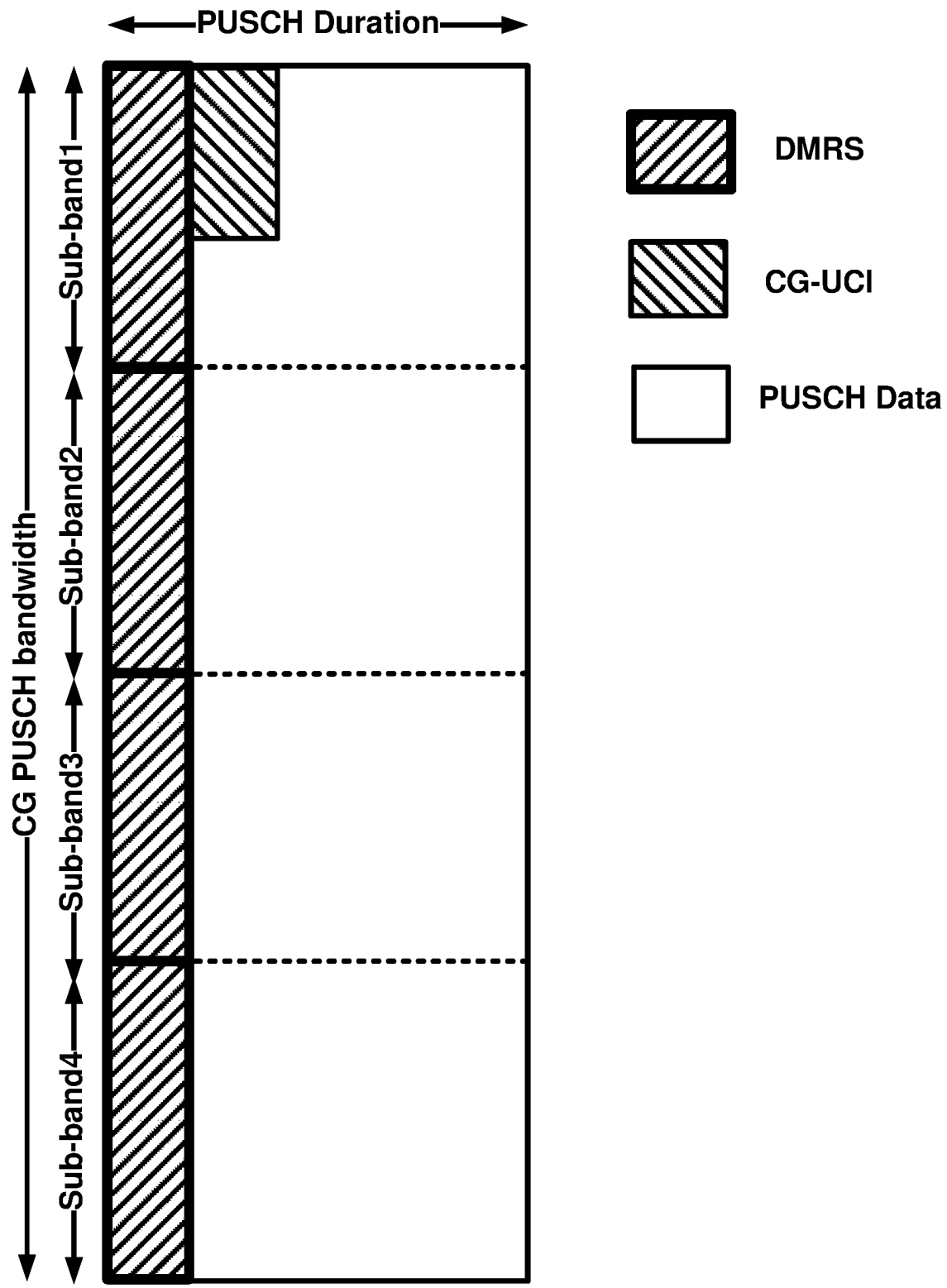
FIG. 22 illustrates example mapping of CG-UCI to a LBT subband in a wideband configured grant as per an aspect of an example embodiment of the present disclosure.

FIG. 22 shows an example where the UE maps a CG-UCI to a CG-UCI region comprising one or more REs/PRBs in a first subband of two or more subbands within the CG PUSCH bandwidth. The UE may multiplex the CG-UCI in the PUSCH within the first subband. For example, the UE may perform rate-matching for multiplexing the CG-UCI. For example, the UE may puncture/empty one or more first REs of the CG PUSCH resource on the first subband allocated to CG-UCI, and adjust a data rate/encoding rate on one or more second REs of the CG PUSCH resource, and encode the CG-UCI on the one or more first REs. For example, the UE may perform puncturing for multiplexing the CG-UCI. For example, the UE may puncture/empty one or more REs of the CG PUSCH resource on the first subband allocated to CG-UCI, and encode the CG-UCI on the one or more REs.

The first subband may be a subband with a smallest index than other subbands in the CG PUSCH bandwidth/BWP. The first subband may be indicated by the BS. For example, the BS may send a DCI indicating a COT sharing with the UE on one or more of the subbands comprising the first subband. For example, the BS may indicate the first subband via semi-static configuration. The UE may select the first subband e.g., randomly. The UE may select the first subband based on at least one of the following: a congestion level of the first subband being less than other subbands; and/or a RSRP in the first subband being greater than other subbands; and/or a LBT failure counter of the first subband being less than other subbands; and/or a LBT failure timer of the first subband being shorter or longer than other subbands; and/or a channel occupancy ratio of the first subband being smaller than other subbands; and/or a guardband size of the first subband being smaller than other subbands.

The bandwidth of the CG resource may comprise two or more subbands. The UE may map the CG-UCI on one or more REs/PRBs allocated to CG-UCI on a first subband. The UE may map the PUSCH data on REs (after the CG-UCI REs) of the two or more subbands. For example, the UE may perform rate-matching of the PUSCH to map/multiplex the CG-UCI in the PUSCH. The UE may multiplex the CG-UCI in the CG PUSCH. The UE may perform one or more LBTs on the two or more subbands of the CG PUSCH bandwidth. The UE may transmit the CG-UCI and/or PUSCH in one or more subbands where LBT is successful (channel is idle). For example, the UE may transmit the CG-UCI if the LBT in the first subband is successful. For example, the UE may not transmit the CG-UCI if the LBT in the first subband is failed. For example, the UE may drop the CG-UCI.

Figure 23:
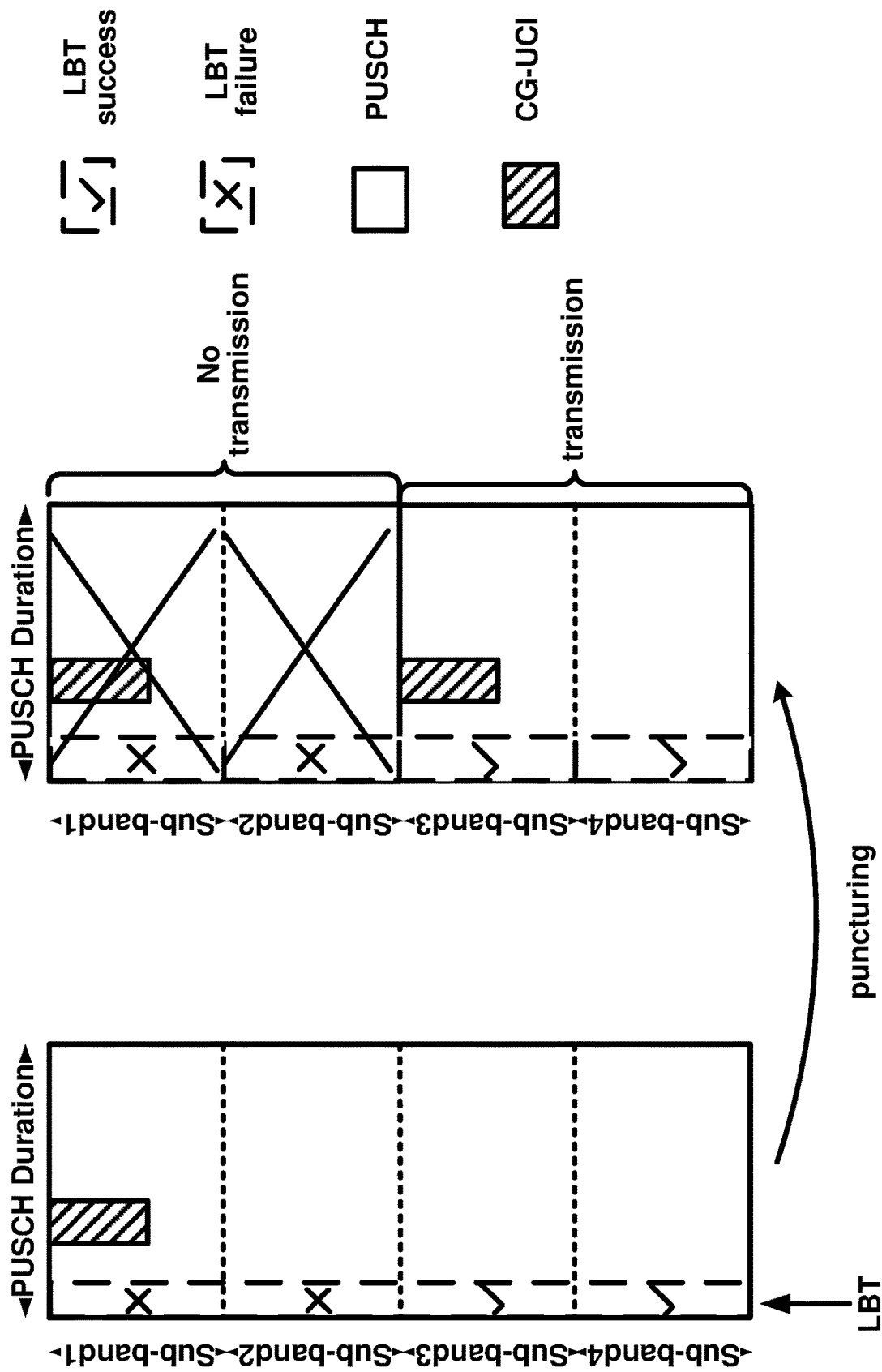
FIG. 23 illustrates an example multiplexing of CG-UCI on different LBT subbands based on LBT result(s) as per an aspect of an example embodiment of the present disclosure.

FIG. 23 shows an example where the UE maps/multiplexes the CG-UCI on one or more REs in the first subband (subband1) and performs LBT. In this example, the LBT result is failed in subband1 and subband2, and is successful in subband3 and subband4. The UE may perform no transmission, e.g., no CG-UCI and/or PUSCH transmission, in the subbands with failed LBT (e.g., subband1 and subband2). For example, the UE may puncture/empty/vacate the PUSCH data on the subbands with failed LBT subbands. The UE may place the CG-UCI in one or more REs of one or more subbands with successful LBT results (e.g. subband3 and/or subband4), e.g., by puncturing and/or rate-matching the PUSCH data around the one or more REs. For example, only one subband that is not the first subband may have successful LBT, and the UE may map the CG-UCI on that subband. For example, LBT may fail on all subbands and UE may drop the PUSCH and CG-UCI transmission. For example, two or more subbands not comprising the first subband may have successful LBTs (e.g., subband3 and subband4). The UE may have not multiplexed the CG-UCI on REs in the two or more subbands with successful LBT. In response to the LBT failure in the first subband, the UE may multiplex the CG-UCI in one or more REs/PRBs in one or more subbands of the two or more subbands. For example, the UE may select a second subband (subband3 in FIG. 23) from the two or more subbands, and multiplex the CG-UCI in REs in the second subband, e.g. by puncturing the REs in the second subband. The UE may not change a mapping of data to resources regardless of LBT results and regardless of a new LBT subband used for the CG-UCI mapping. The wireless device may override the CG-UCI over data REs (e.g., puncturing) on the new LBT subband. The UE may transmit the CG-UCI on the second subband.

In case the LBT in the first subband fails and the LBT in the two or more subbands excluding the first subband succeed, the UE may select a second subband from the two or more subbands. The UE may select the second subband based on at least one of the following: a congestion level of the second subband being less than other subbands; and/or a RSRP in the second subband being greater than other subbands; and/or a LBT failure counter of the second subband being less than other subbands; and/or a LBT failure timer of the second subband being shorter or longer than other subbands; and/or a channel occupancy ratio of the second subband being smaller than other subbands; and/or a guardband size of the second subband being smaller than other subbands. The second subband may be a subband with a smallest index among the two or more subbands. The second subband may be indicated by the BS. For example, the BS may send a DCI indicating a COT sharing with the UE on one or more of the subbands comprising the second subband. For example, the BS may indicate the second subband via semi-static configuration. The UE may select the second subband randomly.

By mapping/multiplexing the CG-UCI to REs in one subband, the UE may have more available bits for encoding PUSCH data and/or other UCIs comprising HARQ-ACK and/or CSI, compared to the case that UE maps/multiplexes the CG-UCI in REs across multiple subbands. However, due to puncturing, a reliability of the CG PUSCH transmission may be alleviated.

In an example, the UE may map/multiplex the CG-UCI in a CG PUSCH that spans over two or more subbands. The UE may multiplex/map the CG-UCI in/onto at least one of the two or more subbands. The UE may multiplex/map the CG-UCI in/onto the two or more subbands. The UE may map same encoded bits of CG-UCI, e.g. repeatedly, on each of the two or more subbands. For example, the UE may map the CG-UCI on one or more REs/PRBs in each of the two or more subbands. For example, a number of REs/PRBs for CG-UCI mapping in each of the tow or more subbands may be the same or different. For example, a frequency/PRB offset to the one or more REs/PRB s in each of the two or more subbands may be the same or different. For example, the BS may indicate the size, e.g. a number of REs/PRBs for CG-UCI mapping, and/or the frequency/PRB offset to the one or more REs/PRBs in each of the two or more subbands. For example, the REs/PRBs in the two or more subbands may be contiguous and/or non-contiguous. For example, the UE may map the CG-UCI for one or more times on the REs/PRBs across the two or more subbands, e.g. by interlacing. This may increase a robustness of the CG-UCI transmission by utilizing channel diversity across subbands.

In an example, a bandwidth of a first CG resource may comprise a first subband and a second subband. The UE may map/multiplex the CG-UCI of the PUSCH in the first CG resource. The UE may multiplex the CG-UCI as a first CG-UCI in one or more REs/PRBs of the first subband with a first frequency/PRB offset and/or as a second CG-UCI in one or more REs/PRB s of the second subband with a second frequency/PRB offset. The UE may perform one or more LBTs in the channel(s) of the first subband and the second subband. The UE may transmit the CG PUSCH and/or the CG-UCI on at least one of the first subband and the second subband where the one or more LBTs are successful. The UE may perform rate-matching of the CG PUSCH in the first subband and the second subband for multiplexing the CG-UCI. For example, the UE may puncture one or more first REs of one or more PRBs in the first subband and the second subband, and adjust a data/encoding rate on one or more second REs of the one or more PRBs in the first subband and the second subband, and encode the CG-UCI on the one or more first REs. The UE may do the same for other UCIs, e.g. HARQ-ACK and/or CSI. For example, the UE may map/multiplex the other UCIs in the PUSCH in the same way as CG-UCI, e.g., across the two or more subbands, e.g., repeatedly and/or by interleaving.

Figure 24:
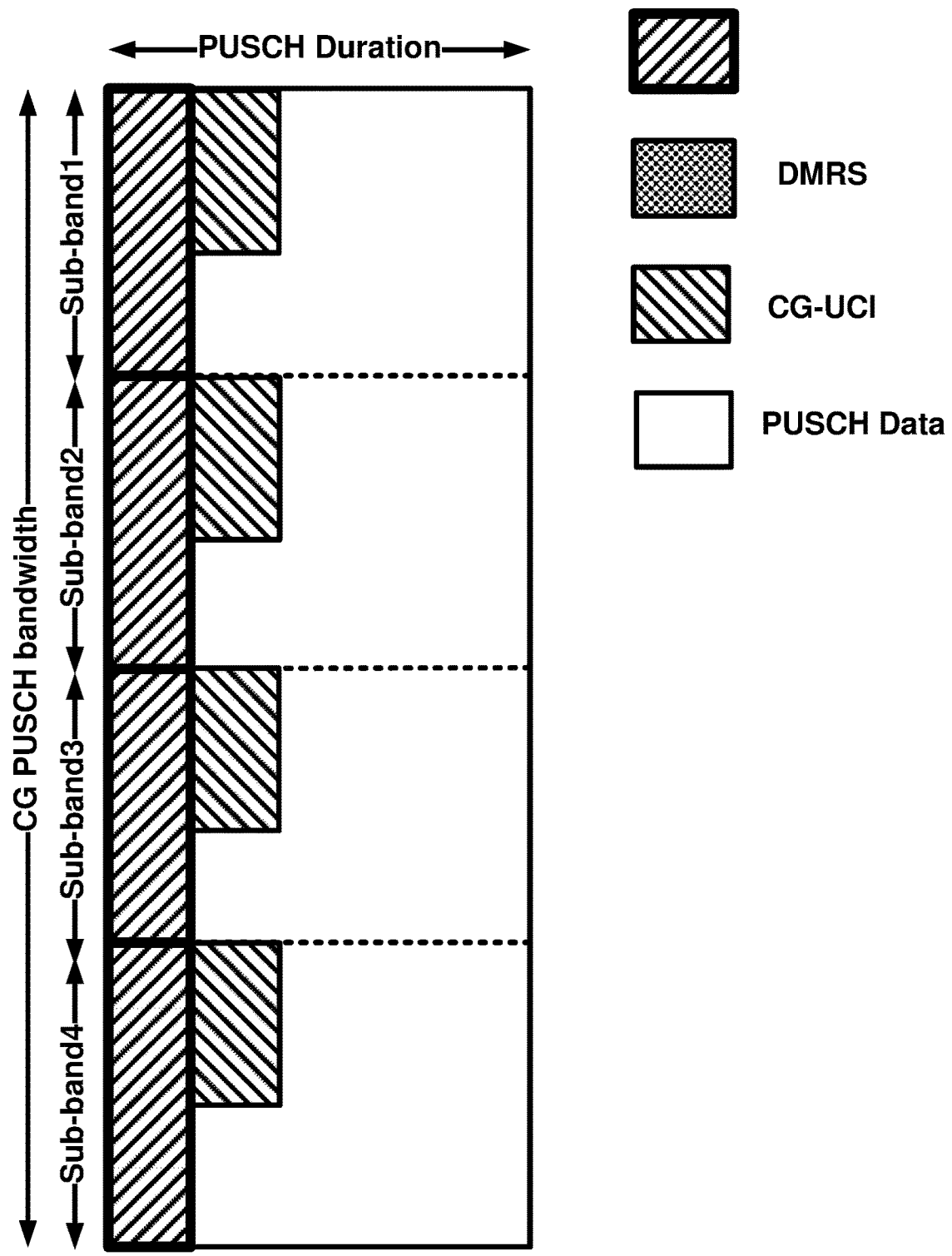
FIG. 24 illustrates an example mapping of CG-UCI repeatedly on multiple LBT subbands of a wideband configured grant as per an aspect of an example embodiment of the present disclosure.

FIG. 24 shows as an example where the UE maps/multiplexes the CG-UCI repeatedly, e.g. on same number of REs/PRBs and with same PRB offset, across four subbands of the CG PUSCH bandwidth (subband1 and subband2 and subband3 and subband4). The UE may map an encoded UCI bits starting from a first subband in an interlaced manner (e.g., a first RE of a first PRB of a first subband, a first RE of a first PRB of a second subband, a first RE of a first PRB of a third subband, . . . , a second RE of the first PRB of the first subband, a second RE of the first PRB of the second subband, . . . , a first RE of a second PRB of the first subband, a first RE of a second PRB of the second subband, . . . , and so on). This interleaving may randomize interferences on a subband.

Figure 25:
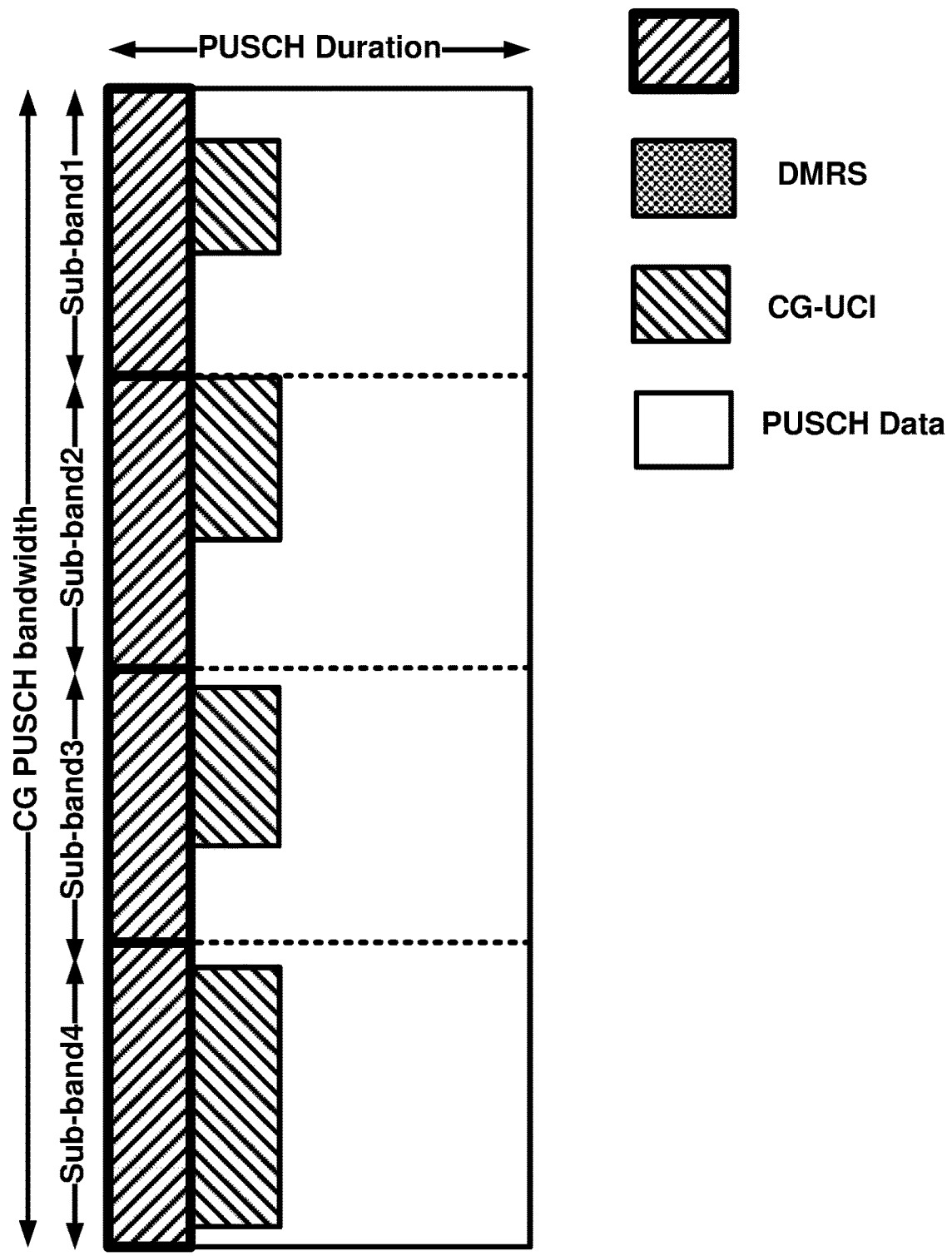
FIG. 25 illustrates an example mapping of CG-UCI on multiple LBT subbands of a wideband configured grant with different frequency offset(s) and/or different number of PRBs as per an aspect of an example embodiment of the present disclosure.

FIG. 25 shows an example where a number of PRBs of the CG-UCI (e.g. a beta-offset for multiplexing the CG-UCI) and/or a PRB offset for multiplexing the CG-UCI in each subband are different.

Figure 26:
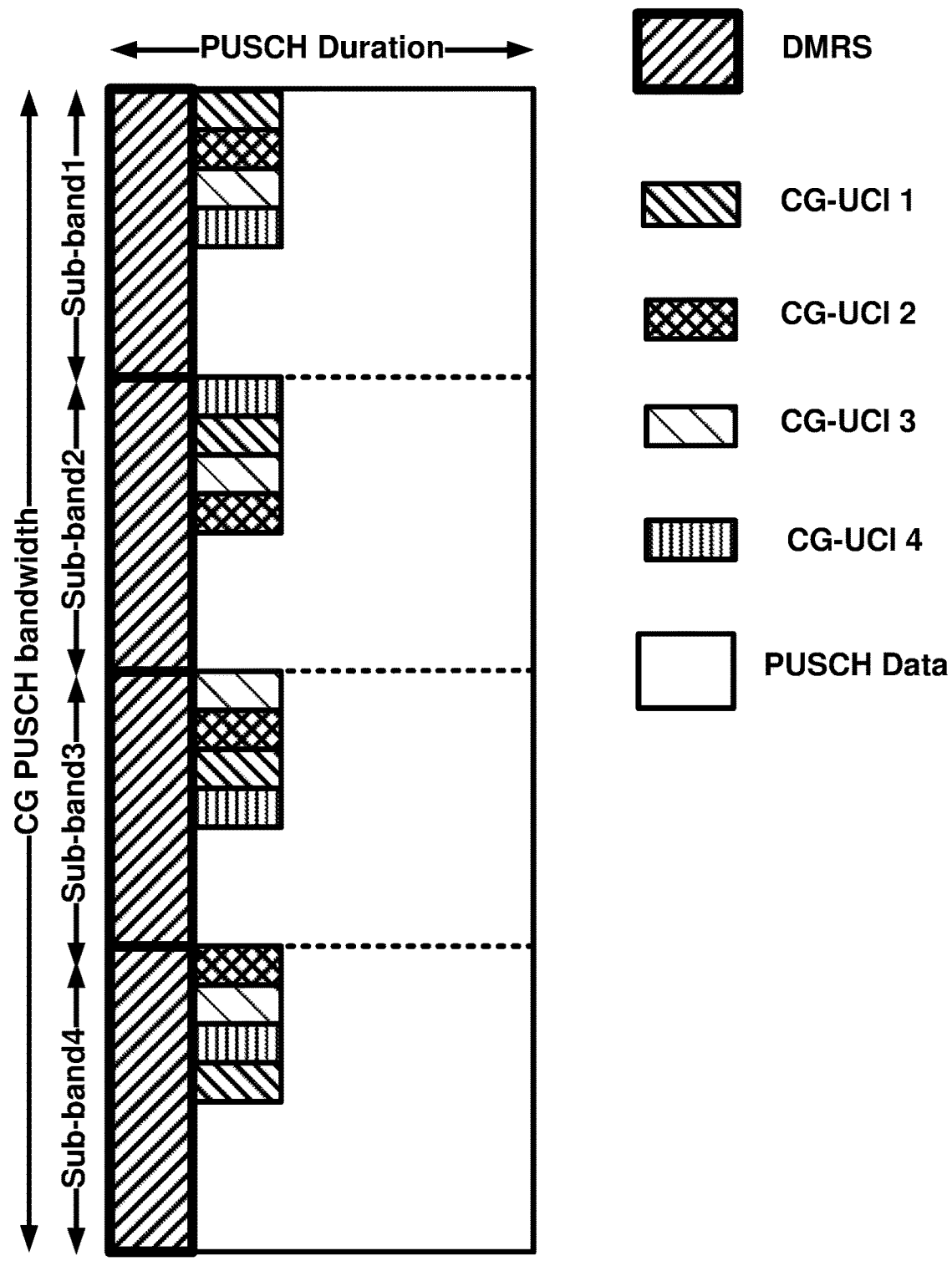
FIG. 26 illustrates an example mapping of CG-UCI on multiple LBT subbands of a wideband configured grant using interleaving as per an aspect of an example embodiment of the present disclosure.

FIG. 26 shows an example where the UE prepares four CG-UCI parts/PRB(s), e.g. CG-UCI 1, CG-UCI 2, CG-UCI 3, and CG-UCI 4. For example, the CG-UCI may comprise the four CG-UCI parts/PRB(s). For example, the four CG-UCI parts/PRB(s) may be different portions of the CG-UCI. For example, each of the CG-UCI parts/PRB(s) may comprise one or more PRBs. The UE may map each CG-UCI part/PRB(s) differently in each subband. For example, the UE may use different interlace/interleaving pattern(s) for the CG-UCI in each subband. For example, a PRB offset for mapping a CG-UCI part/PRB(s) in each subband may be different. For example, assuming each CG-UCI part in FIG. 26 is one PRB, the CG-UCI 1 is mapped with: a PRB offset of zero in subband 1, a PRB offset of one in subband 2, a PRB offset of two in subband 3, and a PRB offset of three in subband 4. Different PRB offsets may be used for mapping different CG-UCI and/or other UCIs in each of the two or more subbands.

A UE may map/multiplex the CG-UCI and/or other UCIs (e.g., HARQ-ACK, CSI part 1, CSI part 2, SR, etc.) in one or more PRBs across two or more subbands within a CG PUSCH. The UE may multiplex the CG-UCI by rate-matching and/or puncturing of the PUSCH in each subband. The UE may perform one or more LBTs in the two or more subbands for transmitting the CG PUSCH and/or the CG-UCI and/or other UCIs on the PUSCH.

For example, the result of the one or more LBTs may indicate channel(s) of the two or more subbands are idle/available. For example, the one or more LBTs may be successful in the two or more subbands. In that case, the UE may transmit the CG-UCI and/or the CG PUSCH and/or other UCIs via one or more PRBs over the two or more subbands. For example, the base station may receive two or more copies of the CG-UCI in the two or more subbands. For example, the CG-UCI in each subband may be interleaved. For example, the CG-UCI may be interlaced across the two or more subbands. The BS may be able to decode the CG-UCI by combining the two or more copies of the CG-UCI from the two or more subbands, with higher probability of successful decoding. For example, if the channel in of the subbands is bad, the BS may not be able to successfully decode the CG-UCI in that subband. For example, using the channel diversity across the two or more subbands may help the BS successfully decode the CG-UCI by combining the two or more received versions of the CG-UCI from the two or more subbands.

In an example, the result of the one or more LBTs may indicate channel(s) of the two or more subbands are busy/occupied/unavailable. For example, the one or more LBTs may be failed in the two or more subbands. In that case, the UE may not transmit the CG-UCI and/or the CG PUSCH and/or other UCIs via one or more PRBs over the two or more subbands.

In an example, the result of the one or more LBTs may indicate channel(s) of at least one of the two or more subbands are idle/available. For example, the one or more LBTs may be successful in the at least one of the two or more subbands. In that case, the UE may transmit the CG-UCI and/or the CG PUSCH and/or other UCIs via one or more PRBs over the at least one of the two or more subbands. For example, the UE may transmit the CG-UCI and/or the CG PUSCH and/or other UCIs via one or more PRBs over a first subband of the at least one of the two or more subbands. For example, the UE may puncture/vacate the REs/PRBs of one or more subbands where the LBT is failed.

In an example, multiplexing CG-UCI over two or more subbands of the CG PUSCH may increase a likelihood of CG-UCI transmission despite LBT failure in one or more of the tow or more subbands. In an example, multiplexing the CG-UCI over the two or more subbands of the CG PUSCH by rate-matching of the PUSCH may be better than multiplexing the CG-UCI in one subband of the CG PUSCH, because of a likelihood of LBT failure. A UE may multiplex the CG-UCI in one subband of the CG PUSCH, and if LBT fails on the one subband, the UE may multiplex the CG-UCI in a second subband of the CG PUCH by puncturing the PUSCH in the second subband. However, that may result in an alleviated transmission of the PUSCH as some of the PUSCH data is removed on the fly. It may be better if the UE multiplexes one or more versions of the CG-UCI (e.g., with one or more encoding rates and/or one or more offsets and/or one or more interlace patterns, etc.) in PRBs of the two or more subbands, as there would be no need for removing/puncturing data on the fly, and a rate of data encoding may be matched/adjusted to allow for multiplexing the CG-UCI without any need to lose data bits. For example, a BS may receive at least one copy/version of the CG-UCI if LBT is successful in at least one of the subbands of the CG. Thus, a likelihood of CG-UCI transmission/reception is increased. The BS may receive two or more copies/versions of the CG-UCI via two or more subbands of the CG. Thus, a likelihood of successful decoding of the CG-UCI is enhanced by, e.g., combining the received bits from the two or more subbands.

A wireless device may receive one or more messages comprising configuration parameters of radio resources of a configured grant. The radio resources may comprise a first radio resource spanning over a first subband and a second subband. The wireless device may multiplex the CG-UCI of PUSCH transmission in the first resource. The CG-UCI may be multiplexed as a first UCI in one or more first resource blocks of the first subband with a first frequency offset; and as a second UCI in one or more second resource blocks of the second subband with a second frequency offset. The wireless device may transmit, via the first resource, at least one of the first UCI and the second UCI based on one or more LBT procedures performed on the first subband and the second subband. The first UCI and the second UCI may be the same. The first UCI may comprise a first part of the CG-UCI and the second UCI may comprise a second part of the CG-UCI. The first frequency offset and the second frequency offset may be with respect to a reference resource block of a BWP comprising/associated with the first subband and the second subband. The first frequency offset and the second frequency offset may be with respect to a reference resource block of the first resource. The first frequency offset and the second frequency offset may be the same. The first frequency offset and the second frequency offset may be greater than a bandwidth of a guardband of the first subband and the second subband. The first subband and the second subband may be contiguous or non-contiguous. The wireless device may transmit the first UCI multiplexed in the PUSCH transmission in the first subband in response to the one or more LBT procedures indicating the first subband is idle. The wireless device may transmit the second UCI multiplexed in the PUSCH transmission in the second subband in response to the one or more LBT procedures indicating the second subband is idle. The wireless device may transmit the first UCI multiplexed in the PUSCH transmission in the first subband in response to the one or more LBT procedures indicating the first subband is idle. The wireless device may puncture a part of the first resource overlapped with the first/second subband in response to the one or more LBT procedures indicating that the first/second subband is occupied. The wireless device may not perform the PUSCH and/or CG-UCI transmission in the first/second subband in response to the one or more LBT procedures indicating that the first/second subband is occupied. The wireless device may transmit the first UCI and the second UCI multiplexed in the PUSCH transmission in the first subband and the second subband in response to the one or more LBT procedures indicating that the first subband and the second subband are idle. The first resource may comprise one or more slots and/or one or more symbols and one or more resource blocks and/or one or more subcarriers. The first resource block and the second resource block may correspond to one or more first symbols of the first resource. For example, the first resource block and the second resource block may correspond to a first non-DMRS symbol of the first resource. The one or more first symbols may comprise a first symbol after a demodulation reference signal symbol.

A wireless device may receive one or more messages comprising configuration parameters of radio resources of a configured grant. The radio resources may comprise a first resource spanning over a first subband and a second subband. The wireless device may multiplex, using a first multiplexing procedure, UCI of a PUSCH transmission in a first resource block of the first resource in the first subband. The wireless device may determine switching to a second multiplexing procedure for multiplexing the UCI of the PUSCH in a second resource block of the first resource in the second subband, for example, based on one or more LBT procedures indicating the first subband is occupied and the second subband is idle. The wireless device may transmit the PUSCH and/or the multiplexed UCI via the second resource block. The first multiplexing procedure may comprise rate-matching of the PUSCH. For the first multiplexing procedure the wireless device may puncture one or more first radio elements of the first resource block and adjust data/encoding rate on one or more second radio elements of the first resource block and encode the UCI on the one or more first radio elements. The first multiplexing procedure may comprise puncturing of the PUSCH. For the first multiplexing procedure the wireless device may puncture one or more radio elements of the first resource block and encode the UCI on the one or more radio elements. For the second multiplexing procedure the wireless device may puncture one or more first radio elements of the second resource block and adjust data/encoding rate on one or more second radio elements of the second radio resource block and encode the UCI on the one or more first radio elements. The second multiplexing procedure may comprise puncturing of the PUSCH. For the second multiplexing procedure the wireless device may puncture one or more radio elements of the second resource block and encode the UCI on the one or more radio elements. The UCI may be a CG-UCI and/or HARQ-ACK and/or CSI.

A wireless device may receive one or more messages comprising configuration parameters indicating radio resources of a configured grant and a frequency offset. The wireless device may determine a radio element for a CG-UCI based on a reference resource block of one of the radio resources of the configured grant and the frequency offset. The wireless device may multiplex the CG-UCI in PUSCH of the configured grant, starting from the radio element. The wireless device may transmit via the one of the radio resources the CG-UCI multiplexed in the PUSCH and/or the PUSCH. The wireless device may determine the frequency offset based on a DMRS sequence number/scrambling ID of the radio resources of the configured grant. The one or more messages may further indicate the DMRS sequence number/scrambling ID. The DMRS sequence number/scrambling ID may be mapped to one or more values comprising the frequency offset. For example, a first DMRS sequence number/scrambling ID may indicate a first frequency/PRB offset. The wireless device may determine the frequency offset based on a RSRP. For example, the wireless device may determine a first frequency offset in response to the RSRP being lower than a value, and a second frequency offset in response to the RSRP being higher than the value. The radio element for CG-UCI may not overlap with one or more resource blocks of a guardband. The wireless device may determine the radio element for the CG-UCI based on applying the frequency offset with respect to a reference resource block of the one of the radio resources of the configured grant. The reference resource block may be a first resource block of the one of the radio resources of the configured grant after one or more resource blocks of a guardband. The radio resources of the configured grant may span over one or more BLT subbands.

A base station may determine configuration parameters of a configured grant. The configuration parameters may indicate radio resources of the configured grant and one or more frequency offsets indicating one or more radio elements of the radio resources for receiving one or more CG-UCIs multiplexed in one or more PUSCHs. The base station may determine each of the one or more frequency offsets based on one or more DMRS sequence numbers/scrambling IDs. For example, for a first DMRS sequence number/scrambling ID, the base station may determine a first frequency offset. The base station may determine the one or more frequency offset based on one or more ranges of RSRP values. For example, for a first range of RSRP, the base station may determine a first frequency offset. The base station may determine the one or more frequency offsets based on one or more UE-IDs. The base station may determine the one or more frequency offsets based on bandwidth of one or more guardbands. The base station may transmit to one or more wireless devices one or more messages comprising the configuration parameters. The base station may receive from at least one of the one or more wireless devices and via the one or more radio elements, the one or more CG-UCIs each multiplexed in a PUSCH transmission.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
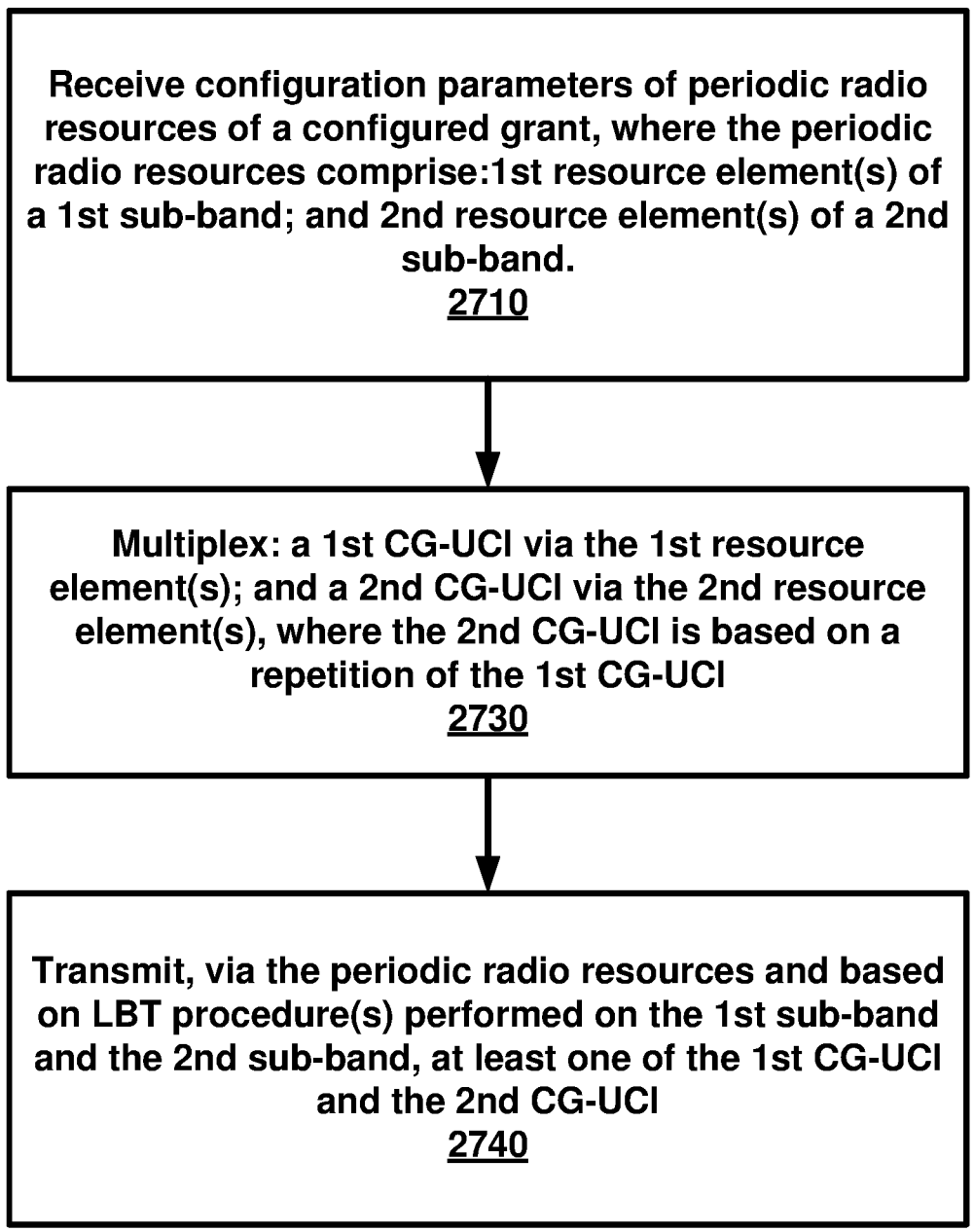
FIG. 27 is a flow diagram of an aspect of an example embodiment of the present disclosure.

FIG. 27 is an flow diagram as per an aspect of an example embodiment of the present disclosure. At 2710, a wireless device may receive configuration parameters of periodic radio resources of a configured uplink grant. The periodic radio resources may comprise: one or more first resource elements of a first sub-band; and one or more second resource elements of a second sub-band. At 2720, a wireless device multiplexing: a first configured grant uplink control information (CG-UCI) via the one or more first resource elements; and a second CG-UCI via the one or more second resource elements. The second CG-UCI may be based on a repetition of the first CG-UCI. At 2730, at least one of the first CG-UCI and the second CG-UCI may be transmitted via the periodic radio resources and based on one or more listen-before-talk (LBT) procedures performed on the first sub-band and the second sub-band.

According to various embodiment, multiplexing a CG-UCI may comprise multiplexing control bits for the CG-UCI onto data bits for a physical uplink shared channel (PUSCH), and a length of the control bits is determined based on a number of resource elements that can be used for transmission of the CG-UCI. According to various embodiments, the wireless device may determine, based on a first frequency offset and a number of the one or more first resource elements, a first length of first control bits for the first CG-UCI. According to various embodiment, the wireless device may determine, based on a second frequency offset and a number of the one or more second resource elements, a second length of second control bits for the second CG-UCI.

According to various embodiments, the wireless device may transmit the PUSCH via the periodic radio resources of the configured uplink grant and based on the one or more LBT procedures performed on the first sub-band and the second sub-band. According to various embodiments, the first CG-UCI and the second CG-UCI may comprise one or more hybrid automatic repeat request (HARD) process identifiers of the PUSCH. According to various embodiments, the first CG-UCI and the second CG-UCI may comprise one or more indicators indicating whether the PUSCH corresponds to new data. According to various embodiments, the first CG-UCI and the second CG-UCI may comprise one or more redundancy versions of the PUSCH. According to various embodiments, the first CG-UCI and the second CG-UCI may comprise channel occupancy time information.

According to various embodiments, the transmitting may comprise transmitting, in response to the one or more LBT procedures indicating the first sub-band and the second sub-band are idle: the first CG-UCI via the first sub-band; and the second CG-UCI via the second sub-band. According to various embodiments, in response to the one or more LBT procedures indicating the first sub-band is occupied and the second sub-band is idle: the first CG-UCI may not be transmitted via the first sub-band. According to various embodiments, in response to the one or more LBT procedures indicating the first sub-band is occupied and the second sub-band is idle, the second CG-UCI may be transmitted via the second sub-band.

According to various embodiments, the first sub-band and the second sub-band may comprise resource blocks of a bandwidth part. According to various embodiments, the first sub-band and the second sub-band may be adjacent. According to various embodiments, the one or more first resource elements and the one or more second resource elements may exclude one or more third resource elements of at least one guard-band between the first sub-band and the second sub-band.

What is claimed is:

1. A method comprising:
receiving, by a wireless device, configuration parameters of periodic radio resources of a configured uplink grant, wherein the periodic radio resources comprise a first physical uplink shared channel (PUSCH) transmission occasion comprising:
one or more first resource elements of a first sub-band; and
one or more second resource elements of a second sub-band;
multiplexing:
a first configured grant uplink control information (CG-UCI) in the one or more first resource elements of the first band; and
a second CG-UCI in the one or more second resource elements, wherein the second CG-UCI is based on a repetition of the first CG-UCI in the second band; and
transmitting, via the first PUSCH transmission occasion and based on one or more listen-before-talk (LBT) procedures performed on the first sub-band and the second sub-band, at least one of the first CG-UCI and the second CG-UCI.

2. The method of claim 1, wherein multiplexing a CG-UCI comprises multiplexing control bits for the CG-UCI onto data bits of the first PUSCH, and a length of the control bits is determined based on a number of resource elements that can be used for transmission of the CG-UCI.

3. The method of claim 2, further comprising determining:
based on a first frequency offset and a number of the one or more first resource elements, a first length of first control bits for the first CG-UCI; and
based on a second frequency offset and a number of the one or more second resource elements, a second length of second control bits for the second CG-UCI.

4. The method of claim 2, further comprising transmitting the first PUSCH via periodic radio resources of the configured uplink grant and based on the one or more LBT procedures performed on the first sub-band and the second sub-band.

5. The method of claim 4, wherein the first CG-UCI and the second CG-UCI comprise at least one of:
one or more hybrid automatic repeat request (HARQ) process identifiers of the first PUSCH;
one or more indicators indicating whether the first PUSCH corresponds to new data;
one or more redundancy versions of the first PUSCH; and
channel occupancy time information.

6. The method of claim 1, wherein the transmitting comprises transmitting, in response to the one or more LBT procedures indicating the first sub-band and the second sub-band are idle:
the first CG-UCI via the first sub-band; and
the second CG-UCI via the second sub-band.

7. The method of claim 1, further comprising, in response to the one or more LBT procedures indicating the first sub-band is occupied and the second sub-band is idle:
not transmitting the first CG-UCI via the first sub-band; and
transmitting the second CG-UCI via the second sub-band.

8. The method of claim 1, wherein the first sub-band and the second sub-band comprise resource blocks of a bandwidth part.

9. The method of claim 1, wherein the first sub-band and the second sub-band are adjacent.

10. The method of claim 9, wherein the one or more first resource elements and the one or more second resource elements exclude one or more third resource elements of at least one guard-band between the first sub-band and the second sub-band.

11. A wireless device comprising:
one or more processors; and
memory storing instructions that, when executed by the one or more processors, cause the wireless device to:
receive configuration parameters of periodic radio resources of a configured uplink grant, wherein the periodic radio resources comprise a first PUSCH transmission occasion comprising:
one or more first resource elements of a first sub-band; and
one or more second resource elements of a second sub-band;
multiplex:
a first configured grant uplink control information (CG-UCI) in the one or more first resource elements of the first band; and
a second CG-UCI in the one or more second resource elements, wherein the second CG-UCI is based on a repetition of the first CG-UCI in the second band; and
transmit, via the first PUSCH transmission occasion and based on one or more listen-before-talk (LBT) procedures performed on the first sub-band and the second sub-band, at least one of the first CG-UCI and the second CG-UCI.

12. The wireless device of claim 11, wherein multiplexing a CG-UCI comprises multiplexing control bits for the CG-UCI onto data bits of the first PUSCH, and a length of the control bits is determined based on a number of resource elements that can be used for transmission of the CG-UCI.

13. The wireless device of claim 12, wherein the instructions, when executed by the one or more processors, further cause the wireless device to determine:
based on a first frequency offset and a number of the one or more first resource elements, a first length of first control bits for the first CG-UCI; and
based on a second frequency offset and a number of the one or more second resource elements, a second length of second control bits for the second CG-UCI.

14. The wireless device of claim 12, wherein the instructions, when executed by the one or more processors, further cause the wireless device to transmit the first PUSCH via the periodic radio resources of the configured uplink grant and based on the one or more LBT procedures performed on the first sub-band and the second sub-band.

15. The wireless device of claim 14, wherein the first CG-UCI and the second CG-UCI comprise at least one of:
one or more hybrid automatic repeat request (HARQ) process identifiers of the first PUSCH;
one or more indicators indicating whether the first PUSCH corresponds to new data;
one or more redundancy versions of the first PUSCH; and
channel occupancy time information.

16. The wireless device of claim 11, wherein the transmission comprises transmitting, in response to the one or more LBT procedures indicating the first sub-band and the second sub-band are idle:
the first CG-UCI via the first sub-band; and
the second CG-UCI via the second sub-band.

17. The wireless device of claim 11, wherein the instructions, when executed by the one or more processors, further cause the wireless device to, in response to the one or more LBT procedures indicating the first sub-band is occupied and the second sub-band is idle:
not transmit the first CG-UCI via the first sub-band; and
transmit the second CG-UCI via the second sub-band.

18. The wireless device of claim 11, wherein the first sub-band and the second sub-band comprise resource blocks of a bandwidth part.

19. The wireless device of claim 11, wherein the first sub-band and the second sub-band are adjacent.

20. A system comprising:
a base station comprising:
one or more processors; and
memory storing instructions that, when executed by the one or more processors, cause the base station to transmit configuration parameters of periodic radio resources of a configured uplink grant, wherein the periodic radio resources comprise a first physical uplink shared channel (PUSCH) transmission occasion comprising:
one or more first resource elements of a first sub-band; and
one or more second resource elements of a second sub-band; and
a wireless device comprising:
one or more processors; and
memory storing instructions that, when executed by the one or more processors, cause the wireless device to:
receive the configuration parameters;
multiplex:
a first configured grant uplink control information (CG-UCI) in the one or more first resource elements of the first band; and
a second CG-UCI in the one or more second resource elements, wherein the second CG-UCI is based on a repetition of the first CG-UCI in the second band; and
transmit, via the first PUSCH transmission occasion and based on one or more listen-before-talk (LBT) procedures performed on the first sub-band and the second sub-band, at least one of the first CG-UCI and the second CG-UCI.

* * * * *